(12) United States Patent
Maruo et al.

(10) Patent No.: US 12,554,715 B2
(45) Date of Patent: Feb. 17, 2026

(54) STORAGE MEDIUM, INFORMATION PROCESSING METHOD, AND INFORMATION PROCESSING APPARATUS

(71) Applicant: FUJITSU LIMITED, Kawasaki (JP)

(72) Inventors: Akito Maruo, Atsugi (JP); Kenji Homma, Atsugi (JP); Hideyuki Jippo, Atsugi (JP); Takeshi Soeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 918 days.

(21) Appl. No.: 17/840,670

(22) Filed: Jun. 15, 2022

(65) Prior Publication Data

US 2023/0121368 A1    Apr. 20, 2023

(30) Foreign Application Priority Data

Oct. 14, 2021 (JP) .................... 2021-169065

(51) Int. Cl.
*G06F 16/2453* (2019.01)
*G06N 3/126* (2023.01)
*G06N 20/10* (2019.01)

(52) U.S. Cl.
CPC ....... *G06F 16/24542* (2019.01); *G06N 3/126* (2013.01); *G06N 20/10* (2019.01)

(58) Field of Classification Search
CPC .. G06F 16/24542; G06N 3/126; G06N 20/10; G06N 20/00
See application file for complete search history.

(56) References Cited

U.S. PATENT DOCUMENTS 11,328,177 B2 * 5/2022 Jones ................ G06V 10/87

FOREIGN PATENT DOCUMENTS

JP    2010-122832 A    6/2010
JP    2021-034168 A    3/2021

OTHER PUBLICATIONS

Deb, K., Padmanabhan, D., Gupta, S., Mall, A.K., Daum, D., and Branke, J. (2009). Reliability-Based Optimization Using Evolutionary Algorithms. IEEE Transactions on Evolutionary Computation, 13(5), 1054-1074 (Year: 2009).*

(Continued)

*Primary Examiner* — Chuen-Meei Gan
(74) *Attorney, Agent, or Firm* — Fujitsu Intellectual Property Center

(57) ABSTRACT

A storage medium storing an information processing program that causes a computer to execute a process that includes generating a solution set of a combination of the value and the index value by performing first multi-objective optimization by using a first objective function that searches for a value of the characteristic variable and a second objective function that searches for an index value that indicates reliability of the value; specifying an index value included in a combination that serves as a solution in a case where a characteristic variable is a certain value in the generated solution set; and generating a solution set of a combination of the respective values of the plurality of characteristic variables by performing second multi-objective optimization by using an objective function that searches for a value of each of a plurality of characteristic variables.

12 Claims, 40 Drawing Sheets

(56) References Cited

OTHER PUBLICATIONS

Luo, J., Gupta, A., Ong, Y.-S., and Wang, Z. (2019). Evolutionary Optimization of Expensive Multiobjective Problems With Co-Sub-Pareto Front Gaussian Process Surrogates. IEEE Transactions on Cybernetics, 49(5), 1708-1721. (Year: 2019).*

Kalyanmoy, Deb et al.,"Reliability-Based Multi-objective Optimization Using Evolutionary Algorithms", Mar. 5, 2007, Evolutionary Multi-Criterion Optimization; [Lecture Notes in Computer Science;;LNCS], pp. 66-80, XP019077330.

Extended European Search Report dated Dec. 20, 2022 for corresponding European Patent Application No. 22179863.0, 7 pages.

* cited by examiner

| i | $\alpha_i$ | $p_i$ | $\beta_i$ | $q_i$ |
|---|---|---|---|---|
| 1 | 0.74 | 0.38 | 0.54 | 0.43 |
| 2 | 0.63 | 0.59 | 0.28 | 0.94 |
| 3 | 0.58 | 0.63 | 0.42 | 0.82 |
| 4 | 0.02 | 0.14 | 0.84 | 0.34 |
| 5 | 0.21 | 0.93 | 0.00 | 0.18 |
| 6 | 0.54 | 0.95 | 0.12 | 0.37 |
| 7 | 0.77 | 0.60 | 0.67 | 0.01 |
| 8 | 0.25 | 0.39 | 0.83 | 0.25 |
| 9 | 0.29 | 0.36 | 0.14 | 0.80 |
| 10 | 0.85 | 0.20 | 0.58 | 0.02 |
| 11 | 0.98 | 0.28 | 0.89 | 0.60 |
| 12 | 0.88 | 0.25 | 0.21 | 0.60 |
| 13 | 0.36 | 0.17 | 0.19 | 0.11 |
| 14 | 0.60 | 0.97 | 0.11 | 0.38 |
| 15 | 0.35 | 0.96 | 0.22 | 0.04 |
| 16 | 0.34 | 0.60 | 0.98 | 0.89 |
| 17 | 0.18 | 0.73 | 0.81 | 0.98 |
| 18 | 0.24 | 0.34 | 0.17 | 0.06 |
| 19 | 0.04 | 0.09 | 0.82 | 0.89 |
| 20 | 0.51 | 0.46 | 0.27 | 0.58 |

| No. | CHARACTERISTIC VALUE | | EXPLANATORY VARIABLE (IN %) | | | | | | | | | | | | | | | | | | | | |
|---|---|---|---|---|---|---|---|---|---|---|---|---|---|---|---|---|---|---|---|---|---|---|---|
| | y1 | y2 | x1 | x2 | x3 | x4 | x5 | x6 | x7 | x8 | x9 | x10 | x11 | x12 | x13 | x14 | x15 | x16 | x17 | x18 | x19 | x20 |
| 1 | 5.72 | 10.65 | 0 | 0 | 0 | 20 | 0 | 0 | 0 | 80 | 0 | 0 | 0 | 0 | 0 | 0 | 0 | 0 | 0 | 0 | 0 | 0 |
| 2 | 6.36 | 11.29 | 0 | 0 | 0 | 40 | 5 | 0 | 0 | 0 | 0 | 5 | 0 | 0 | 0 | 0 | 50 | 15 | 0 | 0 | 0 | 0 |
| 3 | 4.28 | 9.30 | 0 | 0 | 0 | 0 | 0 | 0 | 0 | 70 | 0 | 0 | 15 | 0 | 0 | 0 | 0 | 0 | 10 | 35 | 50 | 0 |
| 4 | 6.23 | 9.06 | 0 | 0 | 0 | 0 | 20 | 0 | 0 | 5 | 0 | 0 | 0 | 0 | 15 | 0 | 0 | 55 | 60 | 0 | 0 | 0 |
| 5 | 5.16 | 7.00 | 5 | 10 | 15 | 0 | 0 | 0 | 0 | 0 | 0 | 5 | 60 | 0 | 0 | 0 | 0 | 0 | 0 | 0 | 0 | 0 |
| 6 | 5.70 | 5.95 | 0 | 0 | 0 | 0 | 20 | 0 | 0 | 5 | 0 | 45 | 0 | 25 | 30 | 0 | 0 | 0 | 0 | 5 | 0 | 25 |
| 7 | 3.16 | 8.34 | 5 | 0 | 0 | 0 | 0 | 0 | 0 | 15 | 0 | 0 | 0 | 30 | 0 | 0 | 0 | 0 | 0 | 5 | 5 | 0 |
| 8 | 4.71 | 9.73 | 0 | 0 | 0 | 0 | 45 | 0 | 70 | 0 | 0 | 15 | 0 | 0 | 0 | 0 | 0 | 0 | 0 | 75 | 0 | 25 |
| 9 | 6.77 | 10.51 | 5 | 25 | 0 | 0 | 0 | 5 | 0 | 15 | 5 | 0 | 0 | 0 | 80 | 0 | 0 | 50 | 0 | 85 | 0 | 5 |
| 10 | 6.84 | 11.21 | 0 | 0 | 0 | 0 | 20 | 50 | 0 | 0 | 5 | 0 | 0 | 50 | 0 | 0 | 0 | 20 | 0 | 0 | 0 | 0 |
| 11 | 5.65 | 8.81 | 0 | 0 | 40 | 0 | 0 | 0 | 0 | 0 | 60 | 0 | 0 | 80 | 55 | 0 | 0 | 0 | 0 | 0 | 0 | 0 |
| 12 | 5.55 | 7.37 | 0 | 0 | 0 | 0 | 25 | 0 | 20 | 0 | 5 | 20 | 5 | 0 | 0 | 0 | 25 | 0 | 0 | 0 | 0 | 0 |
| 13 | 4.52 | 10.39 | 5 | 0 | 0 | 0 | 0 | 0 | 10 | 35 | 0 | 0 | 0 | 5 | 0 | 10 | 5 | 25 | 30 | 35 | 0 | 0 |
| 14 | 7.39 | 8.50 | 0 | 0 | 0 | 0 | 5 | 0 | 0 | 0 | 0 | 0 | 0 | 0 | 0 | 0 | 10 | 0 | 0 | 5 | 0 | 70 |
| 15 | 7.29 | 10.49 | 0 | 0 | 0 | 0 | 0 | 0 | 20 | 5 | 0 | 0 | 0 | 10 | 0 | 0 | 0 | 25 | 25 | 55 | 0 | 15 |
| 16 | 6.06 | 8.39 | 0 | 5 | 0 | 0 | 5 | 0 | 10 | 15 | 0 | 0 | 0 | 0 | 0 | 0 | 0 | 0 | 0 | 15 | 0 | 5 |
| 17 | 6.02 | 10.25 | 0 | 0 | 0 | 20 | 0 | 0 | 0 | 0 | 0 | 0 | 0 | 0 | 0 | 0 | 65 | 65 | 0 | 0 | 0 | 0 |
| 18 | 4.61 | 6.36 | 0 | 0 | 0 | 0 | 0 | 0 | 0 | 5 | 0 | 0 | 0 | 0 | 0 | 25 | 10 | 15 | 0 | 0 | 0 | 0 |
| 19 | 6.91 | 9.33 | 0 | 25 | 0 | 0 | 0 | 0 | 0 | 0 | 0 | 0 | 15 | 25 | 20 | 0 | 55 | 0 | 20 | 0 | 5 | 5 |
| 20 | 6.49 | 7.07 | 0 | 0 | 0 | 0 | 0 | 0 | 0 | 60 | 0 | 0 | 0 | 0 | 0 | 0 | 5 | 0 | 0 | 0 | 0 | 0 |
| 21 | 5.67 | 10.05 | 0 | 0 | 0 | 0 | 15 | 0 | 75 | 5 | 0 | 0 | 0 | 0 | 0 | 0 | 0 | 0 | 0 | 20 | 0 | 40 |
| 22 | 6.24 | 9.22 | 30 | 0 | 0 | 0 | 0 | 0 | 0 | 0 | 0 | 0 | 0 | 0 | 0 | 0 | 5 | 0 | 0 | 60 | 0 | 5 |
| 23 | 4.73 | 6.77 | | | | | | | | | | | | | | | | | | | | |
| 24 | 6.65 | 11.86 | | | | | | | | | | | | | | | | | | | | |
| 25 | 3.31 | 8.79 | | | | | | | | | | | | | | | | | | | | |
| 26 | 5.98 | 9.25 | | | | | | | | | | | | | | | | | | | | |
| 27 | 4.47 | 8.44 | | | | | | | | | | | | | | | | | | | | |
| 28 | 6.24 | 8.79 | | | | | | | | | | | | | | | | | | | | |
| 29 | 4.81 | 12.32 | | | | | | | | | | | | | | | | | | | | |
| 30 | 5.81 | 10.20 | | | | | | | | | | | | | | | | | | | | |

FIG. 15

|  | $y_1$ | $y_2$ |
|---|---|---|
| TARGET VALUE (SELECTION POINT) | 2.65 | 5.00 |
| MINIMUM VALUE OF OPTIMIZATION RESULT | 3.73 | 5.23 |

1501

UPDATE DEVIATION THRESHOLD

|  | $\delta_1$ | $\delta_2$ |
|---|---|---|
| BEFORE UPDATE | 0.26 | 0.37 |
| AFTER UPDATE | 0.31 | 0.42 |

1502

※SET STEP SIZE t = 0.05

FIG. 17

| | $y_1$ | $y_2$ |
|---|---|---|
| TARGET VALUE (SELECTION POINT) | 2.65 | 5.00 |
| MINIMUM VALUE OF OPTIMIZATION RESULT | 3.19 | 5.14 |

1701

UPDATE DEVIATION THRESHOLD

| | $\delta_1$ | $\delta_2$ |
|---|---|---|
| BEFORE UPDATE | 0.31 | 0.42 |
| AFTER UPDATE | 0.36 | 0.47 |

1702

※SET STEP SIZE t = 0.05

| | $y_1$ | $y_2$ |
|---|---|---|
| TARGET VALUE (SELECTION POINT) | 2.65 | 5.00 |
| MINIMUM VALUE OF OPTIMIZATION RESULT | 2.56 | 5.03 |

DEVIATION THRESHOLD IS NOT UPDATED BECAUSE $y_1$ IS EQUAL TO OR SMALLER THAN TARGET VALUE

1902

UPDATE DEVIATION THRESHOLD

| | $\delta_1$ | $\delta_2$ |
|---|---|---|
| BEFORE UPDATE | 0.36 | 0.47 |
| AFTER UPDATE | 0.36 | 0.52 |

※SET STEP SIZE t = 0.05

FIG. 21

|  | $y_1$ | $y_2$ |
|---|---|---|
| TARGET VALUE (SELECTION POINT) | 2.65 | 5.00 |
| MINIMUM VALUE OF OPTIMIZATION RESULT | 2.57 | 4.94 |

END BECAUSE EACH CHARACTERISTIC VALUE IS EQUAL TO OR SMALLER THAN TARGET VALUE

MAXIMUM VALUE OF
RELATIVE ERROR RATE     2300

| | $E_{y1}^{max}$ [%] | $E_{y2}^{max}$ [%] |
|---|---|---|
| INFORMATION PROCESSING APPARATUS | 10.41 | 5.52 |
| PRIOR ART | 11.20 | 7.49 |

|  | $y_1$ | $y_2$ |
|---|---|---|
| TARGET VALUE (SELECTION POINT) | 2.65 | 5.00 |
| MINIMUM VALUE OF OPTIMIZATION RESULT | 3.73 | 5.23 |

UPDATE DEVIATION THRESHOLD

2802

|  | $\delta_1$ | $\delta_2$ |
|---|---|---|
| BEFORE UPDATE | 0.26 | 0.37 |
| AFTER UPDATE | 0.46 | 0.57 |

STEP SIZE t = 0.2
ALLOWABLE RANGE = 0.15

| | $y_1$ | $y_2$ |
|---|---|---|
| TARGET VALUE (SELECTION POINT) | 2.65 | 5.00 |
| MINIMUM VALUE OF OPTIMIZATION RESULT | 2.50 | 4.72 |

IN CASE WHERE SEARCH SPACE IS EXPANDED TOO MUCH, NARROW SPACE TO INCREASE ACCURACY

UPDATE DEVIATION THRESHOLD

3002

| | $\delta_1$ | $\delta_2$ |
|---|---|---|
| BEFORE UPDATE | 0.46 | 0.57 |
| AFTER UPDATE | 0.41 | 0.52 |

DECREASE

STEP SIZE t' = 1/4t = 0.05
ALLOWABLE RANGE = 0.15

FIG. 32

| | $y_1$ | $y_2$ |
|---|---|---|
| TARGET VALUE (SELECTION POINT) | 2.65 | 5.00 |
| MINIMUM VALUE OF OPTIMIZATION RESULT | 2.52 | 4.86 |

3201

END BECAUSE ALLOWABLE RANGE IS SATISFIED

ALLOWABLE RANGE = 0.15

FIG. 38

MINIMUM VALUE OF DEVIATION
OF EACH CHARACTERISTIC
(STANDARD OF DEGREE OF SEARCH)   3800

| $\sigma_1$ | $\sigma_2$ |
|---|---|
| 1.03 | 1.34 |

STORAGE MEDIUM, INFORMATION PROCESSING METHOD, AND INFORMATION PROCESSING APPARATUS

CROSS-REFERENCE TO RELATED APPLICATION

This application is based upon and claims the benefit of priority of the prior Japanese Patent Application No. 2021-169065, filed on Oct. 14, 2021, the entire contents of which are incorporated herein by reference.

FIELD

The embodiment discussed herein is related to a storage medium, an information processing method, and an information processing apparatus.

BACKGROUND

Conventionally, there is a technology of training a characteristic prediction model in which a relationship between a plurality of objective variables and a plurality of explanatory variables is modeled by using training data, and a prediction value of each objective variable of the plurality of objective variables is output according to the input plurality of explanatory variables. Furthermore, there is a technology called multi-objective optimization that obtains solutions of a plurality of explanatory variables that optimize values of a plurality of objective variables by using a characteristic prediction model.

As a prior art, for example, there is a technology of creating a prediction model by machine learning based on a relationship between manufacturing parameters used in manufacturing an organic electroluminescence (EL) device and product characteristics of the organic EL device manufactured with the manufacturing parameters. Furthermore, for example, there is a technology of executing inverse image calculation of a given range by using a model formula of an objective function generated by linear regression modeling to obtain a design parameter set corresponding to the range.

Japanese Laid-open Patent Publication No. 2021-034168 and Japanese Laid-open Patent Publication No. 2010-122832 are disclosed as related art.

SUMMARY

According to an aspect of the embodiments, a non-transitory computer-readable storage medium storing an information processing program that causes at least one computer to execute a process, the process includes generating a solution set of a combination of the value and the index value by performing first multi-objective optimization for each of a plurality of characteristic variables by using a first objective function that searches for a value of the characteristic variable predicted by a model and a second objective function that searches for an index value that indicates reliability of the value; specifying an index value included in a combination that serves as a solution for each of the plurality of characteristic variables in a case where a characteristic variable is a certain value in the generated solution set; and generating a solution set of a combination of the respective values of the plurality of characteristic variables by performing second multi-objective optimization by using an objective function that searches for a value of each of the plurality of characteristic variables predicted by the model and that includes a penalty term based on the specified index value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is an explanatory diagram (part 2) illustrating the first operation example of the information processing apparatus 100;

FIG. 7 is an explanatory diagram (part 3) illustrating the first operation example of the information processing apparatus 100;

FIG. 15 is an explanatory diagram (part 11) illustrating the first operation example of the information processing apparatus 100;

FIG. 17 is an explanatory diagram (part 13) illustrating the first operation example of the information processing apparatus 100;

FIG. 19 is an explanatory diagram (part 15) illustrating the first operation example of the information processing apparatus 100;

FIG. 21 is an explanatory diagram (part 17) illustrating the first operation example of the information processing apparatus 100;

FIG. 23 is an explanatory diagram (part 19) illustrating the first operation example of the information processing apparatus 100;

FIG. 28 is an explanatory diagram (part 2) illustrating the second operation example of the information processing apparatus 100;

FIG. 30 is an explanatory diagram (part 4) illustrating the second operation example of the information processing apparatus 100;

FIG. 32 is an explanatory diagram (part 6) illustrating the second operation example of the information processing apparatus 100;

FIG. 38 is an explanatory diagram (part 5) illustrating the third operation example of the information processing apparatus 100;

DESCRIPTION OF EMBODIMENTS

In the prior art, it may not be possible to trust solutions of a plurality of explanatory variables obtained by multi-objective optimization. For example, it is conceivable to perform multi-objective optimization by using a characteristic prediction model trained without using training data related to an area of specific explanatory variables. In this case, it is not possible for the characteristic prediction model to accurately obtain prediction values of respective objective variables according to the area of the specific explanatory variables. Therefore, in the multi-objective optimization, it is not possible to appropriately optimize the values of the plurality of objective variables, and it is not possible to accurately obtain the solutions of the plurality of explanatory variables.

In one aspect, it is an objective of an embodiment to make it possible to perform multi-objective optimization in consideration of reliability of a characteristic prediction model.

According to one aspect, it becomes possible to make it possible to perform multi-objective optimization in consideration of reliability of a characteristic prediction model.

Hereinafter, an embodiment of an information processing program, an information processing method, and an information processing apparatus will be described in detail with reference to the drawings.

(One Example of Information Processing Method According to Embodiment)

Figure 1:
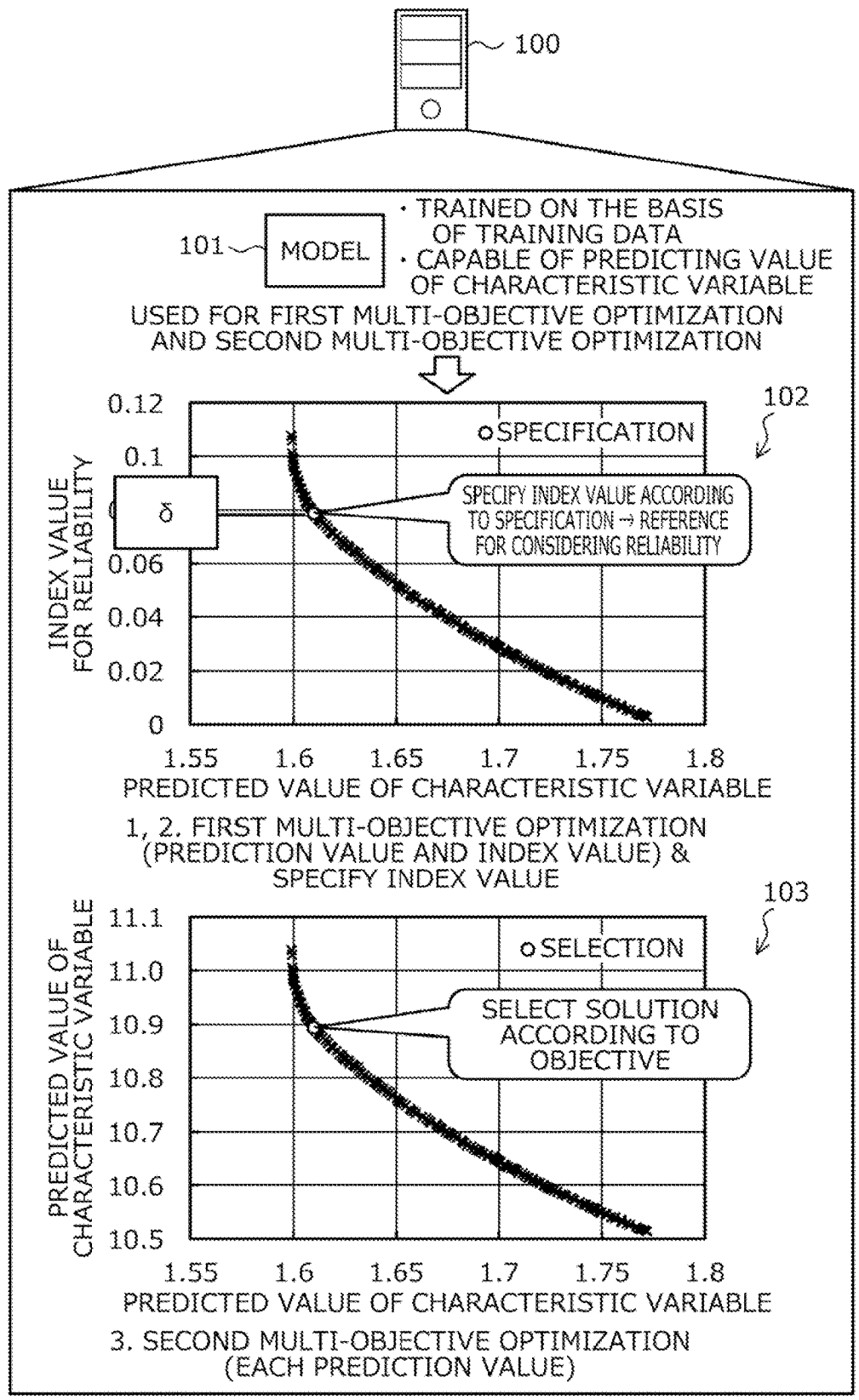
FIG. 1 is an explanatory diagram illustrating one example of an information processing method according to an embodiment.

FIG. 1 is an explanatory diagram illustrating one example of the information processing method according to the embodiment. An information processing apparatus 100 is a computer for performing multi-objective optimization by using an objective function for searching for a value of each characteristic variable of a plurality of characteristic variables.

The objective function is, for example, a function for searching for a value of a characteristic variable and bringing the value of the characteristic variable closer to a preferable value. The objective function is, for example, a function for optimizing the value of the characteristic variable. The optimization is, for example, minimization or maximization.

The multi-objective optimization uses, for example, a genetic algorithm. The multi-objective optimization is a method of, for example, optimizing values of respective characteristic variables serving as objective variables and obtaining a plurality of solutions for a combination of the values of the respective characteristic variables. For example, a solution obtained in the multi-objective optimization may be called "Pareto solution". The Pareto solutions tend not to be limited to one. Thus, in the multi-objective optimization, for example, a Pareto solution set is obtained.

The characteristic variable serves as, for example, an objective variable for the multi-objective optimization. A value of the characteristic variable is predicted by, for example, a model. The value of the characteristic variable is predicted by the model according to, for example, an explanatory variable. The model indicates, for example, a relationship between a plurality of characteristic variables and a plurality of explanatory variables. The model is trained on the basis of, for example, training data. The model is, for example, a characteristic prediction model. The optimization is, for example, minimization or maximization. The Pareto solution includes, for example, an optimized value of each characteristic variable and parameters of the model in the case of optimizing the value of each characteristic variable.

In the prior art, it may not be possible to trust the Pareto solution obtained by the multi-objective optimization. For example, it is conceivable to perform the multi-objective optimization by using a characteristic prediction model trained by using a plurality of pieces of training data having a relatively narrow distribution. For example, it is conceivable to perform the multi-objective optimization by using a characteristic prediction model trained without using training data related to an area of specific explanatory variables.

In this case, it is not possible for the characteristic prediction model to accurately obtain prediction values of respective characteristic variables according to the area of the specific explanatory variables. Therefore, in the multi-objective optimization, it is not possible to appropriately optimize the values of the plurality of characteristic variables, and it is not possible to accurately obtain a Pareto solution set. For example, in the multi-objective optimization, a Pareto solution candidate having relatively poor accuracy is left without being eliminated by using the characteristic prediction model, it is not possible to appropriately optimize the values of the plurality of characteristic variables, and it is not possible to accurately obtain the Pareto solution set.

Thus, in the present embodiment, the information processing method that may make it possible to perform multi-objective optimization in consideration of reliability of a characteristic prediction model will be described.

(1-1) The information processing apparatus 100 performs first multi-objective optimization for each characteristic variable of a plurality of characteristic variables to generate a solution set of a combination of a value of the characteristic variable and an index value indicating reliability of the value of the characteristic variable. The value of the characteristic variable is predicted by, for example, a model 101. The model 101 is trained on the basis of, for example, a plurality of pieces of training data.

The model 101 indicates, for example, at least a relationship between the characteristic variable and an explanatory variable, and makes it possible to predict a value of the characteristic variable. The model 101 may further make it possible to, for example, calculate an index value indicating reliability of the value of the characteristic variable. The model 101 is, for example, a Gaussian process regression model. It is assumed that, for example, the index value has a property that the value increases as the reliability decreases. The index value is calculated by, for example, the model 101. The index value may not be calculated by, for example, the model 101. The index value may be calculated on the basis of, for example, training data.

The first multi-objective optimization is, for example, processing that uses an objective function for searching for the value of the characteristic variable and an objective function for searching for the index value indicating the reliability of the value of the characteristic variable to generate the solution set of the combination of the value of the characteristic variable and the index value indicating the reliability of the value of the characteristic variable. The objective function for searching for the value of the characteristic variable is, for example, an objective function for optimizing the value of the characteristic variable. The optimization is, for example, minimization or maximization.

The objective function for searching for the index value indicating the reliability of the value of the characteristic variable is, for example, an objective function for optimizing the index value indicating the reliability of the value of the characteristic variable. The objective function for optimizing the index value indicating the reliability of the value of the characteristic variable is, for example, an objective function for minimizing the index value indicating the reliability of the value of the characteristic variable. For example, a solution includes an optimized value of the characteristic variable and the index value indicating the reliability of the value of the characteristic variable, and further includes parameters of the model 101 in the case of optimizing the value of the characteristic variable. The information processing apparatus 100 generates, for example, a solution set indicated in a graph 102. A horizontal axis of the graph 102 is, for example, the value of the characteristic variable, and a vertical axis of the graph 102 is, for example, the index value indicating the reliability of the value of the characteristic variable.

(1-2) The information processing apparatus 100 specifies, for each characteristic variable, an index value included in a combination serving as a solution in a case where the characteristic variable is a specified value in the generated solution set. For example, the information processing apparatus 100 accepts specification of any one solution in the generated solution set on the basis of operation input of a user, and specifies, for each characteristic variable, an index value δ included in a combination serving as the specified solution. With this configuration, the information processing apparatus 100 may specify, for each characteristic variable, any one index value δ serving as a reference for considering reliability of the model 101.

(1-3) The information processing apparatus 100 performs second multi-objective optimization to generate a solution set of a combination of the values of the respective characteristic variables. The value of the characteristic variable is predicted by, for example, the model 101. The second multi-objective optimization is, for example, processing that uses an objective function for searching for the value of each characteristic variable, which includes a penalty term based on the specified index value δ, to generate the solution set of the combination of the values of the respective characteristic variables. The objective function for searching for the value of the characteristic variable is, for example, an objective function for optimizing the value of the characteristic variable. The optimization is, for example, minimization or maximization.

The objective function for optimizing the value of the characteristic variable includes, for example, the penalty term based on the index value δ specified for the characteristic variable. The penalty term included in the objective function for optimizing the value of the characteristic variable has a property that, for example, the value increases as when an index value indicating reliability of the value of the characteristic variable is greater than the index value δ specified for the characteristic variable. A solution includes, for example, an optimized value of each characteristic variable, and further includes the parameters of the model 101 in the case of optimizing the value of each characteristic variable. The information processing apparatus 100 generates, for example, a solution set indicated in a graph 103. A horizontal axis of the graph 103 is, for example, a value of a certain characteristic variable, and a vertical axis of the graph 103 is, for example, a value of another characteristic variable.

With this configuration, the information processing apparatus 100 may optimize the value of each characteristic variable. The information processing apparatus 100 may, for example, perform the second multi-objective optimization in consideration of the reliability of the model 101, accurately optimize the value of each characteristic variable, and accurately obtain the solution set.

Thus, the information processing apparatus 100 may obtain the solution set having relatively high reliability, make it possible for a user to use the solution set having relatively high usefulness, and promote improvement in convenience. The user may select, for example, a desired solution from the solution set according to an objective of the user. The user may use, for example, parameters included in the selected desired solution according to the objective of the user.

Furthermore, the information processing apparatus 100 may accurately obtain the solution set even when the second multi-objective optimization is performed on the basis of the model 101 trained by using a plurality of pieces of training data having a relatively narrow distribution. Thus, the information processing apparatus 100 may promote reduction in a workload for training the model 101.

Here, the case has been described where the index value has the property that the value increases as the reliability decreases, but the present embodiment is not limited to this. For example, the index value may have a property that the value increases as the reliability increases.

Here, the case has been described where the index value has the property that the value increases as the reliability decreases and the objective function for optimizing the index value indicating the reliability of the value of the characteristic variable is the objective function for minimizing the index value indicating the reliability of the value of the characteristic variable, but the present embodiment is not limited to this. For example, the index value may have the property that the value increases as the reliability decreases and the objective function for optimizing the index value indicating the reliability of the value of the characteristic variable may be an objective function for maximizing the index value indicating the reliability of the value of the characteristic variable. In this case, it is preferable that the penalty term included in the objective function for optimizing the value of the characteristic variable in the second multi-objective optimization has a property that, for example, the value increases when the index value indicating the reliability of the value of the characteristic variable is smaller than the index value specified for the characteristic variable.

Here, the case has been described where the information processing apparatus 100 operates independently, but the present embodiment is not limited to this. For example, the information processing apparatus 100 may cooperate with another computer. For example, the information processing apparatus 100 may perform the first multi-objective optimization for each characteristic variable, specify the index value included in the combination serving as any one solution, and transmit the specified index value to another computer capable of performing the second multi-objective optimization. Furthermore, for example, the information processing apparatus 100 may form a client-server system as described later in FIG. 2.

(One Example of Information Processing System 200)

Next, one example of an information processing system 200 to which the information processing apparatus 100 illustrated in FIG. 1 is applied will be described with reference to FIG. 2.

Figure 2:
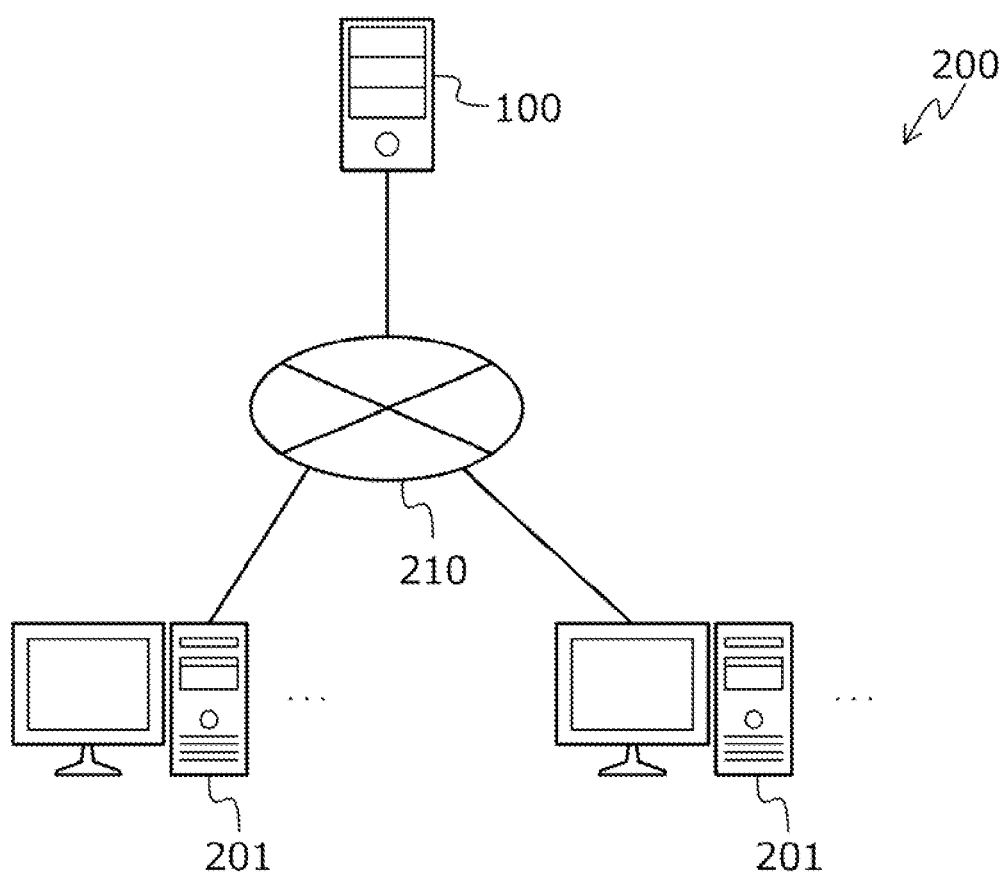
FIG. 2 is an explanatory diagram illustrating one example of an information processing system 200.

FIG. 2 is an explanatory diagram illustrating the one example of the information processing system 200. In FIG. 2, the information processing system 200 includes the information processing apparatus 100 and client devices 201.

In the information processing system 200, the information processing apparatus 100 and the client devices 201 are connected via a wired or wireless network 210. The network 210 is, for example, a local area network (LAN), a wide area network (WAN), or the Internet.

The information processing apparatus 100 is a computer for obtaining a Pareto solution set of a combination of values of respective characteristic variables of a plurality of characteristic variables. The information processing apparatus 100 receives, for example, a processing request from the client device 201. The processing request is, for example, a notification requesting to obtain the Pareto solution set of the combination of the values of the respective characteristic variables of the plurality of characteristic variables.

For example, when receiving the processing request, the information processing apparatus 100 performs the first multi-objective optimization for each characteristic variable to generate a Pareto solution set of a combination of a value of the characteristic variable and an index value indicating reliability of the value of the characteristic variable.

The information processing apparatus 100 specifies, for example, for each characteristic variable, an index value included in a combination serving as a Pareto solution in a case where the characteristic variable is a specified value in the generated Pareto solution set. For example, the information processing apparatus 100 transmits, in association with each characteristic variable, the Pareto solution set generated for the characteristic variable to the client device 201. For example, as a result of transmitting the Pareto solution set, the information processing apparatus 100 receives, for each characteristic variable, an instruction indicating that any one Pareto solution in the generated Pareto solution set is selected from the client device 201. For example, the information processing apparatus 100 specifies, for each characteristic variable, an index value included in a combination serving as a Pareto solution indicated by the received instruction in the generated Pareto solution set, as a reference value.

The information processing apparatus 100 performs the second multi-objective optimization to generate a Pareto solution set of a combination of values of the respective characteristic variables. The information processing apparatus 100 transmits the generated Pareto solution set to the client device 201. The information processing apparatus 100 is, for example, a server or a personal computer (PC).

The client device 201 transmits, for example, a processing request to the information processing apparatus 100 on the basis of operation input of a user. The client device 201 receives, for example, a Pareto solution set generated for respective characteristic variables in association with the characteristic variables from the information processing apparatus 100. The client device 201 outputs, for example, the Pareto solution set generated for the respective characteristic variables in association with the characteristic variables so that the user may refer to the Pareto solution set. An output format is, for example, display on a display, print output to a printer, or storage in a storage area.

The client device 201 accepts, for example, for each characteristic variable, selection of any one Pareto solution in the generated Pareto solution set on the basis of operation input of a user. The client device 201 transmits, for example, for each characteristic variable, an instruction indicating that any one Pareto solution in the generated Pareto solution set is selected to the information processing apparatus 100.

The client device 201 receives the Pareto solution set of the combination of the values of the respective characteristic variables from the information processing apparatus 100. The client device 201 outputs the Pareto solution set of the combination of the values of the respective characteristic variables so that a user may refer to the Pareto solution set. An output format is, for example, display on a display, print output to a printer, or storage in a storage area. The client device 201 is, for example, a PC, a tablet terminal, or a smartphone.

Here, the case has been described where the information processing apparatus 100 is a computer different from the client device 201, but the present embodiment is not limited to this. For example, the information processing apparatus 100 may have a function as the client device 201, and also operate as the client device 201.

Here, for example, the function as the information processing apparatus 100 may be distributed and implemented in a plurality of computers. For example, a computer that performs the first multi-objective optimization, a computer that specifies the index value included in the combination serving as any one Pareto solution, and a computer that performs the second multi-objective optimization may exist and cooperate with each other.

(Hardware Configuration Example of Information Processing Apparatus 100)

Next, a hardware configuration example of the information processing apparatus 100 will be described with reference to FIG. 3.

Figure 3:
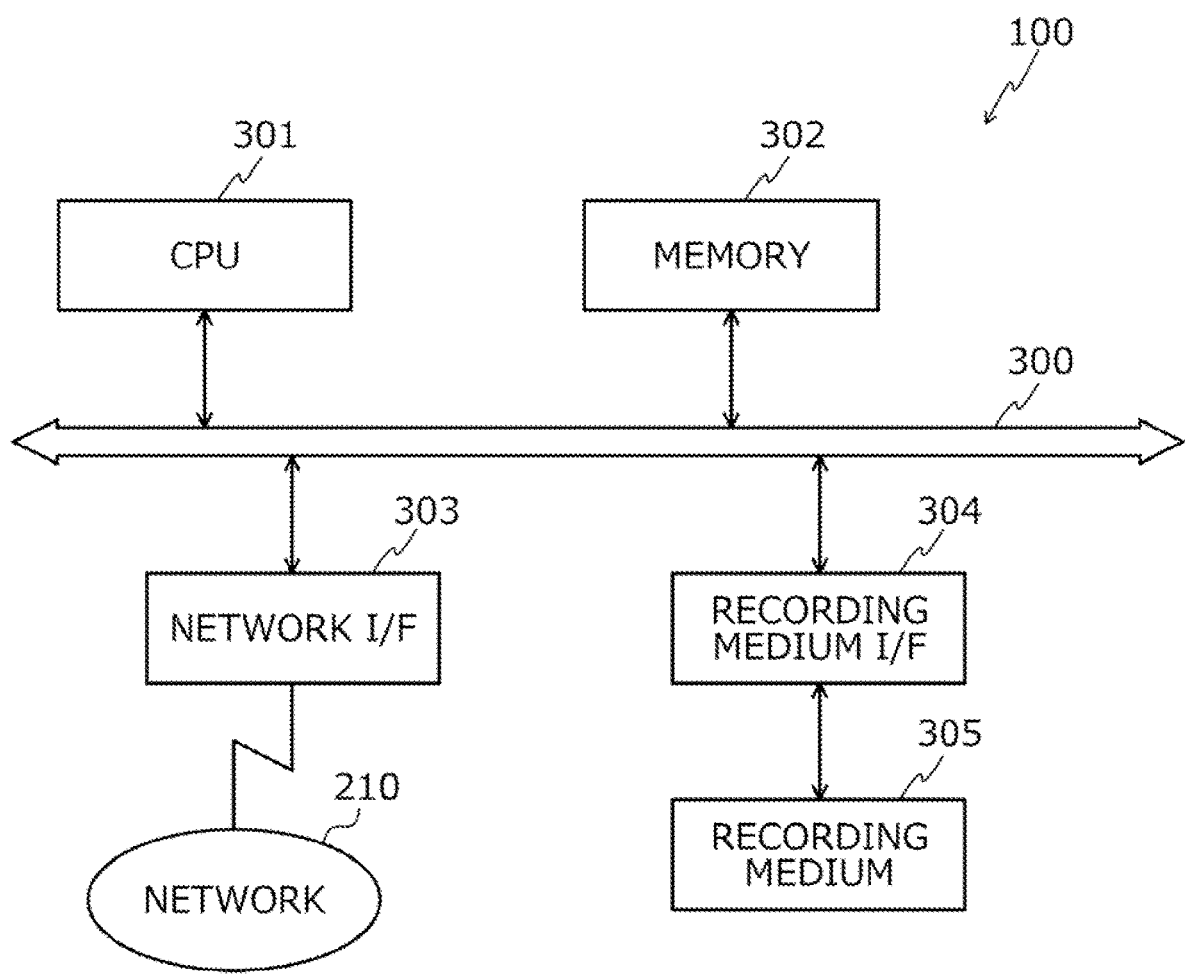
FIG. 3 is a block diagram illustrating a hardware configuration example of an information processing apparatus 100.

FIG. 3 is a block diagram illustrating the hardware configuration example of the information processing apparatus 100. In FIG. 3, the information processing apparatus 100 includes a central processing unit (CPU) 301, a memory 302, a network interface (I/F) 303, a recording medium I/F 304, and a recording medium 305. Furthermore, the individual components are connected to each other by a bus 300.

Here, the CPU 301 performs overall control of the information processing apparatus 100. The memory 302 includes, for example, a read only memory (ROM), a random access memory (RAM), and a flash ROM. For example, the flash ROM or the ROM stores various programs, and the RAM is used as a work area for the CPU 301. The programs stored in the memory 302 are loaded into the CPU 301 to cause the CPU 301 to execute coded processing.

The network I/F 303 is connected to the network 210 through a communication line, and is connected to another computer via the network 210. Additionally, the network I/F 303 manages an interface between the network 210 and the inside and controls input and output of data from the another computer. The network I/F 303 is, for example, a modem or a LAN adapter.

The recording medium I/F 304 controls reading and writing of data from and to the recording medium 305 under the control of the CPU 301. The recording medium I/F 304 is, for example, a disk drive, a solid state drive (SSD), or a universal serial bus (USB) port. The recording medium 305 is a nonvolatile memory that stores data written under the control of the recording medium I/F 304. The recording medium 305 is, for example, a disk, a semiconductor memory, or a USB memory. The recording medium 305 may be attachable to and detachable from the information processing apparatus 100.

The information processing apparatus 100 may include, for example, a keyboard, a mouse, a display, a printer, a scanner, a microphone, or a speaker, in addition to the components described above. Furthermore, the information processing apparatus 100 may include a plurality of the recording medium I/Fs 304 and recording media 305. Furthermore, the information processing apparatus 100 does not need to include the recording medium I/F 304 and the recording medium 305.

(Hardware Configuration Example of Client Device 201)

Since a hardware configuration example of the client device 201 is similar to the hardware configuration example of the information processing apparatus 100 illustrated in FIG. 3, description thereof is omitted.

(Functional Configuration Example of Information Processing Apparatus 100)

Next, a functional configuration example of the information processing apparatus 100 will be described with reference to FIG. 4.

Figure 4:
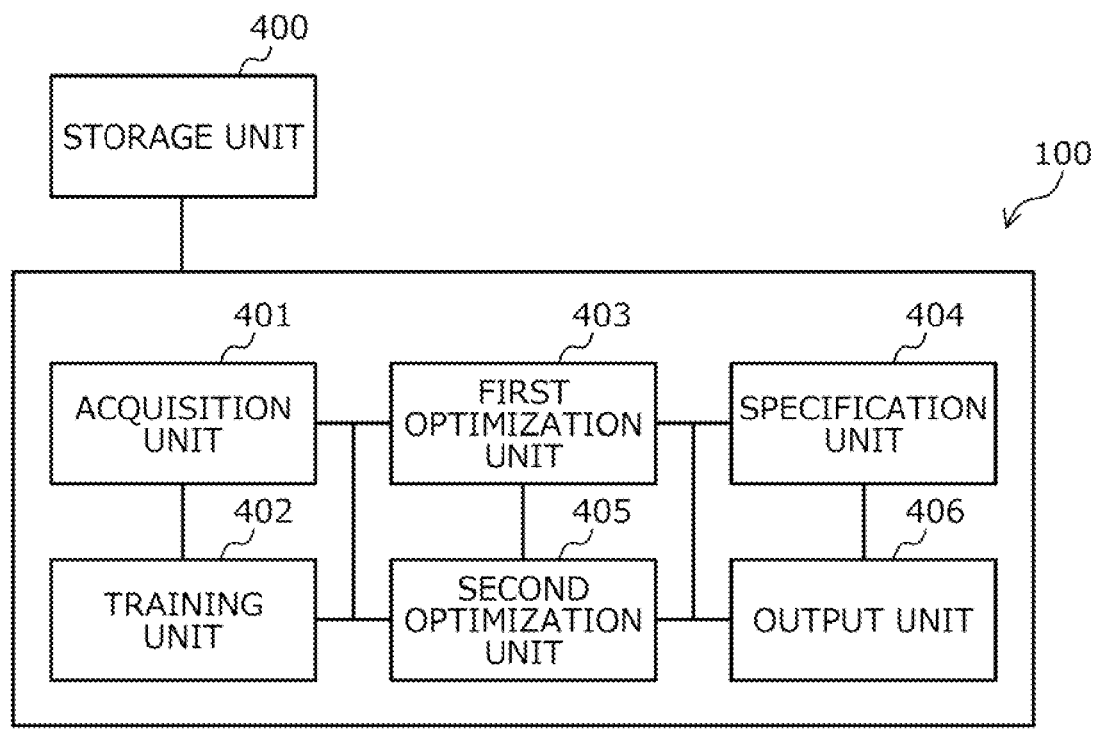
FIG. 4 is a block diagram illustrating a functional configuration example of the information processing apparatus 100.

FIG. 4 is a block diagram illustrating the functional configuration example of the information processing apparatus 100. The information processing apparatus 100 includes a storage unit 400, an acquisition unit 401, a training unit 402, a first optimization unit 403, a specification unit 404, a second optimization unit 405, and an output unit 406.

The storage unit 400 is implemented by, for example, a storage area such as the memory 302 or the recording medium 305 illustrated in FIG. 3. Hereinafter, a case will be described where the storage unit 400 is included in the information processing apparatus 100, but the present embodiment is not limited to this. For example, the storage unit 400 may be included in an apparatus different from the information processing apparatus 100, and the information processing apparatus 100 is allowed to refer to stored contents of the storage unit 400.

The acquisition unit 401 to the output unit 406 function as one example of a control unit. For example, the acquisition unit 401 to the output unit 406 implement functions thereof by causing the CPU 301 to execute a program stored in the storage area such as the memory 302 or the recording medium 305 or by the network I/F 303 illustrated in FIG. 3. A processing result of each functional unit is stored in, for example, the storage area such as the memory 302 or the recording medium 305 illustrated in FIG. 3.

The storage unit 400 stores various types of information to be referred to or updated in processing of each functional unit. The storage unit 400 stores, for example, a plurality of pieces of training data. The training data is, for example, samples of combinations of values of a plurality of explanatory variables and values of characteristic variables serving as a plurality of objective variables. The training data is acquired by, for example, the acquisition unit 401.

The storage unit 400 stores, for example, a model. The model is trained on the basis of, for example, training data. The model makes it possible to, for example, predict a value of each characteristic variable of a plurality of characteristic variables. The model may make it possible to, for example, calculate an index value indicating reliability of the value of each characteristic variable of the plurality of characteristic variables. The index value has a property that, for example, the value decreases as the reliability increases. The index value may have a property that, for example, the value increases as the reliability increases. The model is, for example, a Gaussian process regression model. The model is trained by, for example, the training unit 402. The model may be acquired by, for example, the acquisition unit 401.

The storage unit 400 stores, for example, a result of performing the first multi-objective optimization. The first multi-objective optimization uses, for example, an objective function for searching for a value of a characteristic variable and an objective function for searching for an index value indicating reliability of the value of the characteristic variable. The first multi-objective optimization uses, for example, an objective function for optimizing a value of a characteristic variable and an objective function for optimizing an index value indicating reliability of the value of the characteristic variable. The value of the characteristic variable is predicted by, for example, the model. The index value is calculated by, for example, the model.

The index value may be calculated on the basis of, for example, training data. The index value may be calculated on the basis of, for example, a distance from each piece of a plurality of pieces of training data to the value of the characteristic variable. The index value may be, for example, a statistical value regarding a distance from a value of a characteristic variable included in each piece of the plurality of pieces of training data to a value of a characteristic variable predicted by the model. The statistical value is, for example, a minimum value, a maximum value, a mean value, a median, or a mode. The index value may be calculated by, for example, a k-nearest neighbor method.

The index value may be expressed by, for example, data density on the basis of the distance from the value of the characteristic variable included in each piece of the plurality of pieces of training data to the value of the characteristic variable predicted by the model. The data density is calculated by, for example, kernel density estimation. The data density is calculated by, for example, a one-class support vector machine (OCSVM). The data density is, for example, $1/d_{ave}$. A mean value of the distances is $d_{ave}$.

The storage unit 400 stores, for example, a solution set of a combination of a value of a characteristic variable and an index value indicating reliability of the value of the characteristic variable, which is obtained as a result of performing the first multi-objective optimization. The solution set includes, for example, a plurality of solutions indicating one combination of the value of the characteristic variable and the index value indicating the reliability of the value of the characteristic variable. The solution may include, for example, parameters of the model that makes it possible to calculate the value of the characteristic variable included in the combination. The solution is called, for example, a Pareto solution. The first multi-objective optimization is performed by, for example, the first optimization unit 403.

The storage unit 400 stores, for example, a result of performing the second multi-objective optimization. The second multi-objective optimization uses, for example, an objective function for searching for a value of each characteristic variable of a plurality of characteristic variables. The second multi-objective optimization uses, for example, an objective function for optimizing a value of each characteristic variable of a plurality of characteristic variables. The value of the characteristic variable is predicted by, for example, the model. The objective function includes, for example, a penalty term based on any one index value.

The storage unit 400 stores, for example, a solution set of a combination of values of respective characteristic variables, which is obtained as a result of performing the second multi-objective optimization. The solution set includes, for example, a plurality of solutions indicating one combination of the values of the respective characteristic variable. The solution may include, for example, parameters of the model that makes it possible to calculate the combination. The solution is called, for example, a Pareto solution. The second multi-objective optimization is performed by, for example, the second optimization unit 405.

The acquisition unit 401 acquires various types of information to be used for processing of each functional unit. The acquisition unit 401 stores the acquired various types of information in the storage unit 400, or outputs the acquired various types of information to each functional unit. Furthermore, the acquisition unit 401 may output the various types of information stored in the storage unit 400 to each functional unit. The acquisition unit 401 acquires the various types of information on the basis of, for example, operation input of a user. The acquisition unit 401 may receive the various types of information from, for example, an apparatus different from the information processing apparatus 100.

The acquisition unit 401 acquires training data. The acquisition unit 401 acquires the training data by, for example, accepting input of the training data on the basis of operation input of a user. The acquisition unit 401 may acquire the training data by, for example, receiving the training data from another computer. The another computer is, for example, the client device 201.

The acquisition unit 401 acquires the model. The acquisition unit 401 acquires the model by, for example, accepting input of the model on the basis of operation input of a user. The acquisition unit 401 may acquire the model by, for example, receiving the model from another computer. The another computer is, for example, the client device 201.

The acquisition unit 401 acquires a processing request requesting to generate a solution set of a combination of values of respective characteristic variables of a plurality of characteristic variables. The acquisition unit 401 acquires the processing request by, for example, accepting input of the processing request on the basis of operation input of a user. The acquisition unit 401 may acquire the processing request by, for example, receiving the processing request from another computer. The another computer is, for example, the client device 201.

The acquisition unit 401 accepts specification of a value of a characteristic variable. The acquisition unit 401 accepts the specification of the value of the characteristic variable in order to, for example, make it possible to specify any one solution in a solution set of a combination of a value of a characteristic variable and an index value indicating reliability of the value of the characteristic variable, which is obtained as a result of performing the first multi-objective optimization. The acquisition unit 401 accepts the specification of the value of the characteristic variable by, for example, receiving a notification that specifies the value of the characteristic variable from another computer. The acquisition unit 401 may accept the specification of the value of the characteristic variable by, for example, accepting input of the value of the characteristic variable on the basis of operation input of a user.

The acquisition unit 401 may accept the specification of the value of the characteristic variable by, for example, accepting specification of any one solution. The acquisition unit 401 may accept the specification of any one solution and accept the specification of the value of the characteristic variable included in the any one solution by, for example, receiving the notification that specifies the any one solution from another computer. The acquisition unit 401 may accept the specification of the value of the characteristic variable included in the any one solution by, for example, accepting the specification of the any one solution on the basis of operation input of a user.

The acquisition unit 401 may accept a start trigger to start processing of any one of the functional units. The start trigger is, for example, predetermined operation input by a user. The start trigger may be, for example, reception of predetermined information from another computer. The start trigger may be, for example, output of predetermined information by any one of the functional units.

The acquisition unit 401 may accept, for example, acquisition of training data as a start trigger to start processing of the training data 402. The acquisition unit 401 may accept, for example, acquisition of a processing request as a start trigger to start processing of the first optimization unit 403. The acquisition unit 401 may accept, for example, acceptance of specification of a value of a characteristic variable as a start trigger to start processing of the second optimization unit 405.

The training unit 402 trains, for each characteristic variable, a model that makes it possible to predict a value of the characteristic variable. The model is, for example, a mathematical expression. The model may be, for example, a neural network and the like. The model is, for example, a Gaussian process regression model. The Gaussian process regression model makes it possible to predict a value of a characteristic variable and makes it possible to calculate an index value indicating reliability of the value of the characteristic variable.

The training unit 402 trains the model on the basis of, for example, a plurality of pieces of training data. The training unit 402 trains, for each characteristic variable, for example, a Gaussian process regression model on the basis of the plurality of pieces of training data. With this configuration, the training unit 402 may make it possible to predict the value of the characteristic variable. Furthermore, the training unit 402 may make it possible to calculate an index value indicating reliability of the value of the characteristic variable.

The first optimization unit 403 performs the first multi-objective optimization for each characteristic variable of a plurality of characteristic variables to generate a solution set of a combination of a value of the characteristic variable and an index value indicating reliability of the value of the characteristic variable. The value of the characteristic variable is, for example, a value predicted by a trained model. The value of the characteristic variable is predicted by, for example, the Gaussian process regression model. The index value is calculated by, for example, the Gaussian process regression model. The index value may be calculated by, for example, the first optimization unit 403 on the basis of a plurality of pieces of training data.

The first optimization unit 403 may perform the first multi-objective optimization, for example, while calculating the index value indicating the reliability of the value of each characteristic variable predicted by the model on the basis of the plurality of pieces of training data. With this configuration, the first optimization unit 403 may specify, for each characteristic variable, a relationship between a value of the characteristic variable and an index value indicating reliability of the value of the characteristic variable.

The specification unit 404 specifies, for each characteristic variable, an index value included in a combination serving as a solution in a case where the characteristic variable is a specified value in a solution set generated by the first optimization unit 403. For example, for each characteristic variable, the specification unit 404 specifies a value of a characteristic variable for which specification is accepted by the acquisition unit 401 and specifies an index value included in a combination serving as a solution in a case where the characteristic variable is the specified value in the generated solution set.

The specification unit 404 specifies, for example, for each characteristic variable, an index value included in a combination serving as a solution for which specification is accepted by the acquisition unit 401 in the generated solution set. With this configuration, the specification unit 404 may specify, for each characteristic variable, an index value serving as a reference for considering reliability of a value of the characteristic variable predicted by the model. Thus, the specification unit 404 may facilitate, for each characteristic variable, consideration of reliability of a value of the characteristic variable predicted by the model.

Here, the acquisition unit 401 may not accept the specification of the value of the characteristic variable or any one solution. In this case, for example, the specification unit 404 automatically specifies, for each characteristic variable, any one solution by selecting the any one solution in the generated solution set on the basis of a z-score, curvature, or the like. For example, the specification unit 404 automatically specifies, for each characteristic variable, any one solution by selecting a solution having the maximum curvature in the generated solution set.

The specification unit 404 may accept, for each characteristic variable, specification of a value of the characteristic variable by, for example, specifying the value of the characteristic variable determined to be relatively preferable according to a certain criterion in the generated solution set. With this configuration, the specification unit 404 may specify, for each characteristic variable, an index value serving as a reference for considering reliability of a value of the characteristic variable predicted by the model. The specification unit 404 allows a user to dispense with the need to specify the value of the characteristic variable, and may promote reduction in a workload of the user.

The specification unit 404 determines whether or not a value of any one characteristic variable of a plurality of characteristic variables satisfies a target value in a solution set of a combination of values of the respective characteristic variables generated by the second optimization unit 405. The target value is set on the basis of, for example, a specified value. The target value is, for example, the specified value.

For example, when the target value is a value indicating a lower limit, the specification unit 404 determines that the value of the characteristic variable satisfies the target value in a case where the value of the characteristic variable is equal to or greater than the target value. For example, when the target value is a value indicating an upper limit, the specification unit 404 determines that the value of the characteristic variable satisfies the target value in a case where the value of the characteristic variable is equal to or smaller than the target value. Here, in a case where a value of any one of the characteristic variables does not satisfy the target value, the specification unit 404 specifies a new index value different from an index value specified immediately before for the any one of the characteristic variables.

Here, for example, an index value indicating reliability may be an index value that increases as the reliability decreases, and an objective function for optimizing the index value indicating the reliability may be an objective function for minimizing the index value indicating the reliability. In this case, the specification unit 404 determines, for example, whether or not the value of the any one characteristic variable of the plurality of characteristic variables satisfies the target value in the generated solution set of the combination of the values of the respective characteristic variables. Then, for example, in a case where the target value is not satisfied, the specification unit 404 specifies a new index value that is greater than an index value specified immediately before by a first value for the any one characteristic variable. With this configuration, the specification unit 404 may make it possible to perform the second multi-objective optimization again and to generate a more appropriate solution set.

In a case where the value of the any one characteristic variable of the plurality of characteristic variables satisfies the target value in the generated solution set of the combination of the values of the respective characteristic variables, the specification unit 404 may further determine whether or not the value is included in a range based on the target value. For example, in a case where optimization of an index value indicating reliability indicates minimization, it is conceivable that the range based on the target value is a range related to a value smaller than the target value.

For example, in a case where the value of the any one characteristic variable is not included in the range based on the target value, the specification unit 404 specifies a new index value smaller than the index value specified immediately before by a second value different from the first value for the any one characteristic variable. The second value is preferably a value smaller than the first value. With this configuration, the specification unit 404 may relax the criterion for considering the reliability of the value of the characteristic variable predicted by the model, and may facilitate generation of an appropriate solution set.

Here, for example, an index value indicating reliability may be an index value that increases as the reliability decreases, and an objective function for optimizing the index value indicating the reliability may be an objective function for maximizing the index value indicating the reliability. In this case, the specification unit 404 determines, for example, whether or not the value of the any one characteristic variable of the plurality of characteristic variables satisfies the target value in the generated solution set of the combination of the values of the respective characteristic variables. Then, for example, in a case where the target value is not satisfied, the specification unit 404 specifies a new index value that is smaller than the index value specified immediately before by the first value for the any one characteristic variable. With this configuration, the specification unit 404 may make it possible to perform the second multi-objective optimization again and to generate a more appropriate solution set.

In a case where the value of the any one characteristic variable of the plurality of characteristic variables satisfies the target value in the generated solution set of the combination of the values of the respective characteristic variables, the specification unit 404 may further determine whether or not the value is included in a range based on the target value. For example, in a case where optimization of an index value indicating reliability indicates maximization, it is conceivable that the range based on the target value is a range related to a value greater than the target value.

For example, in a case where the value of the any one characteristic variable is not included in the range based on the target value, the specification unit 404 specifies a new index value greater than the index value specified immediately before by the second value different from the first value for the any one characteristic variable. The second value is preferably a value smaller than the first value. With this configuration, the specification unit 404 may relax the criterion for considering the reliability of the value of the characteristic variable predicted by the model, and may facilitate generation of an appropriate solution set.

The second optimization unit 405 performs the second multi-objective optimization to generate a solution set of a combination of values of respective characteristic variables. The second multi-objective optimization uses, for example, an objective function for optimizing a value of each characteristic variable predicted by the model. The objective function includes, for example, a penalty term based on an index value specified by the specification unit 404. The penalty term has a property that, for example, a value changes depending on a magnitude relationship between an index value indicating reliability of a value of a characteristic variable and the index value specified by the specification unit 404 for the characteristic variable. The penalty term has a property that, for example, the value increases when the index value indicating the reliability of the value of the characteristic variable indicates that the reliability is lower than that of the index value specified by the specification unit 404 for the characteristic variable.

The second optimization unit 405 determines, for example, whether or not an index value indicating reliability of a value of any one characteristic variable of a plurality of characteristic variables in a solution candidate of a combination of values of the respective characteristic variables is a value indicating that the reliability is lower than that of the specified index value. For example, in a case where the index value indicating the reliability of the value of the any one characteristic variable is a value indicating that the reliability is lower than that of the specified index value, the second optimization unit 405 sets an objective function so that the objective function for optimizing the value of the characteristic variable includes the penalty term. For example, in a case where the index value indicating the reliability of the value of the any one characteristic variable is a value indicating that the reliability is higher than that of the specified index value, the second optimization unit 405 sets an objective function so that the objective function for optimizing the value of the characteristic variable does not include the penalty term. The second optimization unit 405 performs the second multi-objective optimization by using, for example, the set objective function.

The penalty term may have a property that the value increases as the reliability indicated by the index value indicating the reliability of the value of the characteristic variable is lower than the reliability indicated by the specified index value. The second optimization unit 405 sets, for example, an objective function for optimizing a value of each characteristic variable, including the penalty term. The second optimization unit 405 performs the second multi-objective optimization by using, for example, the set objective function. With this configuration, the second optimization unit 405 may optimize the value of each characteristic variable. Furthermore, the second optimization unit 405 may specify parameters of the model that may optimize the value of each characteristic variable.

The output unit 406 outputs a processing result of at least any one of the functional units. An output format is, for example, display on a display, print output to a printer, transmission to an external device by the network I/F 303, or storage in the storage area such as the memory 302 or the recording medium 305. With this configuration, the output unit 406 may make it possible to notify a user of the processing result of at least any one of the functional units and may promote improvement in convenience of the information processing apparatus 100.

The output unit 406 outputs, for example, a result of performing the first multi-objective optimization. The output unit 406 outputs, for example, a solution set of a combination of a value of a characteristic variable and an index value indicating reliability of the value of the characteristic variable, which is obtained as a result of performing the first multi-objective optimization. With this configuration, the output unit 406 may facilitate specification of the value of the characteristic variable by a user. Thus, the output unit 406 may facilitate acceptance of the specification of the value of the characteristic variable by the acquisition unit 401.

The output unit 406 outputs, for example, a result of performing the second multi-objective optimization. The output unit 406 outputs, for example, a solution set of a combination of values of respective characteristic variables, which is obtained as a result of performing the second multi-objective optimization. With this configuration, the output unit 406 may make it possible for a user to refer to the solution set of the combination of the values of the respective characteristic variables. Thus, the output unit 406 may make it possible for the user to refer to the values of the respective characteristic variables and to refer to parameters of the model that may implement any one solution, and may promote improvement in convenience.

Here, the case has been described where the information processing apparatus 100 includes the acquisition unit 401, the training unit 402, the first optimization unit 403, the specification unit 404, the second optimization unit 405, and the output unit 406, but the present embodiment is not limited to this. For example, the information processing apparatus 100 may not include any one of the functional units. For example, the information processing apparatus 100 may not include the training unit 402. In this case, for example, the information processing apparatus 100 may acquire the model by receiving the model from another computer including the training unit 402. For example, the information processing apparatus 100 may not include the second optimization unit 405. In this case, for example, the information processing apparatus 100 cooperates with another computer including the second optimization unit 405.

(First Operation Example of Information Processing Apparatus 100)

Next, a first operation example of the information processing apparatus 100 will be described with reference to FIGS. 5 to 23.

Figure 5:
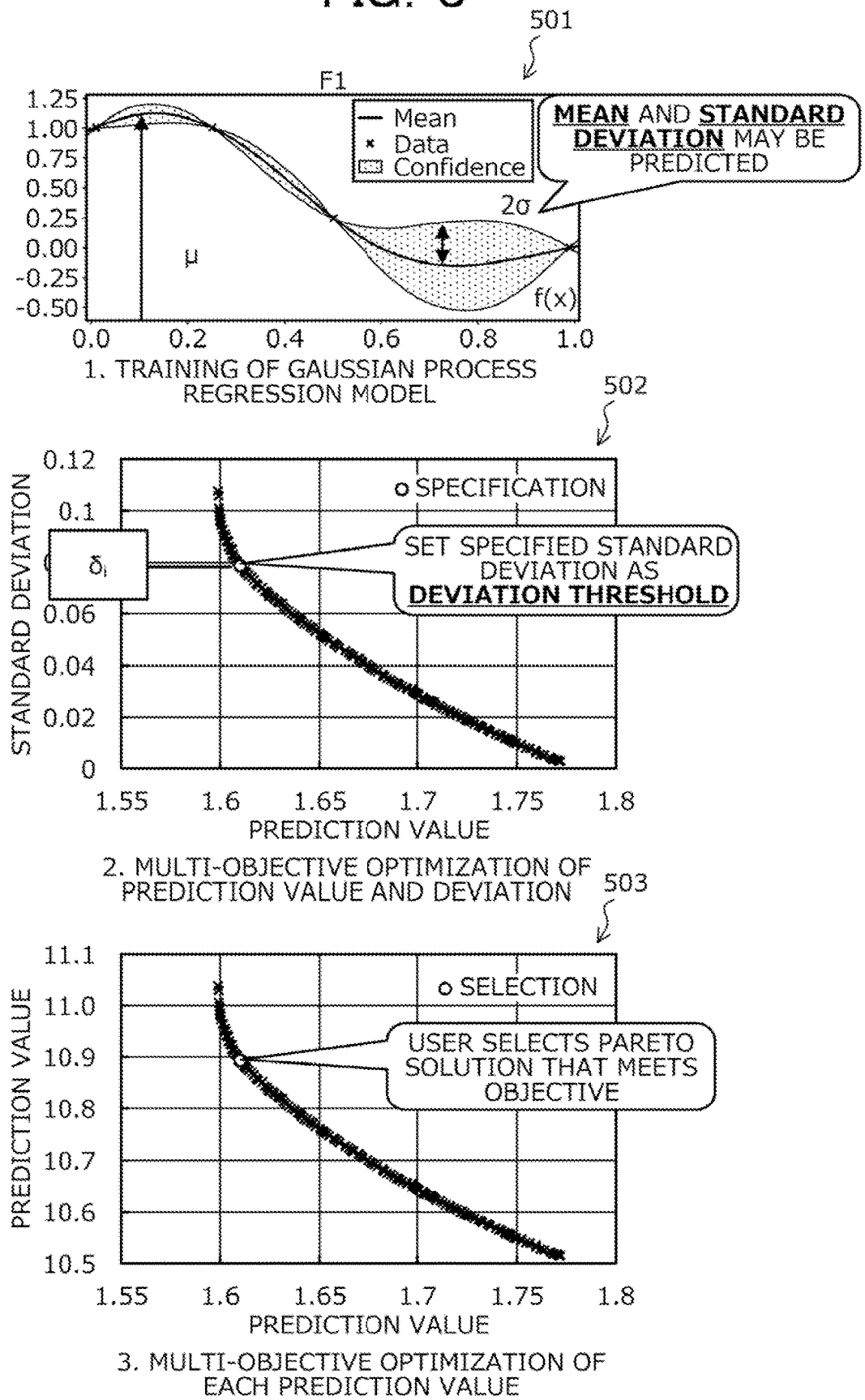
FIG. 5 is an explanatory diagram (part 1) illustrating a first operation example of the information processing apparatus 100.

FIGS. 5 to 23 are explanatory diagrams illustrating the first operation example of the information processing apparatus 100. FIG. 5 illustrates, for example, an operation flow of the information processing apparatus 100 in the first operation example. In FIG. 5, the information processing apparatus 100 has a plurality of pieces of training data. The training data indicates, for example, values of a plurality of explanatory variables and correct answer values of a plurality of characteristic variables corresponding to the values of the plurality of explanatory variables.

(5-1) The information processing apparatus 100 trains, for each characteristic variable, a Gaussian process regression model on the basis of the plurality of pieces of training data. The Gaussian process regression model is, for example, f(x) that makes it possible to calculate a mean p corresponding to the values of the characteristic variables.

The Gaussian process regression model further indicates, for example, instability of the value of the characteristic variable, and makes it possible to calculate a deviation δ corresponding to an index value indicating reliability of the value of the characteristic variable. The deviation δ is, for example, a standard deviation. The deviation δ has a property that the value decreases as the reliability increases. A relationship between the mean μ, the deviation δ, and the training data is indicated in, for example, a graph 501.

(5-2) The information processing apparatus 100 performs the first multi-objective optimization for the respective characteristic variables to generate a Pareto solution set of a combination of a value of the characteristic variable and a deviation of the value of the characteristic variable. The value of the characteristic variable is predicted by, for example, the Gaussian process regression model. The deviation of the value of the characteristic variable is calculated by, for example, the Gaussian process regression model.

Here, it is assumed that the smaller value of the characteristic variable is preferable for a user. Thus, the first multi-objective optimization is performed by using, for example, an objective function that minimizes the value of the characteristic variable and an objective function that minimizes the deviation of the value of the characteristic variable.

Instead of the deviation of the value of the characteristic variable, the information processing apparatus 100 may use the index value indicating the reliability of the value of the characteristic variable based on a distance from the value of the characteristic variable included in the training data to a value of a characteristic variable predicted by the model. The information processing apparatus 100 generates, for example, a Pareto solution set indicated in a graph 502 for the respective characteristic variables. Each point in the graph 502 indicates, for example, a Pareto solution.

The information processing apparatus 100 outputs, for the respective characteristic variables, the generated Pareto solution set indicated in the graph 502 so that a user may refer to the Pareto solution set, and then accepts specification of a value of any one of the characteristic variables. The user specifies the value of any one of the characteristic variables with reference to, for example, the Pareto solution set indicated in the graph 502.

The information processing apparatus 100 sets, for each characteristic variable, a deviation in a Pareto solution in which a characteristic variable becomes a specified value as a deviation threshold for the characteristic variable. For example, the information processing apparatus 100 sets, for an i-th characteristic variable, a deviation in a Pareto solution in which a characteristic variable becomes a specified value as a deviation threshold $\delta_i$ for the i-th characteristic variable.

(5-3) The information processing apparatus 100 performs the second multi-objective optimization for the whole of the plurality of characteristic variables to generate a Pareto solution set of a combination of values of the respective characteristic variables. The values of the respective characteristic variables are predicted by, for example, the Gaussian process regression model.

For example, the information processing apparatus 100 sets, for each characteristic variable, an objective function that optimizes a value of the characteristic variable, including a penalty term based on the specified deviation threshold. For example, the information processing apparatus 100 sets, for the i-th characteristic variable, an objective function that optimizes the i-th characteristic variable, including a penalty term based on the specified deviation threshold $\delta_i$.

The penalty term is 0 in a case where, for example, a deviation of a value of the i-th characteristic variable predicted by the Gaussian process regression model is smaller than the specified deviation threshold $\delta_i$. In a case where, for example, the deviation of the value of the i-th characteristic variable predicted by the Gaussian process regression model is equal to or greater than the specified deviation threshold $\delta_i$, the penalty term is a positive value so that a Pareto solution candidate including the value may be easily eliminated. The positive value is, for example, a variable value based on the specified deviation threshold $\delta_i$. The positive value may be, for example, a fixed value. For example, the information processing apparatus 100 performs the second multi-objective optimization by using the set objective function to generate a Pareto solution set indicated in a graph 503. Each point in the graph 503 indicates, for example, a Pareto solution.

In a case where a value of any one of the characteristic variables is equal to or greater than a target value in the Pareto solution set of the combination of the values of the respective characteristic variables, the information processing apparatus 100 may reset a deviation threshold for the any one of the characteristic variables and perform the second multi-objective optimization again. For example, in a case where the value of the i-th characteristic variable is equal to or greater than the target value, the information processing apparatus 100 resets the deviation threshold $\delta_i$ for the i-th characteristic variable to $\delta_i$+t, and performs the second multi-objective optimization again.

With this configuration, the information processing apparatus 100 may optimize the value of each characteristic variable. The information processing apparatus 100 may perform, for example, the second multi-objective optimization in consideration of reliability of the Gaussian process regression model. Thus, the information processing apparatus 100 may, for example, accurately optimize the values of the respective characteristic variables, and accurately obtain the Pareto solution set of the combination of the values of the respective characteristic variables. Next, description of FIGS. 6 to 23 will be made.

For example, FIGS. 6 to 23 illustrate the first operation example of the information processing apparatus 100. In FIG. 6, as one example of a multi-objective optimization problem, a mixture optimization problem is conceivable. The mixture optimization problem is a multi-objective optimization problem in which a composition ratio $x_i$ of substances 1 to n is changed to minimize a characteristic $y_1(x)$ and a characteristic $y_2(x)$. Here, i=1, 2, ..., n. $\Sigma_i x_i$=1. The composition ratio $x_i$ corresponds to an explanatory variable. A value $y_1$ of the characteristic $y_1(x)$ corresponds to a prediction value of a characteristic variable serving as an objective variable. A value $y_2$ of the characteristic $y_2(x)$ corresponds to a prediction value of the characteristic variable serving as the objective variable. The mixture optimization problem is defined by objective functions indicated in the following Expressions (1) and (2).

$$F_1(x)=y_1(x) \text{ to min} \quad (1)$$

$$F_2(x)=y_2(x) \text{ to min} \quad (2)$$

Here, for example, the characteristic $y_1(x)$ is defined by the following Expression (3). For example, the characteristic $y_2(x)$ is defined by the following Expression (4).

$$y_1(x)=\{\Sigma_{i=1}^{n}\alpha_i(x_i-p_i)^2\}^2 \quad (3)$$

$$y_2(x)=\{\Sigma_{i=1}^{n}\beta_i(x_i-q_i)^2\}^2 \quad (4)$$

Here, $\alpha_i$ that is greater or equal to 0 holds. $\beta_i$ that is greater or equal to 0 holds. In the following description, for example, it is assumed that $\alpha_1$ to $\alpha_{20}$ are values indicated in a table 600. For example, it is assumed that $p_1$ to $p_{20}$ are values indicated in the table 600. For example, it is assumed that $\beta_1$ to $\beta_{20}$ are values indicated in the table 600. For example, it is assumed that $q_1$ to $q_{20}$ are values indicated in the table 600. Next, description of FIG. 7 will be made.

In FIG. 7, the information processing apparatus 100 generates 30 pieces of training data. The information processing apparatus 100 generates, for example, 30 combination patterns of values of explanatory variables in which 2 to 5 components are randomly mixed. Then, for example, the information processing apparatus 100 generates, for each of the generated combination patterns, training data in which the combination pattern is associated with the characteristic values $y_1$ and $y_2$ calculated on the basis of Expressions (3) and (4) described above. In the example of FIG. 7, it is assumed that the information processing apparatus 100 has generated 30 pieces of training data indicated in a table 700. One row in the table 700 corresponds to one piece of the training data. Next, description of FIGS. 8 and 9 will be made.

Figure 8:
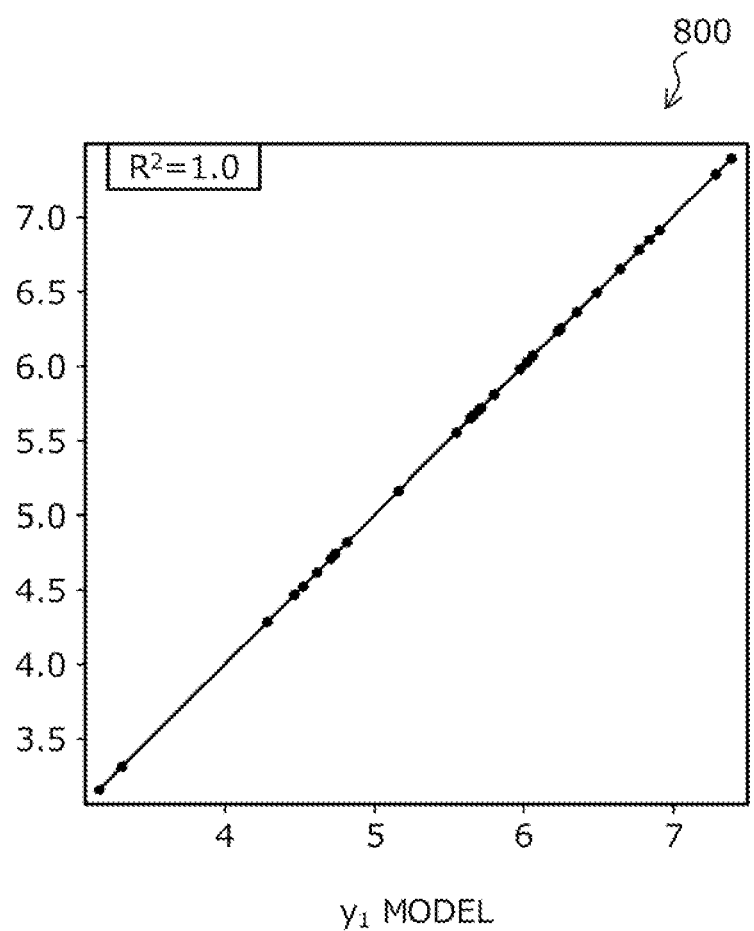
FIG. 8 is an explanatory diagram (part 4) illustrating the first operation example of the information processing apparatus 100.
Figure 9:
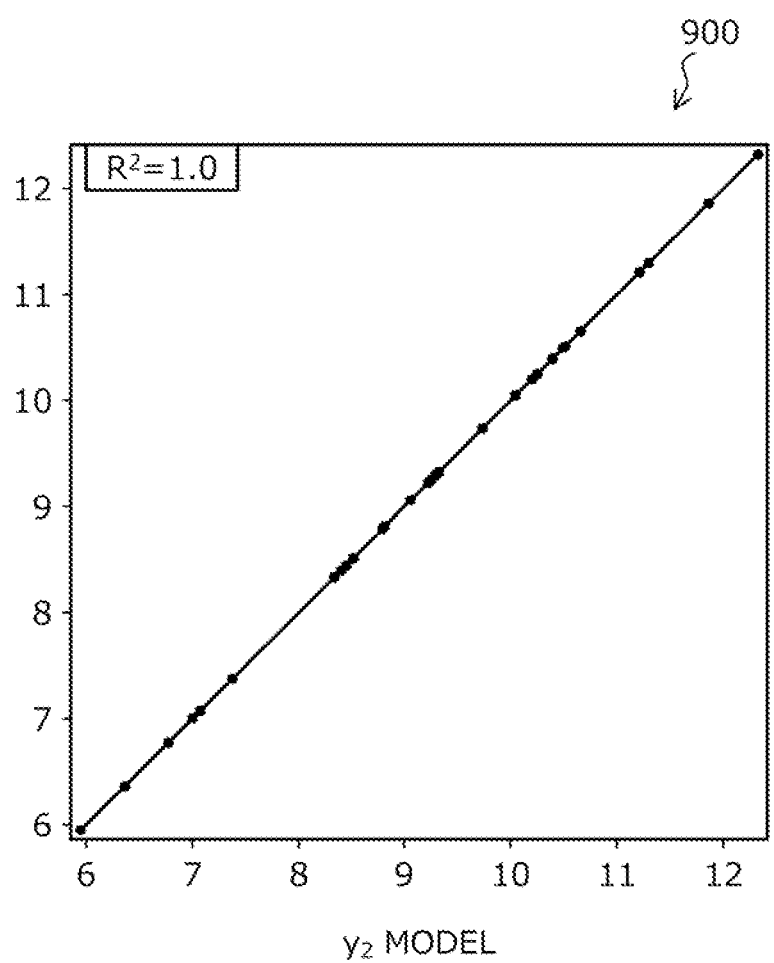
FIG. 9 is an explanatory diagram (part 5) illustrating the first operation example of the information processing apparatus 100.

In FIGS. 8 and 9, the information processing apparatus 100 generates Gaussian process regression models corresponding to the respective characteristic values $y_1$ and $y_2$ on the basis of the 30 pieces of training data. For example, the information processing apparatus 100 sets a parameter to Matern 5/2, and generates a $y_1$ model indicated in a graph 800 of FIG. 8 as the Gaussian process regression model corresponding to the characteristic value $y_1$. For example, a horizontal axis of the graph 800 is a value of an explanatory variable. For example, a vertical axis of the graph 800 is the characteristic value $y_1$.

For example, the information processing apparatus 100 sets the parameter to Matern 5/2, and generates a $y_2$ model indicated in a graph 900 of FIG. 9 as the Gaussian process regression model corresponding to the characteristic value $y_2$. For example, a horizontal axis of the graph 900 is a value of an explanatory variable. For example, a vertical axis of the graph 900 is the characteristic value $y_2$. Next, description of FIG. 10 will be made.

Figure 10:
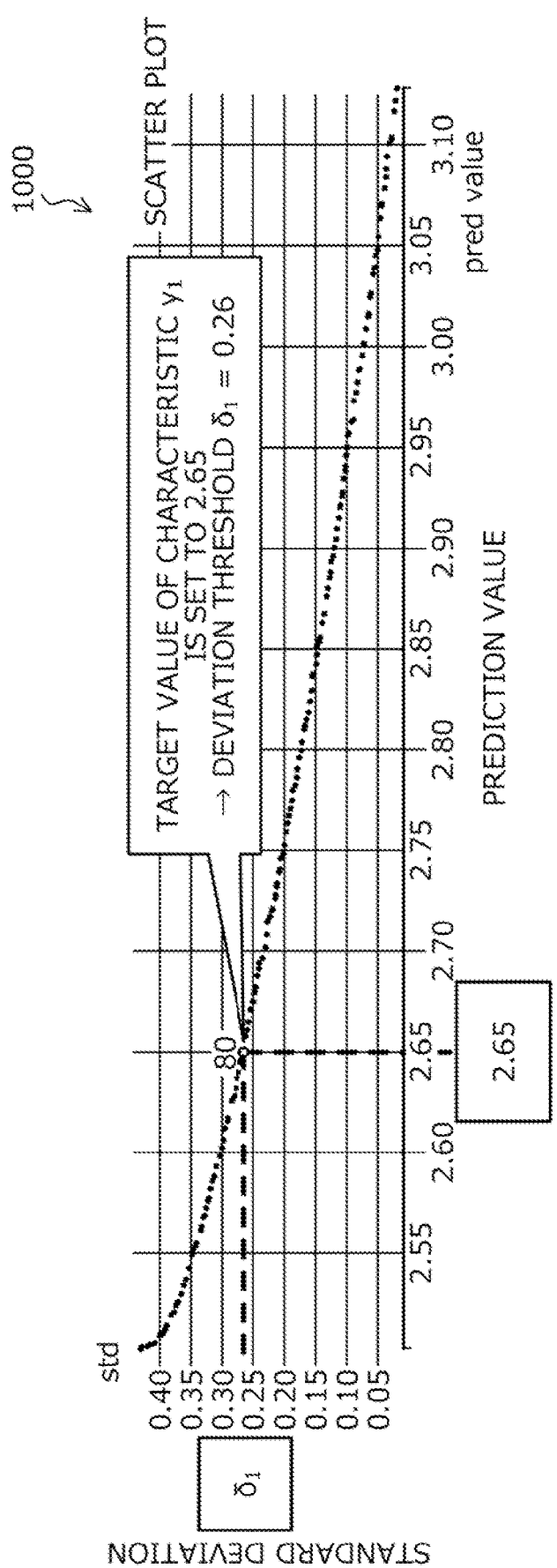
FIG. 10 is an explanatory diagram (part 6) illustrating the first operation example of the information processing apparatus 100.

In FIG. 10, on the basis of the $y_1$ model, the information processing apparatus 100 performs multi-objective optimization by using an objective function that optimizes a prediction value $\mu_1(x)$ of the characteristic value $y_1$ indicated in the following Expression (5) and an objective function that optimizes a deviation $\delta_1(x)$ indicated in the following Expression (6). As a result of performing the multi-objective optimization, the information processing apparatus 100 generates a Pareto solution set indicated in a graph 1000. The graph 1000 is a scatter plot. Each point in the graph 1000 indicates a Pareto solution. A horizontal axis of the graph 1000 is the prediction value $\mu_1(x)$, and a vertical axis of the graph 1000 is the deviation $\delta_1(x)$.

$$F_1(x)=\mu_1(x) \text{ to min} \quad (5)$$

$$F_2(x)=\delta_1(x) \text{ to min} \quad (6)$$

The information processing apparatus 100 outputs the Pareto solution set indicated in the graph 1000 so that a user may refer to the Pareto solution set. The information processing apparatus 100 accepts specification of a target value 2.65 of the characteristic value $y_1$ on the basis of operation input of the user, specifies the deviation $\delta_1(x)$ corresponding to the specified target value 2.65 in the Pareto solution set indicated in the graph 1000, and sets the deviation $\delta_1(x)$ as a deviation threshold $\delta_1$. Next, description of FIG. 11 will be made, and one example of the Pareto solution included in the Pareto solution set indicated in the graph 1000 will be described.

Figure 11:
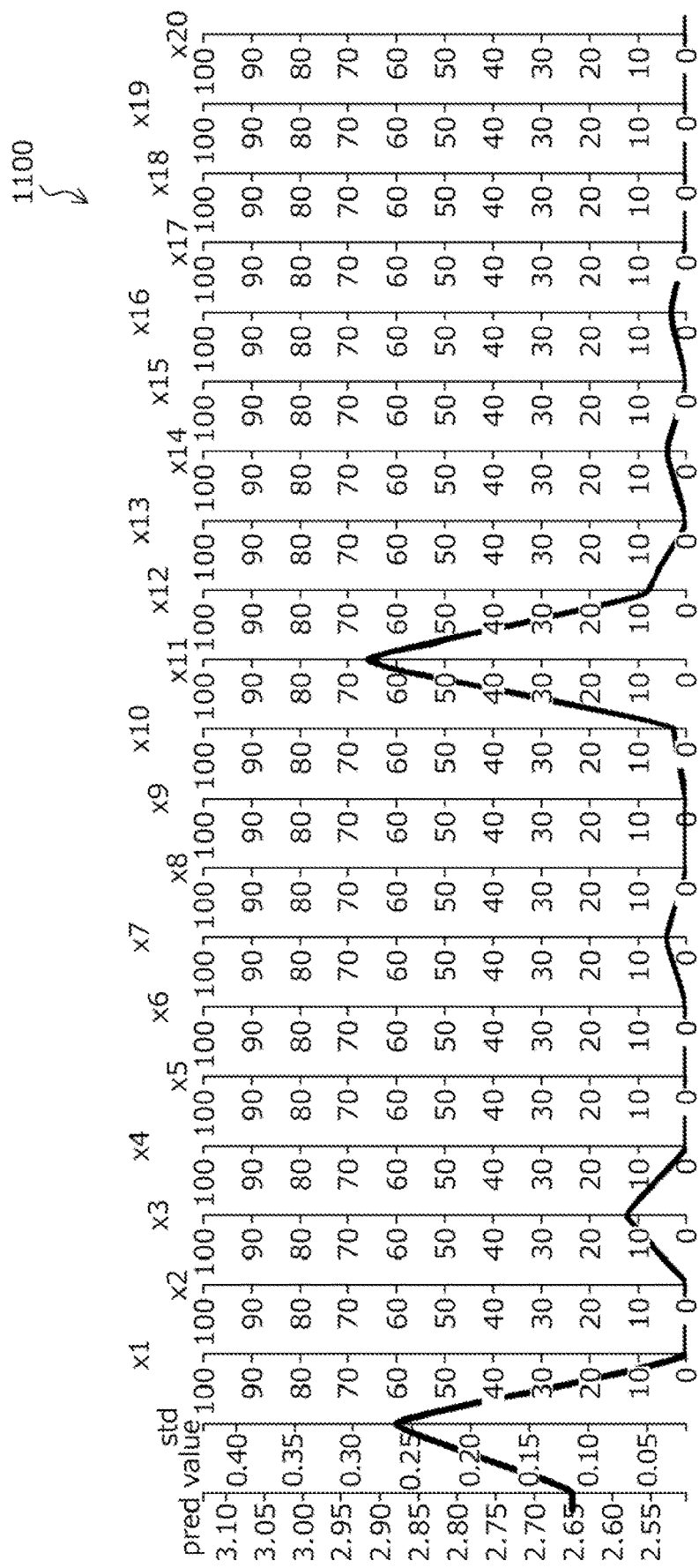
FIG. 11 is an explanatory diagram (part 7) illustrating the first operation example of the information processing apparatus 100.

As indicated in a multi-dimensional chart 1100 of FIG. 11, the Pareto solution includes a combination of pred value as the prediction value $\mu_1(x)$ and std as the deviation $\delta_1(x)$. The Pareto solution further includes values of explanatory variables $x_1$ to $x_{20}$ in a case where the prediction value $\mu_1(x)$=pred value and the deviation $\delta_1(x)$=std. Next, description of FIG. 12 will be made.

Figure 12:
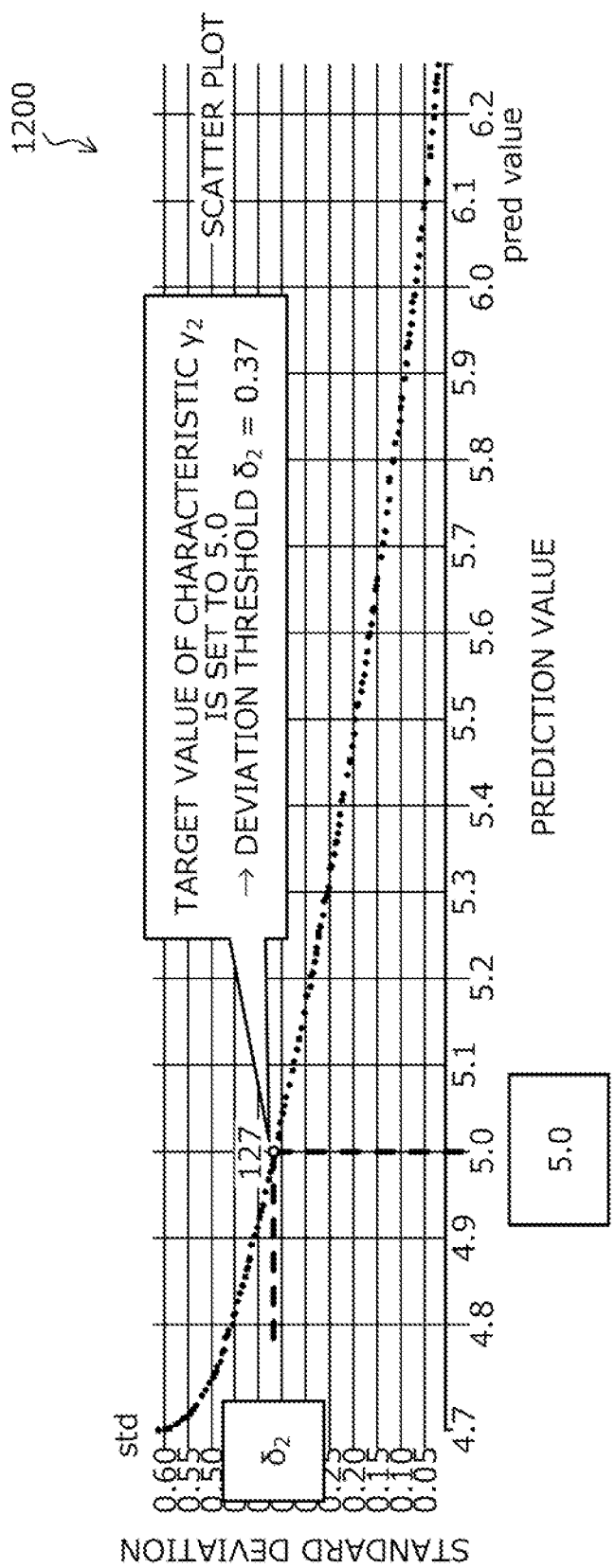
FIG. 12 is an explanatory diagram (part 8) illustrating the first operation example of the information processing apparatus 100.

In FIG. 12, on the basis of the $y_2$ model, the information processing apparatus 100 performs multi-objective optimization by using an objective function that optimizes a prediction value $\mu_2(x)$ of the characteristic value $y_2$ indicated in the following Expression (7) and an objective function that optimizes a deviation $\delta_2(x)$ indicated in the following Expression (8). As a result of performing the multi-objective optimization, the information processing apparatus 100 generates a Pareto solution set indicated in a graph 1200. The graph 1200 is a scatter plot. Each point in the graph 1200 indicates a Pareto solution. A horizontal axis of the graph 1200 is the prediction value $\mu_2(x)$, and a vertical axis of the graph 1200 is the deviation $\delta_2(x)$.

$$F_1(x) = \mu_2(x) \text{ to min} \tag{7}$$

$$F_2(x) = \delta_2(x) \text{ to min} \tag{8}$$

The information processing apparatus 100 outputs the Pareto solution set indicated in the graph 1200 so that a user may refer to the Pareto solution set. The information processing apparatus 100 accepts specification of the target value 5.0 of the characteristic value $y_2$ on the basis of operation input of the user, specifies the deviation $\delta_2(x)$ corresponding to the specified target value 5.0 in the Pareto solution set indicated in the graph 1200, and sets the deviation $\delta_2(x)$ as a deviation threshold $\delta 2$. Next, description of FIG. 13 will be made.

Figure 13:
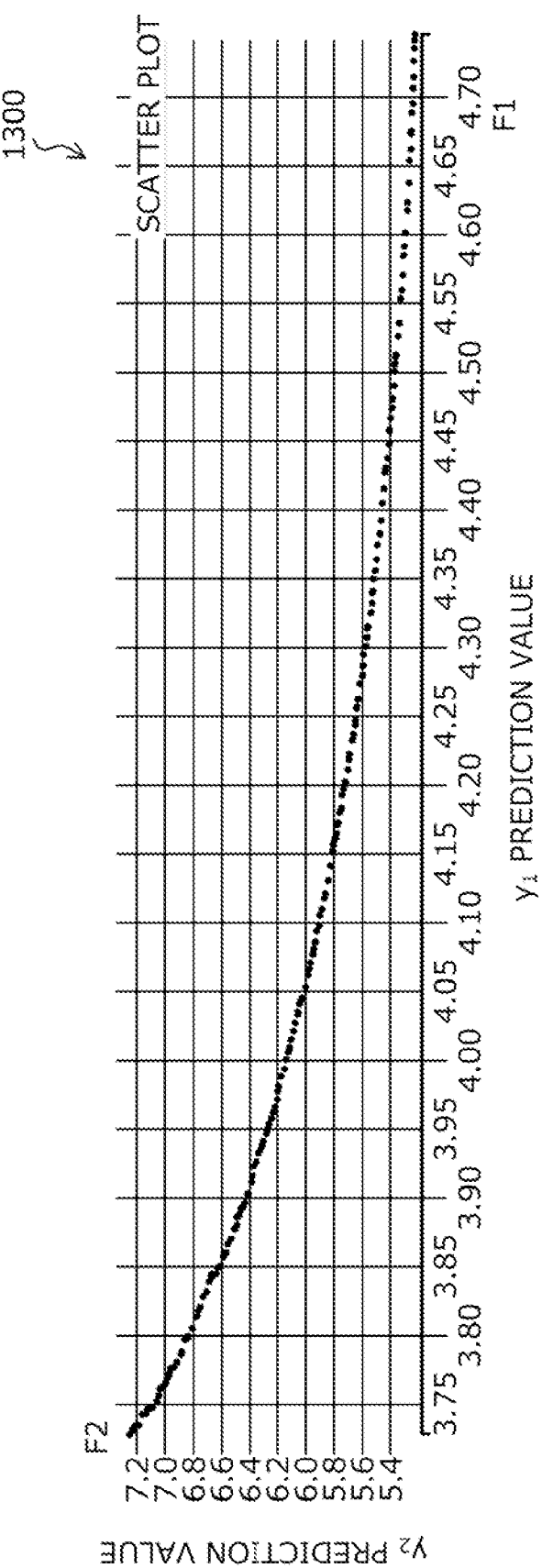
FIG. 13 is an explanatory diagram (part 9) illustrating the first operation example of the information processing apparatus 100.

In FIG. 13, on the basis of the $y_1$ model and the $y_2$ model, the information processing apparatus 100 sets an objective function that optimizes the prediction value $\mu_1(x)$ of the characteristic value $y_1$ indicated in the following Expression (9) and an objective function that optimizes the prediction value $\mu_2(x)$ of the characteristic value $y_2$ indicated in the following Expression (10).

$$F_1(x) = \mu_1(x) \text{ to min} \tag{9}$$

$$F_2(x) = \mu_2(x) \text{ to min} \tag{10}$$

In individual evaluation in the multi-objective optimization, in a case where a deviation $\sigma_j$ of a characteristic value of an individual is greater than a set deviation threshold $\delta_j$, the information processing apparatus 100 determines that a deviation constraint is violated and adds a penalty to $F_j$. The individual is a Pareto solution candidate.

For example, the information processing apparatus 100 adds a penalty term to Expressions (9) and (10) described above, and sets the following Expressions (11) and (12). $P_i$ is $\sigma_i + C_i$ when $\sigma_i > \delta_i$ holds, and 0 when $\sigma_i > \delta_i$ does not hold. $C_i$ is, for example, a fixed value. $C_i$ is, for example, a maximum value of an absolute value of a characteristic value $y_i$ in training data. $\alpha$ is, for example, 1.

$$F_1(x) = \mu_1(x) + \alpha \Sigma_{i=1}^{Ny} P_i \text{ to min} \tag{11}$$

$$F_2(x) = \mu_2(x) + \alpha \Sigma_{i=1}^{Ny} P_i \text{ to min} \tag{12}$$

On the basis of the $y_1$ model and the $y_2$ model, the information processing apparatus 100 performs multi-objective optimization by using the objective functions indicated in Expressions (11) and (12) described above. As a result of performing the multi-objective optimization, the information processing apparatus 100 generates a Pareto solution set indicated in a graph 1300. The graph 1300 is a scatter plot. Each point in the graph 1300 indicates a Pareto solution. A horizontal axis of the graph 1300 is the prediction value $\mu_1(x)$, and a vertical axis of the graph 1300 is the prediction value $\mu_2(x)$.

With this configuration, the information processing apparatus 100 may facilitate generation of a Pareto solution set with high accuracy in consideration of reliability of the $y_1$ model and the $y_2$ model. Next, description of FIG. 14 will be made, and one example of a Pareto solution included in the Pareto solution set indicated in the graph 1300 will be described.

Figure 14:
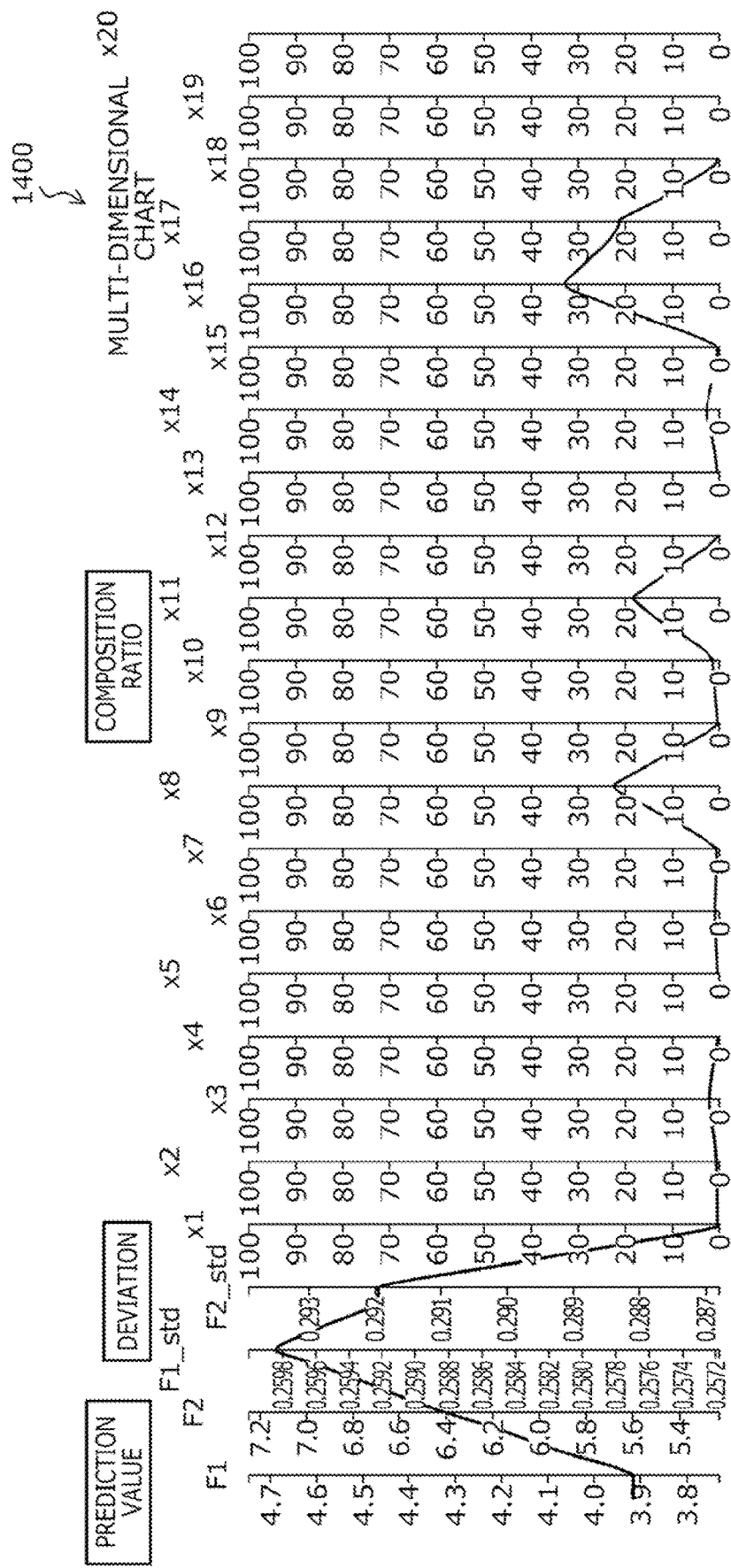
FIG. 14 is an explanatory diagram (part 10) illustrating the first operation example of the information processing apparatus 100.

As indicated in a multi-dimensional chart 1400 of FIG. 14, the Pareto solution includes a combination of F1 as the prediction value $\mu_1(x)$ and F2 as the prediction value $\mu_2(x)$. The Pareto solution further includes a combination of F1_std as the deviation $\delta_1(x)$ of F1 and F2_std as the deviation $\delta_2(x)$ of F2. The Pareto solution further includes values of the explanatory variables $x_1$ to $x_{20}$ in a case where the prediction value $\mu_1(x) = F1$ and the prediction value $\mu_2(x) = F2$. Next, description of FIG. 15 will be made.

In FIG. 15, as indicated in a table 1501, the information processing apparatus 100 reads out the target value 2.65 of the characteristic value $y_1$ and the target value 5.00 of the characteristic value $y_2$. As indicated in the table 1501, the information processing apparatus 100 specifies a minimum value 3.73 of the characteristic value $y_1$ and a minimum value 5.23 of the characteristic value $y_2$ in the Pareto solution set indicated in the graph 1300.

The information processing apparatus 100 determines whether or not the minimum value 3.73 of the characteristic value $y_1$ is equal to or smaller than the target value 2.65 of the characteristic value $y_1$. Here, the information processing apparatus 100 determines that minimization of the characteristic value $y_1$ is insufficient since the minimum value 3.73 of the characteristic value $y_1$ is greater than the target value 2.65 of the characteristic value $y_1$, and resets the deviation threshold 61 to 61+t as indicated in a table 1502. t is a step size. t is, for example, 0.05.

The information processing apparatus 100 determines whether or not the minimum value 5.23 of the characteristic value $y_2$ is equal to or smaller than the target value 5.00 of the characteristic value $y_2$. Here, the information processing apparatus 100 determines that minimization of the characteristic value $y_2$ is insufficient since the minimum value 5.23 of the characteristic value $y_2$ is greater than the target value 5.00 of the characteristic value $y_2$, and resets the deviation threshold $\delta_2$ to $\delta_2+t$ as indicated in the table 1502. Next, description of FIG. 16 will be made.

Figure 16:
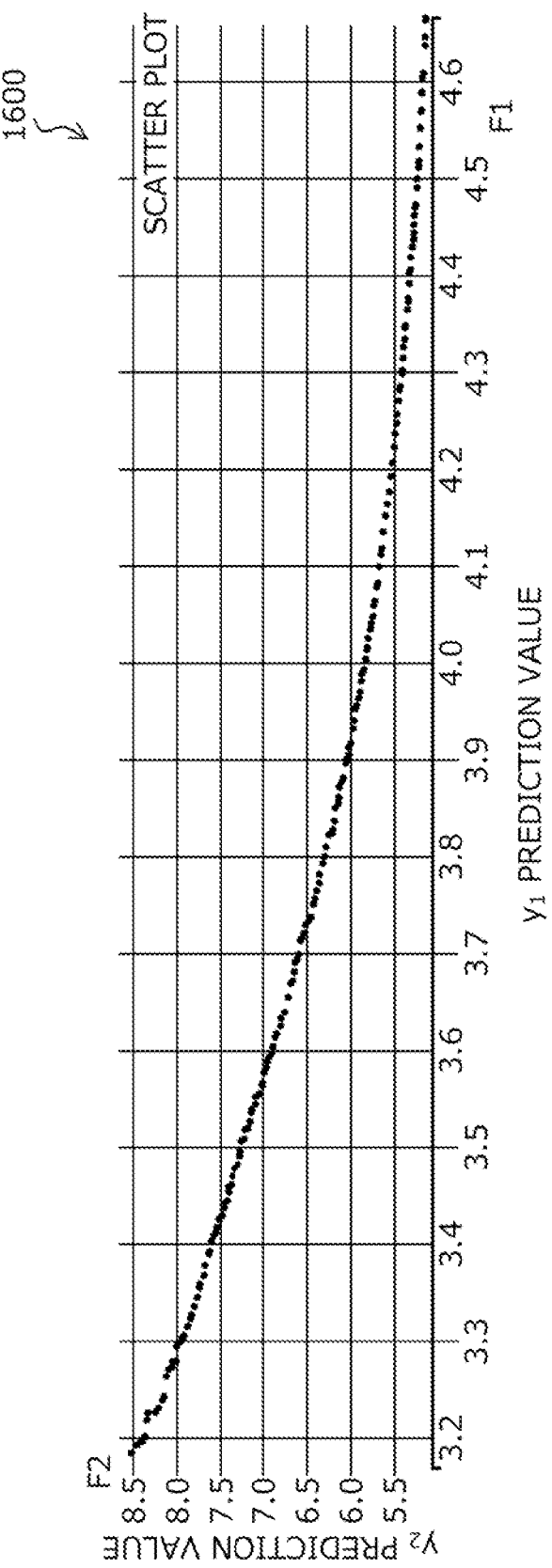
FIG. 16 is an explanatory diagram (part 12) illustrating the first operation example of the information processing apparatus 100.

In FIG. 16, on the basis of the $y_1$ model and the $y_2$ model, the information processing apparatus 100 performs multi-objective optimization by using the objective functions indicated in Expressions (11) and (12) described above. As a result of performing the multi-objective optimization, the information processing apparatus 100 generates a Pareto solution set indicated in a graph 1600. The graph 1600 is a scatter plot. Each point in the graph 1600 indicates a Pareto solution. A horizontal axis of the graph 1600 is the prediction value $\mu_1(x)$, and a vertical axis of the graph 1600 is the prediction value $\mu_2(x)$.

With this configuration, the information processing apparatus 100 may more accurately regenerate the Pareto solution set after updating the deviation threshold $\delta_1$, the deviation threshold $\delta_2$, and the like. Next, description of FIG. 17 will be made.

In FIG. 17, as indicated in a table 1701, the information processing apparatus 100 reads out the target value 2.65 of the characteristic value $y_1$ and the target value 5.00 of the characteristic value $y_2$. As indicated in the table 1701, the information processing apparatus 100 specifies a minimum value 3.19 of the characteristic value $y_1$ and a minimum value 5.14 of the characteristic value $y_2$ in the Pareto solution set indicated in the graph 1600.

The information processing apparatus 100 determines whether or not the minimum value 3.19 of the characteristic value $y_1$ is equal to or smaller than the target value 2.65 of the characteristic value $y_1$. Here, the information processing apparatus 100 determines that minimization of the characteristic value $y_1$ is insufficient since the minimum value 3.19 of the characteristic value $y_1$ is greater than the target value 2.65 of the characteristic value $y_1$, and resets the deviation threshold $\delta_1$ to $\delta_1+t$ as indicated in a table 1702.

The information processing apparatus 100 determines whether or not the minimum value 5.14 of the characteristic value $y_2$ is equal to or smaller than the target value 5.00 of the characteristic value $y_2$. Here, the information processing apparatus 100 determines that minimization of the characteristic value $y_2$ is insufficient since the minimum value 5.14 of the characteristic value $y_2$ is greater than the target value 5.00 of the characteristic value $y_2$, and resets the deviation threshold $\delta_2$ to $\delta_2+t$ as indicated in the table 1702. Next, description of FIG. 18 will be made.

Figure 18:
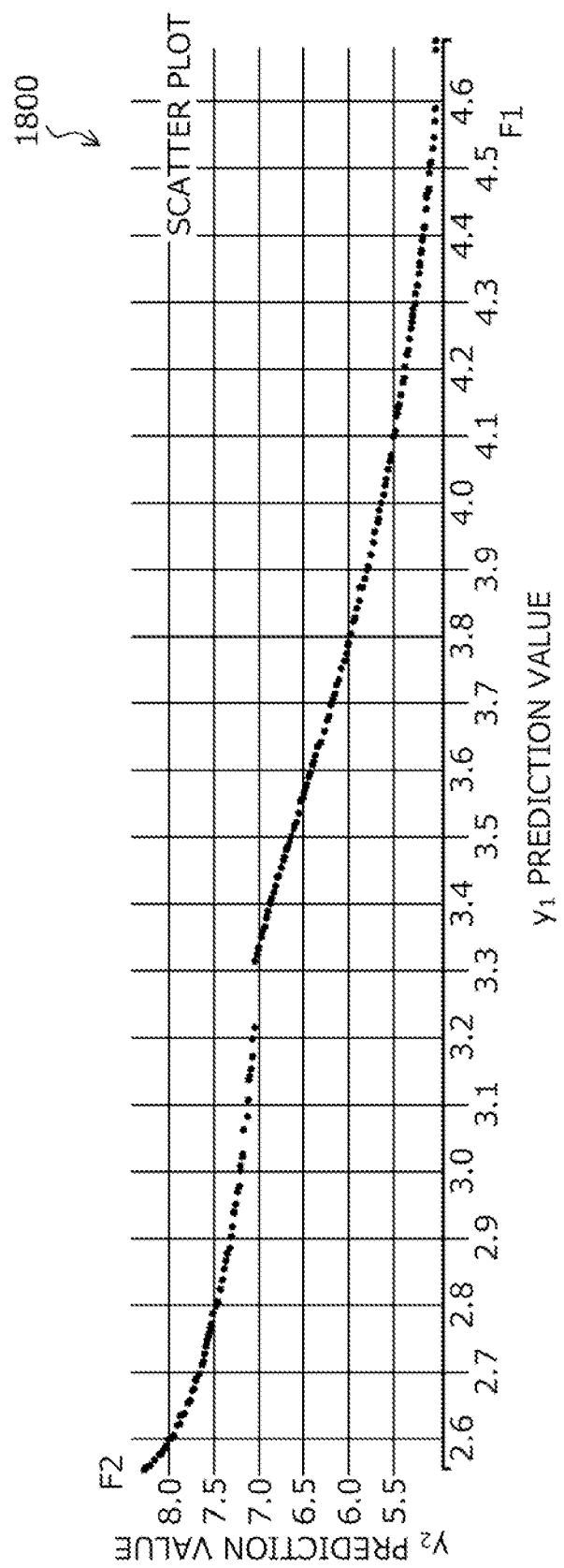
FIG. 18 is an explanatory diagram (part 14) illustrating the first operation example of the information processing apparatus 100.

In FIG. 18, on the basis of the $y_1$ model and the $y_2$ model, the information processing apparatus 100 performs multi-objective optimization by using the objective functions indicated in Expressions (11) and (12) described above. As a result of performing the multi-objective optimization, the information processing apparatus 100 generates a Pareto solution set indicated in a graph 1800. The graph 1800 is a scatter plot. Each point in the graph 1800 indicates a Pareto solution. A horizontal axis of the graph 1800 is the prediction value $\mu_1(x)$, and a vertical axis of the graph 1800 is the prediction value $\mu_2(x)$.

With this configuration, the information processing apparatus 100 may more accurately regenerate the Pareto solution set after updating the deviation threshold $\delta_1$, the deviation threshold $\delta_2$, and the like. Next, description of FIG. 19 will be made.

In FIG. 19, as indicated in a table 1901, the information processing apparatus 100 reads out the target value 2.65 of the characteristic value $y_1$ and the target value 5.00 of the characteristic value $y_2$. As indicated in the table 1901, the information processing apparatus 100 specifies a minimum value 2.56 of the characteristic value $y_1$ and a minimum value 5.03 of the characteristic value $y_2$ in the Pareto solution set indicated in the graph 1800.

The information processing apparatus 100 determines whether or not the minimum value 2.56 of the characteristic value $y_1$ is equal to or smaller than the target value 2.65 of the characteristic value $y_1$. Here, the information processing apparatus 100 determines that the characteristic value $y_1$ has been minimized to the extent requested by a user since the minimum value 2.56 of the characteristic value $y_1$ is equal to or smaller than the target value 2.65 of the characteristic value $y_1$, and does not update the deviation threshold $\delta_1$.

The information processing apparatus 100 determines whether or not the minimum value 5.03 of the characteristic value $y_2$ is equal to or smaller than the target value 5.00 of the characteristic value $y_2$. Here, the information processing apparatus 100 determines that minimization of the characteristic value $y_2$ is insufficient since the minimum value 5.03 of the characteristic value $y_2$ is greater than the target value 5.00 of the characteristic value $y_2$, and resets the deviation threshold $\delta_2$ to $\delta_2+t$ as indicated in a table 1902. Next, description of FIG. 20 will be made.

Figure 20:
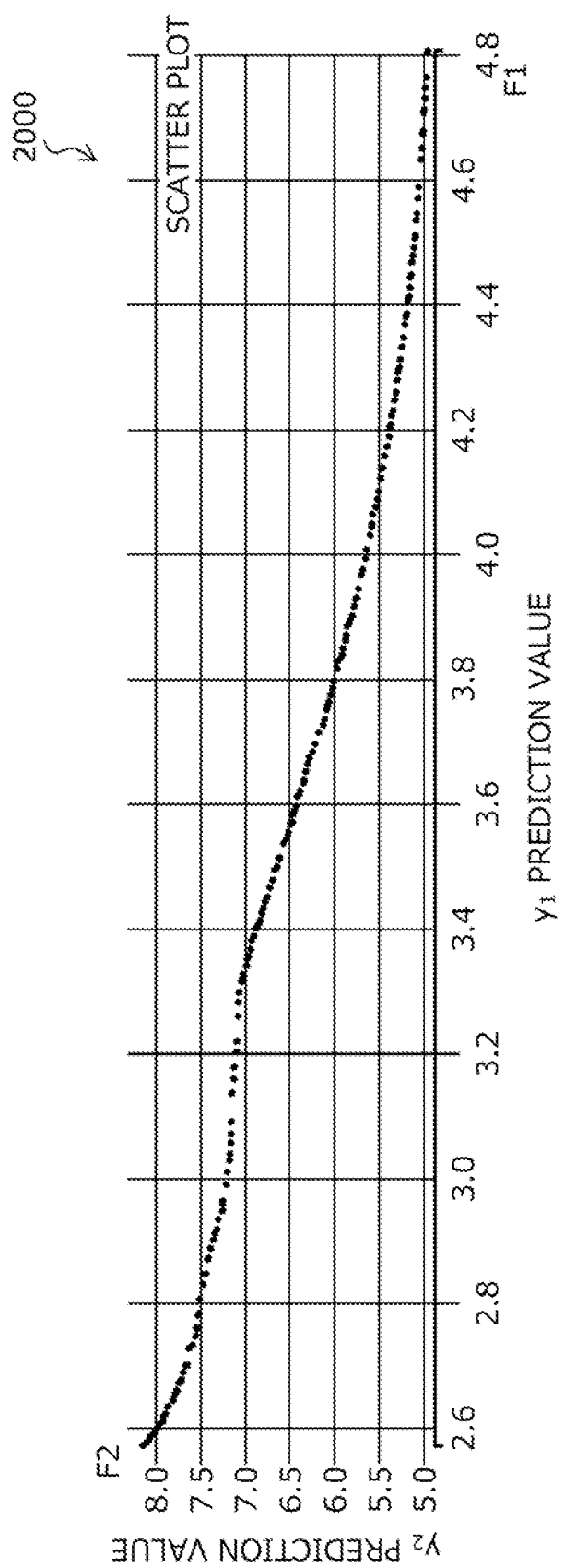
FIG. 20 is an explanatory diagram (part 16) illustrating the first operation example of the information processing apparatus 100.

In FIG. 20, on the basis of the $y_1$ model and the $y_2$ model, the information processing apparatus 100 performs multi-objective optimization by using the objective functions indicated in Expressions (11) and (12) described above. As a result of performing the multi-objective optimization, the information processing apparatus 100 generates a Pareto solution set indicated in a graph 2000. The graph 2000 is a scatter plot. Each point in the graph 2000 indicates a Pareto solution. A horizontal axis of the graph 2000 is the prediction value $\mu_1(x)$, and a vertical axis of the graph 2000 is the prediction value $\mu_2(x)$.

With this configuration, the information processing apparatus 100 may more accurately regenerate the Pareto solution set after updating the deviation threshold $\delta_1$, the deviation threshold $\delta_2$, and the like. Next, description of FIG. 21 will be made.

In FIG. 21, as indicated in a table 2101, the information processing apparatus 100 reads out the target value 2.65 of the characteristic value $y_1$ and the target value 5.00 of the characteristic value $y_2$. As indicated in the table 2101, the information processing apparatus 100 specifies a minimum value 2.57 of the characteristic value $y_1$ and a minimum value 4.94 of the characteristic value $y_2$ in the Pareto solution set indicated in the graph 2000.

The information processing apparatus 100 determines whether or not the minimum value 2.57 of the characteristic value $y_1$ is equal to or smaller than the target value 2.65 of the characteristic value $y_1$. Here, the information processing apparatus 100 determines that the characteristic value $y_1$ has been minimized to the extent that meets a request of a user since the minimum value 2.57 of the characteristic value $y_1$ is equal to or smaller than the target value 2.65 of the characteristic value $y_1$, and does not update the deviation threshold $\delta_1$.

The information processing apparatus 100 determines whether or not the minimum value 4.94 of the characteristic value $y_2$ is equal to or smaller than the target value 5.00 of the characteristic value $y_2$. Here, the information processing apparatus 100 determines that the characteristic value $y_2$ has been minimized to the extent that meets a request of a user since the minimum value 4.94 of the characteristic value $y_2$ is equal to or smaller than the target value 5.00 of the characteristic value $y_2$, and does not update the deviation threshold $\delta_2$.

Since the information processing apparatus 100 does not update the deviation threshold $\delta_1$ and the deviation threshold $\delta_2$, the processing ends without repeating the multi-objective optimization. With this configuration, the information processing apparatus 100 may accurately generate the Pareto solution set so that the characteristic value $y_1$ and the characteristic value $y_2$ satisfy the target values. Thus, the information processing apparatus 100 may generate the Pareto solution set that meets a request of a user. Next, description of FIG. 22 will be made.

Figure 22:
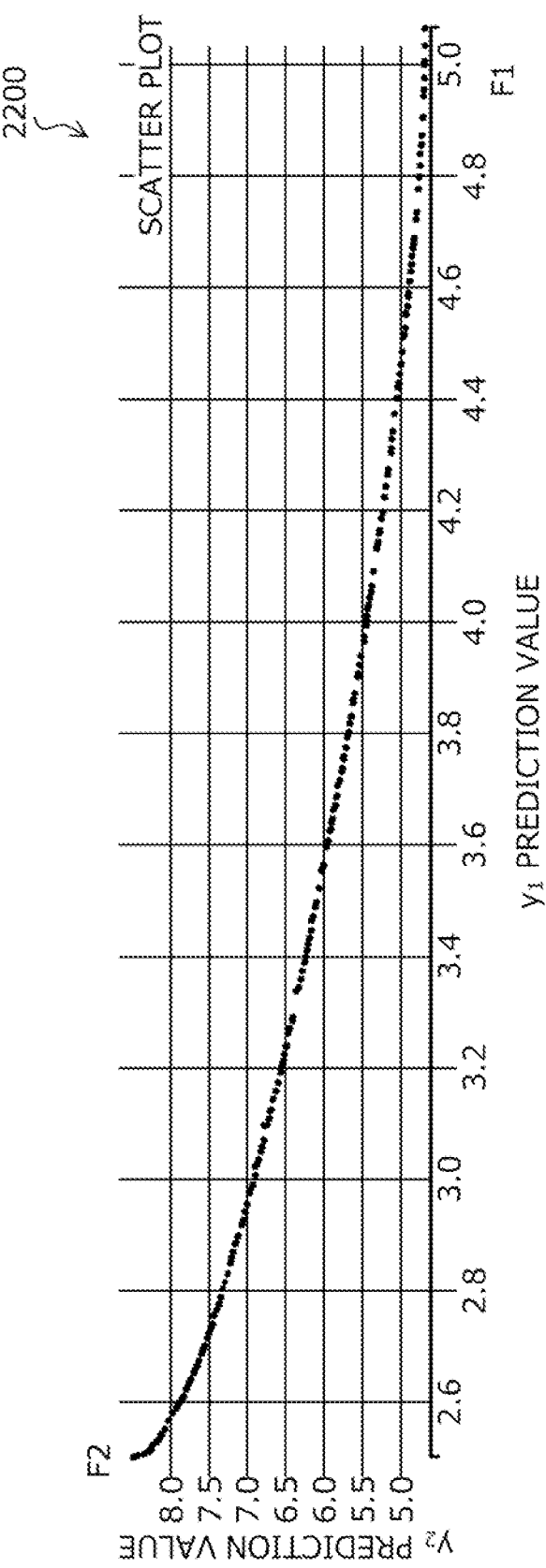
FIG. 22 is an explanatory diagram (part 18) illustrating the first operation example of the information processing apparatus 100.

In FIG. 22, one example of a Pareto solution set obtained by the prior art is indicated in a graph 2200. The graph 2200 is a scatter plot. Each point in the graph 2200 indicates a Pareto solution. A horizontal axis of the graph 2200 is the prediction value $\mu_1(x)$, and a vertical axis of the graph 2200 is the prediction value $\mu_2(x)$. Next, description of FIG. 23 will be made.

In FIG. 23, as indicated in a table 2300, in the Pareto solution set indicated in the graph 2200 obtained by the prior art, a relative error rate $E_{y1}^{max}$ of the characteristic value $y_1$ is 11.20, and a relative error rate $E_{y2}^{max}$ of the characteristic value $y_2$ is 7.49. On the other hand, in the Pareto solution set indicated in the graph 2000 obtained by the information processing apparatus 100, the relative error rate $E_{y1}^{max}$ of the characteristic value $y_1$ is 10.41, and the relative error rate $E_{y2}^{max}$ of the characteristic value $y_2$ is 5.52. As described above, the information processing apparatus 100 may generate the Pareto solution set more accurately than the prior art.

Here, the case has been described where the information processing apparatus 100 sets the deviation threshold to a relatively small value, and repeatedly performs the second multi-objective optimization while updating the deviation threshold to a greater value until each of the characteristic value $y_1$ and the characteristic value $y_2$ becomes equal to or less than the target value, but the present embodiment is not limited to this. For example, the information processing apparatus 100 may set the deviation threshold to a relatively great value, and repeatedly perform the second multi-objective optimization while updating the deviation threshold to a smaller value until each of the characteristic value $y_1$ and the characteristic value $y_2$ exceeds the target value. In this case, it is conceivable that the information processing apparatus 100 adopts, as a final result, a result of the second multi-objective optimization immediately before each of the characteristic value $y_1$ and the characteristic value $y_2$ exceeds the target value.

(Setting Processing Procedure in First Operation Example)

Next, one example of a setting processing procedure executed by the information processing apparatus 100 in the first operation example will be described with reference to FIG. 24. Setting processing is implemented by, for example, the CPU 301, the storage area such as the memory 302 or the recording medium 305, and the network I/F 303 illustrated in FIG. 3.

Figure 24:
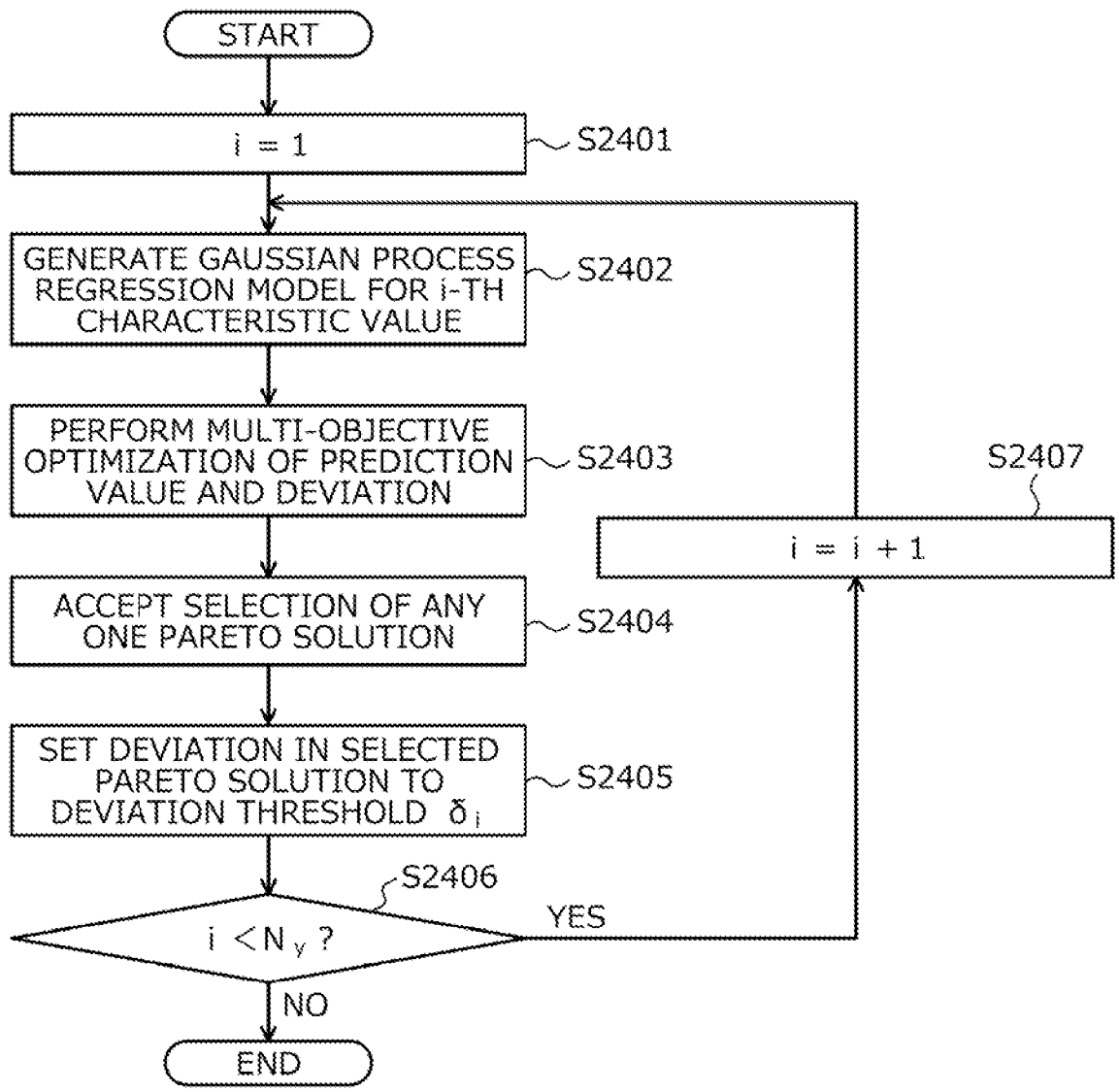
FIG. 24 is a flowchart illustrating one example of a setting processing procedure in the first operation example.

FIG. 24 is a flowchart illustrating the one example of the setting processing procedure in the first operation example. In FIG. 24, the information processing apparatus 100 sets i=1 (Step S2401).

Next, the information processing apparatus 100 generates a Gaussian process regression model for an i-th characteristic value (Step S2402). Then, the information processing apparatus 100 performs multi-objective optimization of a prediction value and a deviation by using the generated Gaussian process regression model (Step S2403).

Next, the information processing apparatus 100 accepts selection of any one Pareto solution in a Pareto solution set (Step S2404). Then, the information processing apparatus 100 sets a deviation in the selected Pareto solution to a deviation threshold $\delta_i$ (Step S2405).

Next, the information processing apparatus 100 determines whether or not i<$N_y$ holds (Step S2406). $N_y$ is the number of types of feature values. Here, in a case where i<$N_y$ holds (Step S2406: Yes), the information processing apparatus 100 sets i=i+1 (Step S2407), and returns to the processing of Step S2402. On the other hand, in a case where i<$N_y$ does not hold (Step S2406: No), the information processing apparatus 100 ends the setting processing.

(Solution Processing Procedure in First Operation Example)

Next, one example of a solution processing procedure executed by the information processing apparatus 100 in the first operation example will be described with reference to FIG. 25. Solution processing is implemented by, for example, the CPU 301, the storage area such as the memory 302 or the recording medium 305, and the network I/F 303 illustrated in FIG. 3.

Figure 25:
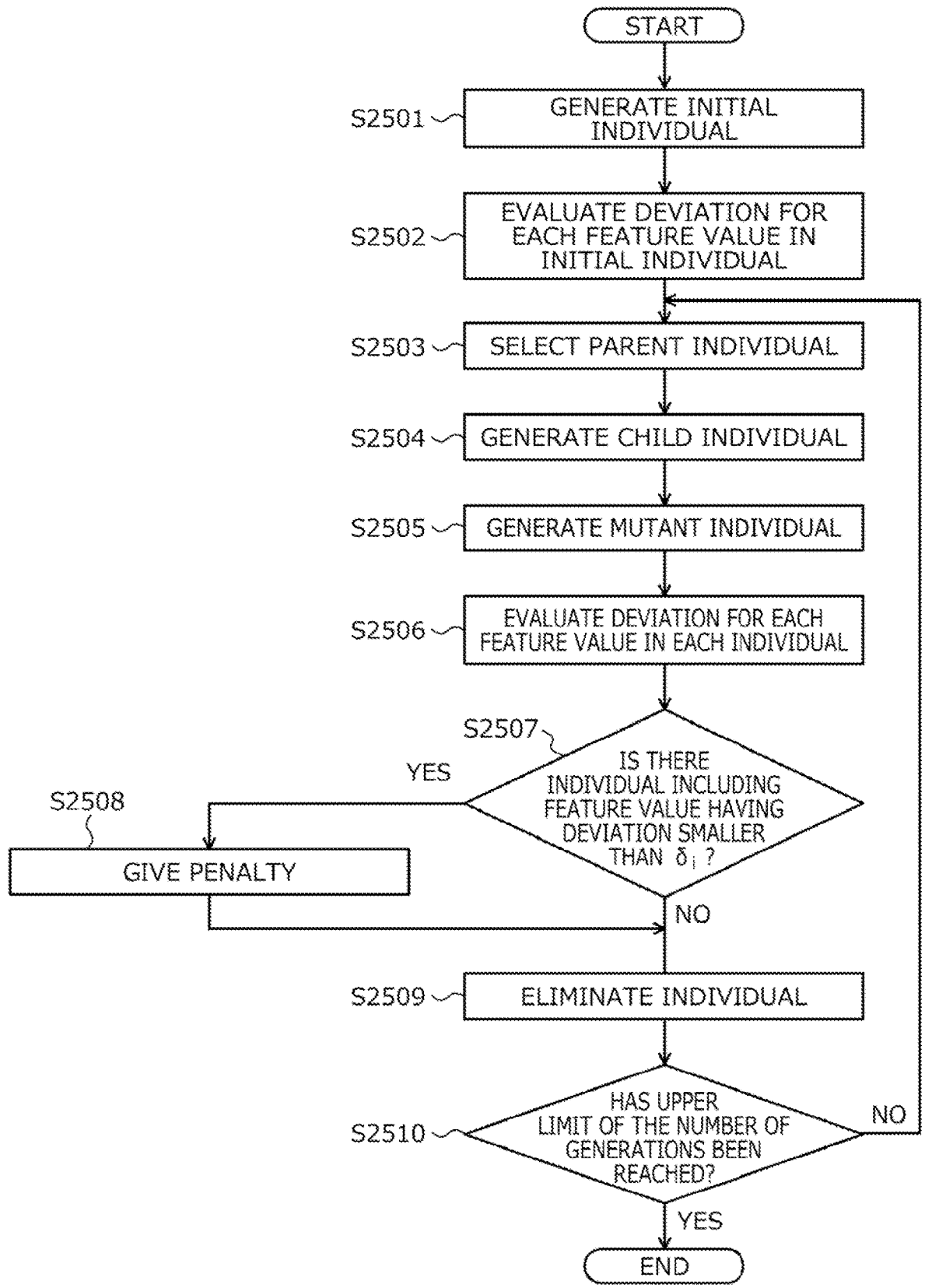
FIG. 25 is a flowchart illustrating one example of a solution processing procedure in the first operation example.

FIG. 25 is a flowchart illustrating the one example of the solution processing procedure in the first operation example. In FIG. 25, the information processing apparatus 100 generates one or more initial individuals, each of which indicates a Pareto solution candidate, and sets the one or more initial individuals as a population (Step S2501). Then, the information processing apparatus 100 evaluates a deviation for each feature value in each initial individual by using the Gaussian process regression model (Step S2502).

Next, the information processing apparatus 100 selects a parent individual from the population (Step S2503). Then, the information processing apparatus 100 generates a child individual from the selected parent individual, and adds the child individual to the population (Step S2504).

Next, the information processing apparatus 100 generates a mutant individual, and adds the mutant individual to the population (Step S2505). Then, the information processing apparatus 100 evaluates a deviation for each feature value in each individual of the population by using the Gaussian process regression model (Step S2506).

Next, the information processing apparatus 100 determines whether or not there is an individual including a feature value having a deviation smaller than the deviation threshold $\delta_i$ in the population (Step S2507). Here, in a case where there is no individual including a feature value having a deviation smaller than the deviation threshold $\delta_i$ (Step S2507: No), the information processing apparatus 100 proceeds to processing of Step S2509. On the other hand, in a case where there is an individual including a feature value having a deviation smaller than the deviation threshold $\delta_i$ (Step S2507: Yes), the information processing apparatus 100 proceeds to processing of Step S2508.

In Step S2508, the information processing apparatus 100 gives a penalty to the individual including the feature value having the deviation smaller than the deviation threshold $\delta_i$ in the population (Step S2508). Next, the information processing apparatus 100 eliminates the individual included in the population to remove the individual from the population (Step S2509).

Then, the information processing apparatus 100 determines whether or not an upper limit of the number of generations has been reached (Step S2510). Here, in a case where the upper limit of the number of generations has not been reached (Step S2510: No), the information processing apparatus 100 returns to the processing of Step S2503. On the other hand, in a case where the upper limit of the number of generations has been reached (Step S2510: Yes), the information processing apparatus 100 ends the solution processing.

(Update Processing Procedure in First Operation Example)

Next, one example of an update processing procedure executed by the information processing apparatus 100 in the first operation example will be described with reference to FIG. 26. Update processing is implemented by, for example, the CPU 301, the storage area such as the memory 302 or the recording medium 305, and the network I/F 303 illustrated in FIG. 3.

Figure 26:
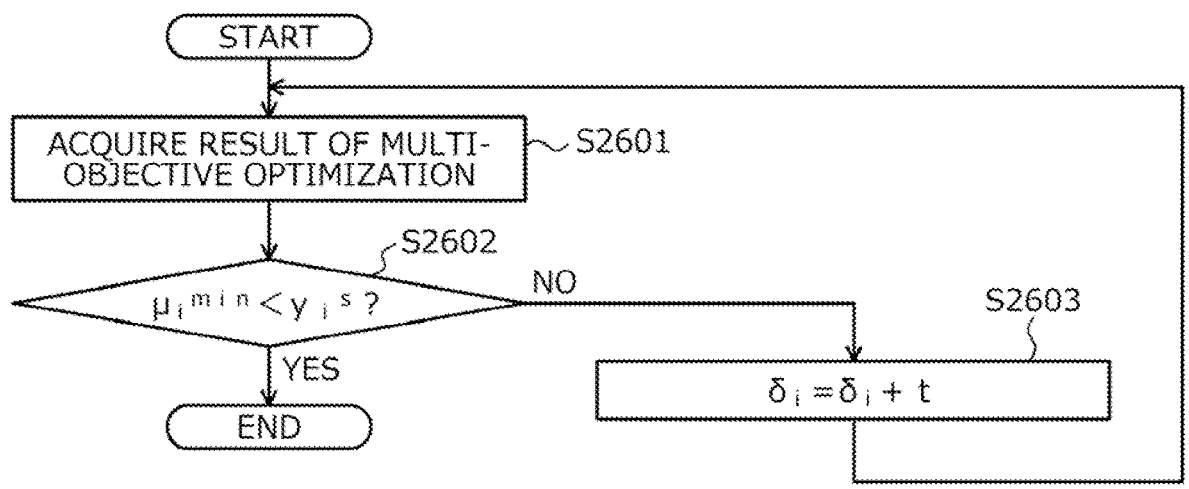
FIG. 26 is a flowchart illustrating one example of an update processing procedure in the first operation example.

FIG. 26 is a flowchart illustrating the one example of the update processing procedure in the first operation example. In FIG. 26, the information processing apparatus 100 acquires a result of the multi-objective optimization by the solution processing (Step S2601).

Next, the information processing apparatus 100 determines whether or not $\mu_i^{min} < y_i^s$ holds on the basis of the acquired result of the multi-objective optimization (Step S2602). $\mu_i^{min}$ is a minimum value of the i-th characteristic value in the result of the multi-objective optimization. $y_i^s$ is the i-th characteristic value in the selected Pareto solution.

Here, in a case where $\mu_i^{min} < y_i^s$ does not hold (Step S2602: No), the information processing apparatus 100 performs update to $\delta_i = \delta_i + t$ (Step S2603), and returns to the processing of Step S2601. On the other hand, in a case where $\mu_i^{min} < y_i^s$ holds (Step S2602: Yes), the information processing apparatus 100 ends the update processing.

(Second Operation Example of Information Processing Apparatus 100)

Next, a second operation example of the information processing apparatus 100 will be described with reference to FIGS. 27 to 32. The first operation example is an operation example in the case of including the processing of updating the deviation threshold $\delta_i$ so that the value increases. On the other hand, the second operation example is an operation example in the case of including processing of updating the deviation threshold $\delta_i$ so that the value decreases in addition to the processing of updating the deviation threshold $\delta_i$ so that the value increases.

FIGS. 27 to 32 are explanatory diagrams illustrating the second operation example of the information processing apparatus 100. In FIGS. 27 to 32, a case of solving the mixture optimization problem will be described as in the first operation example. As in the first operation example, it is assumed that the information processing apparatus 100 generates the $y_1$ model as the Gaussian process regression model corresponding to the characteristic value $y_1$ on the basis of the training data. As in the first operation example, it is assumed that the information processing apparatus 100 generates the $y_2$ model as the Gaussian process regression model corresponding to the characteristic value $y_2$.

As in the first operation example, it is assumed that the information processing apparatus 100 accepts specification of the target value 2.65 of the characteristic value $y_1$, specifies the deviation $\delta_1(x)$ corresponding to the specified target value 2.65 in the Pareto solution set indicated in the graph 1000, and sets the deviation $\delta_1(x)$ as the deviation threshold $\delta_1$. As in the first operation example, it is assumed that the information processing apparatus 100 accepts specification of the target value 5.0 of the characteristic value $y_2$, specifies the deviation $\delta_2(x)$ corresponding to the specified target value 5.0 in the Pareto solution set indicated in the graph 1200, and sets the deviation $\delta_2(x)$ as the deviation threshold $\delta_2$. As in the first operation example, the information processing apparatus 100 sets Expressions (11) and (12) described above. Next, description of FIG. 27 will be made.

Figure 27:
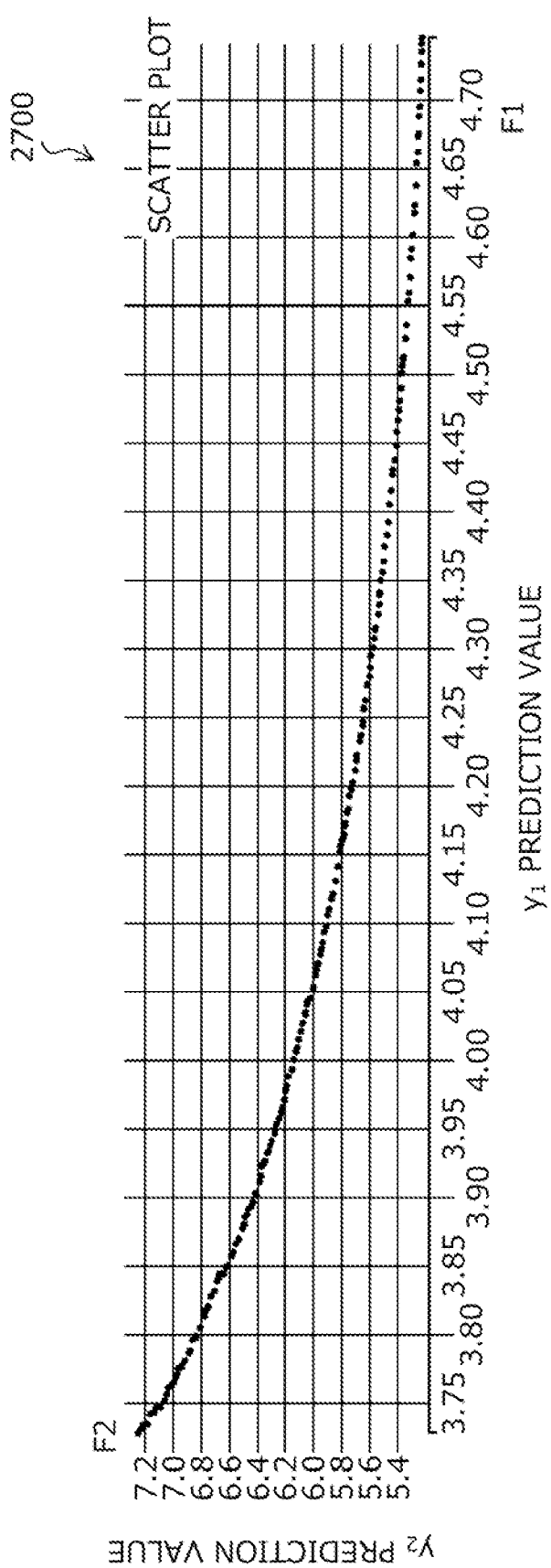
FIG. 27 is an explanatory diagram (part 1) illustrating a second operation example of the information processing apparatus 100.

In FIG. 27, on the basis of the $y_1$ model and the $y_2$ model, the information processing apparatus 100 performs multi-objective optimization by using the objective functions indicated in Expressions (11) and (12) described above. As a result of performing the multi-objective optimization, the information processing apparatus 100 generates a Pareto solution set indicated in a graph 2700. The graph 2700 is a scatter plot. Each point in the graph 2700 indicates a Pareto solution. A horizontal axis of the graph 2700 is the prediction value $\mu_1(x)$, and a vertical axis of the graph 2700 is the prediction value $\mu_2(x)$.

With this configuration, the information processing apparatus 100 may facilitate generation of a Pareto solution set with high accuracy in consideration of reliability of the $y_1$ model and the $y_2$ model. Next, description of FIG. 28 will be made.

In FIG. 28, as indicated in a table 2801, the information processing apparatus 100 reads out the target value 2.65 of the characteristic value $y_1$ and the target value 5.00 of the characteristic value $y_2$. As indicated in the table 2801, the information processing apparatus 100 specifies the minimum value 3.73 of the characteristic value $y_1$ and the minimum value 5.23 of the characteristic value $y_2$ in the Pareto solution set indicated in the graph 2700.

The information processing apparatus 100 determines whether or not the minimum value 3.73 of the characteristic value $y_1$ is equal to or smaller than the target value 2.65 of the characteristic value $y_1$. Here, the information processing apparatus 100 determines that minimization of the characteristic value $y_1$ is insufficient since the minimum value 3.73 of the characteristic value $y_1$ is greater than the target value 2.65 of the characteristic value $y_1$, and resets the deviation threshold $\delta_1$ to $\delta_1$+t as indicated in a table 2802. t is a step size. t is, for example, 0.2.

The information processing apparatus 100 determines whether or not the minimum value 5.23 of the characteristic value $y_2$ is equal to or smaller than the target value 5.00 of the characteristic value $y_2$. Here, the information processing apparatus 100 determines that minimization of the characteristic value $y_2$ is insufficient since the minimum value 5.23 of the characteristic value $y_2$ is greater than the target value 5.00 of the characteristic value $y_2$, and resets the deviation threshold $\delta_2$ to $\delta_2$+t as indicated in the table 2802. Next, description of FIG. 29 will be made.

Figure 29:
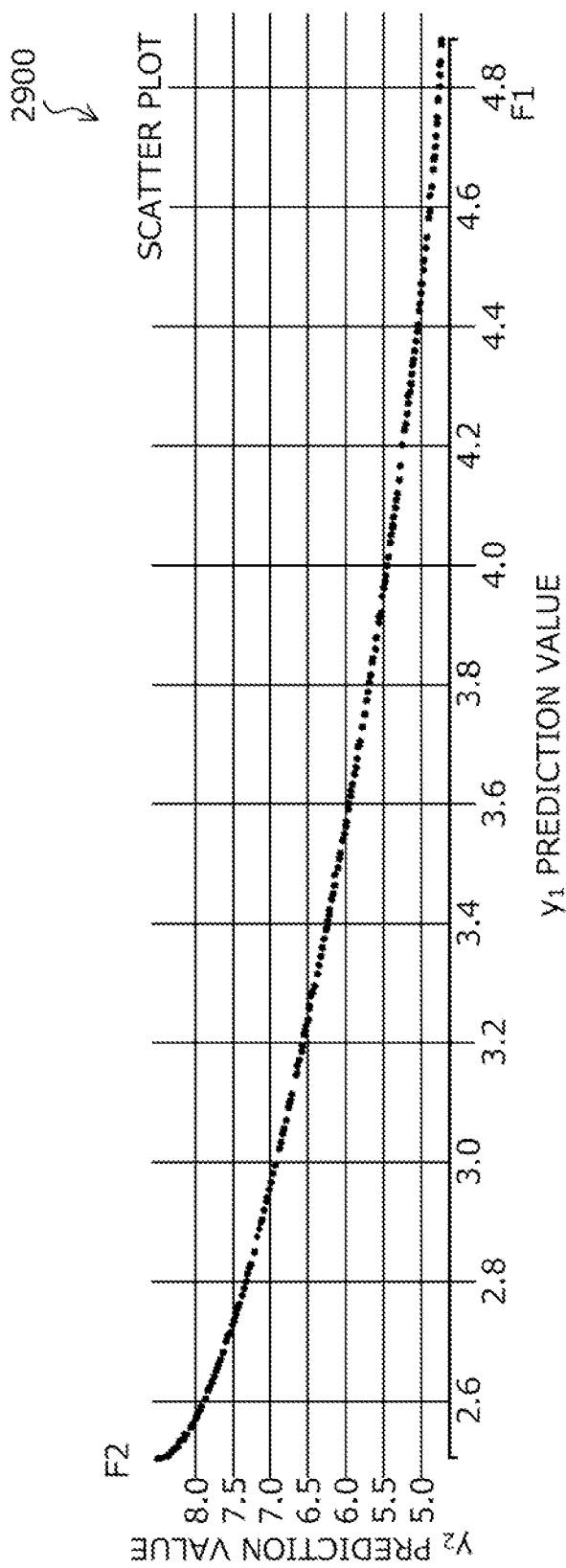
FIG. 29 is an explanatory diagram (part 3) illustrating the second operation example of the information processing apparatus 100.

In FIG. 29, on the basis of the $y_1$ model and the $y_2$ model, the information processing apparatus 100 performs multi-objective optimization by using the objective functions indicated in Expressions (11) and (12) described above. As a result of performing the multi-objective optimization, the information processing apparatus 100 generates a Pareto solution set indicated in a graph 2900. The graph 2900 is a scatter plot. Each point in the graph 2900 indicates a Pareto solution. A horizontal axis of the graph 2900 is the prediction value $\mu_1(x)$, and a vertical axis of the graph 2900 is the prediction value $\mu_2(x)$.

With this configuration, the information processing apparatus 100 may more accurately regenerate the Pareto solution set after updating the deviation threshold $\delta_1$, the deviation threshold $\delta_2$, and the like. Next, description of FIG. 30 will be made.

In FIG. 30, as indicated in a table 3001, the information processing apparatus 100 reads out the target value 2.65 of the characteristic value $y_1$ and the target value 5.00 of the characteristic value $y_2$. As indicated in the table 3001, the information processing apparatus 100 specifies a minimum value 2.50 of the characteristic value $y_1$ and a minimum value 4.72 of the characteristic value $y_2$ in the Pareto solution set indicated in the graph 2900.

The information processing apparatus 100 determines whether or not the minimum value 2.50 of the characteristic value $y_1$ is equal to or smaller than the target value 2.65 of the characteristic value $y_1$. Here, the information processing apparatus 100 determines that the characteristic value $y_1$ has been minimized to the extent requested by a user since the minimum value 2.50 of the characteristic value $y_1$ is equal to or smaller than the target value 2.65 of the characteristic value $y_1$. The information processing apparatus 100 further determines whether or not the minimum value 2.50 of the characteristic value $y_1$ is within an allowable range of equal to or smaller than the target value 2.65 of the characteristic value $y_1$. A length of the allowable range is, for example, 0.15.

The information processing apparatus 100 determines, for example, whether or not the minimum value 2.50 of the characteristic value $y_1$ is greater than the target value 2.65–0.15 of the characteristic value $y_1$. The information processing apparatus 100 determines that, for example, a search space is too wide since the minimum value 2.50 of the characteristic value $y_1$ is not greater than the target value 2.65−0.15=2.50 of the characteristic value $y_1$, and resets the deviation threshold $\delta_1$ to $67_1$–t' as indicated in a table 3002. For example, t'=1/4t.

The information processing apparatus 100 determines whether or not the minimum value 4.72 of the characteristic value $y_2$ is equal to or smaller than the target value 5.00 of the characteristic value $y_2$. Here, the information processing apparatus 100 determines that the characteristic value $y_2$ has been minimized to the extent that meets a request of a user since the minimum value 4.72 of the characteristic value $y_2$ is equal to or smaller than the target value 5.00 of the characteristic value $y_2$. The information processing apparatus 100 further determines whether or not the minimum value 4.72 of the characteristic value $y_2$ is within an allowable range of equal to or smaller than the target value 5.00 of the characteristic value $y_2$.

The information processing apparatus 100 determines, for example, whether or not the minimum value 4.72 of the characteristic value $y_2$ is greater than the target value 5.00-0.15 of the characteristic value $y_2$. The information processing apparatus 100 determines that, for example, a search space is too wide since the minimum value 4.72 of the characteristic value $y_2$ is not greater than the target value 5.00-0.15=4.85 of the characteristic value $y_2$, and resets the deviation threshold $\delta_2$ to $\delta_2-t'$ as indicated in the table 3002. Next, description of FIG. 31 will be made.

Figure 31:
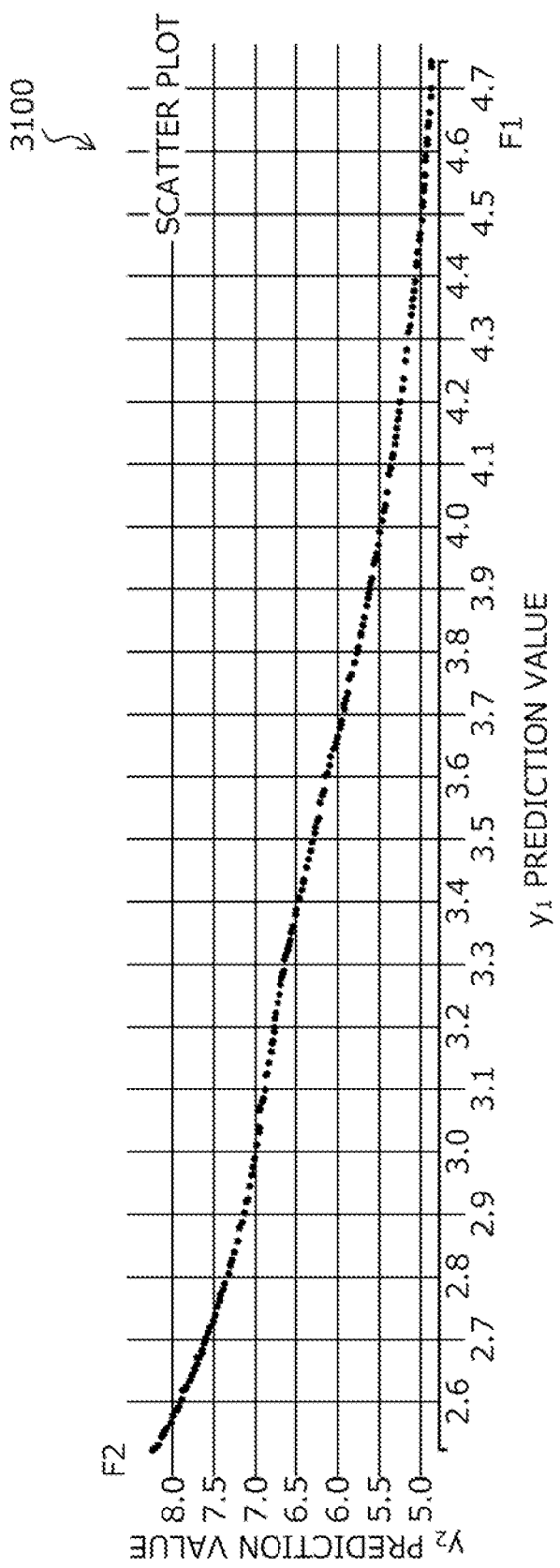
FIG. 31 is an explanatory diagram (part 5) illustrating the second operation example of the information processing apparatus 100.

In FIG. 31, on the basis of the $y_i$ model and the $y_2$ model, the information processing apparatus 100 performs multi-objective optimization by using the objective functions indicated in Expressions (11) and (12) described above. As a result of performing the multi-objective optimization, the information processing apparatus 100 generates a Pareto solution set indicated in a graph 3100. The graph 3100 is a scatter plot. Each point in the graph 3100 indicates a Pareto solution. A horizontal axis of the graph 3100 is the prediction value $\mu_1(x)$, and a vertical axis of the graph 3100 is the prediction value $\mu_2(x)$.

With this configuration, the information processing apparatus 100 may more accurately regenerate the Pareto solution set after updating the deviation threshold $\delta_1$, the deviation threshold $\delta_2$, and the like. The information processing apparatus 100 may, for example, regenerate the Pareto solution set more accurately after appropriately narrowing a search range. Next, description of FIG. 32 will be made.

In FIG. 32, as indicated in a table 3201, the information processing apparatus 100 reads out the target value 2.65 of the characteristic value $y_1$ and the target value 5.00 of the characteristic value $y_2$. As indicated in the table 3201, the information processing apparatus 100 specifies a minimum value 2.52 of the characteristic value $y_1$ and a minimum value 4.86 of the characteristic value $y_2$ in the Pareto solution set indicated in the graph 3100.

The information processing apparatus 100 determines whether or not the minimum value 2.52 of the characteristic value $y_1$ is equal to or smaller than the target value 2.65 of the characteristic value $y_1$. Here, the information processing apparatus 100 determines that the characteristic value $y_1$ has been minimized to the extent that meets a request of a user since the minimum value 2.52 of the characteristic value $y_1$ is equal to or smaller than the target value 2.65 of the characteristic value $y_1$. The information processing apparatus 100 further determines whether or not the minimum value 2.52 of the characteristic value $y_1$ is within an allowable range of equal to or smaller than the target value 2.65 of the characteristic value $y_1$.

The information processing apparatus 100 determines, for example, whether or not the minimum value 2.52 of the characteristic value $y_1$ is greater than the target value 2.65-0.15 of the characteristic value $y_1$. For example, since the minimum value 2.52 of the characteristic value $y_1$ is greater than the target value 2.65-0.15=2.50 of the characteristic value $y_1$, the information processing apparatus 100 does not update the deviation threshold $\delta_1$.

The information processing apparatus 100 determines whether or not the minimum value 4.86 of the characteristic value $y_2$ is equal to or smaller than the target value 5.00 of the characteristic value $y_2$. Here, the information processing apparatus 100 determines that the characteristic value $y_2$ has been minimized to the extent that meets a request of a user since the minimum value 4.86 of the characteristic value $y_2$ is equal to or smaller than the target value 5.00 of the characteristic value $y_2$. The information processing apparatus 100 further determines whether or not the minimum value 4.86 of the characteristic value $y_2$ is within an allowable range of equal to or smaller than the target value 5.00 of the characteristic value $y_2$.

The information processing apparatus 100 determines, for example, whether or not the minimum value 4.86 of the characteristic value $y_2$ is greater than the target value 5.00-0.15 of the characteristic value $y_2$. For example, since the minimum value 4.86 of the characteristic value $y_2$ is greater than the target value 5.00-0.15=4.85 of the characteristic value $y_2$, the information processing apparatus 100 does not update the deviation threshold $\delta_2$.

Since the information processing apparatus 100 does not update the deviation threshold $\delta_1$ and the deviation threshold $\delta_2$, the processing ends without repeating the multi-objective optimization. With this configuration, the information processing apparatus 100 may accurately generate the Pareto solution set so that the characteristic value $y_i$ and the characteristic value $y_2$ satisfy the target values. Thus, the information processing apparatus 100 may generate the Pareto solution set that meets a request of a user.

(Setting Processing Procedure in Second Operation Example)

Since one example of a setting processing procedure in the second operation example is similar to the one example of the setting processing procedure in the first operation example illustrated in FIG. 24, description thereof will be omitted.

(Solution Processing Procedure in Second Operation Example)

Since one example of a solution processing procedure in the second operation example is similar to the one example of the solution processing procedure in the first operation example illustrated in FIG. 25, description thereof will be omitted.

(Update Processing Procedure in Second Operation Example)

Next, one example of an update processing procedure executed by the information processing apparatus 100 in the second operation example will be described with reference to FIG. 33. Update processing is implemented by, for example, the CPU 301, the storage area such as the memory 302 or the recording medium 305, and the network I/F 303 illustrated in FIG. 3.

Figure 33:
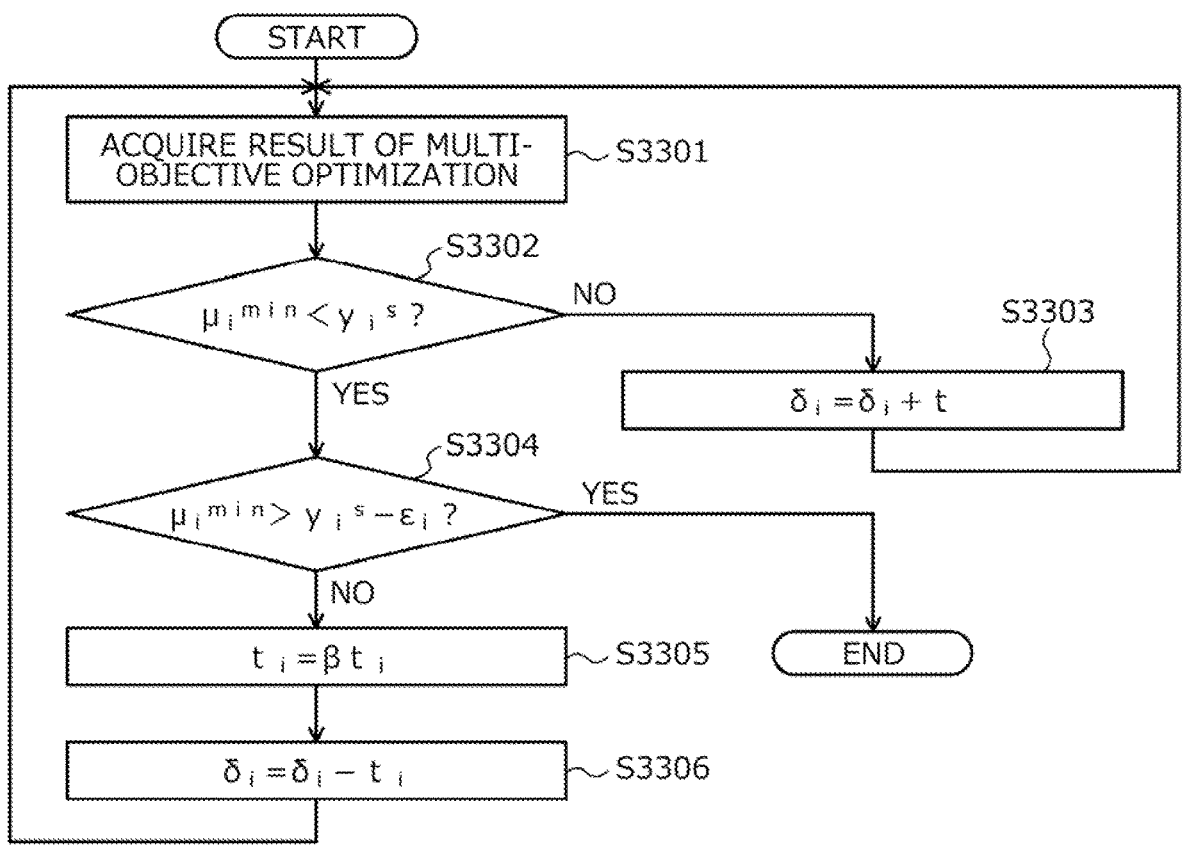
FIG. 33 is a flowchart illustrating one example of an update processing procedure in the second operation example.

FIG. 33 is a flowchart illustrating the one example of the update processing procedure in the second operation example. In FIG. 33, the information processing apparatus 100 acquires a result of the multi-objective optimization by the solution processing (Step S3301).

Next, the information processing apparatus 100 determines whether or not $\mu_i^{min} < y_i^s$ holds (Step S3302). Here, in a case where $\mu_i^{min} < y_i^s$ does not hold (Step S3302: No), the information processing apparatus 100 performs update to $\delta_i = \delta_i + t$ (Step S3303), and returns to the processing of Step S3301. On the other hand, in a case where $\mu_i^{min} < y_i^s$ holds (Step S3302: Yes), the information processing apparatus 100 proceeds to processing of Step S3304.

In Step S3304, the information processing apparatus 100 determines whether or not $\mu_i^{min} > y_i^s - \varepsilon_i$ holds (Step S3304). $\varepsilon_i$ is, for example, >0.15. Here, in a case where $\mu_i^{min} > y_i^s - \varepsilon_i$ holds (Step S3304: Yes), the information processing apparatus 100 ends the update processing. On the other hand, in a case where $\mu_i^{min} > y_i^s - \varepsilon_i$ does not hold (Step S3304: No), the information processing apparatus 100 proceeds to processing of Step S3305.

In Step S3305, the information processing apparatus 100 performs update to $t_i = \beta t_i$ (Step S3305). β is, for example, ¼. An initial value of $t_i$ is, for example, 0.2. Next, the information processing apparatus 100 performs update to $\delta_i = \delta_i - t_i$ (Step S3306). Then, the information processing apparatus 100 returns to the processing of Step S3301.

(Third Operation Example of Information Processing Apparatus 100)

Next, a third operation example of the information processing apparatus 100 will be described with reference to FIGS. 34 to 38. The first operation example and the second operation example are operation examples corresponding to the case of facilitating the search for the Pareto solution for the characteristic value having the relatively small deviation and the relatively high reliability. On the other hand, the third operation example is an operation example corresponding to a case of attempting to search for a Pareto solution for a characteristic value having a relatively great deviation and relatively low reliability.

Figure 34:
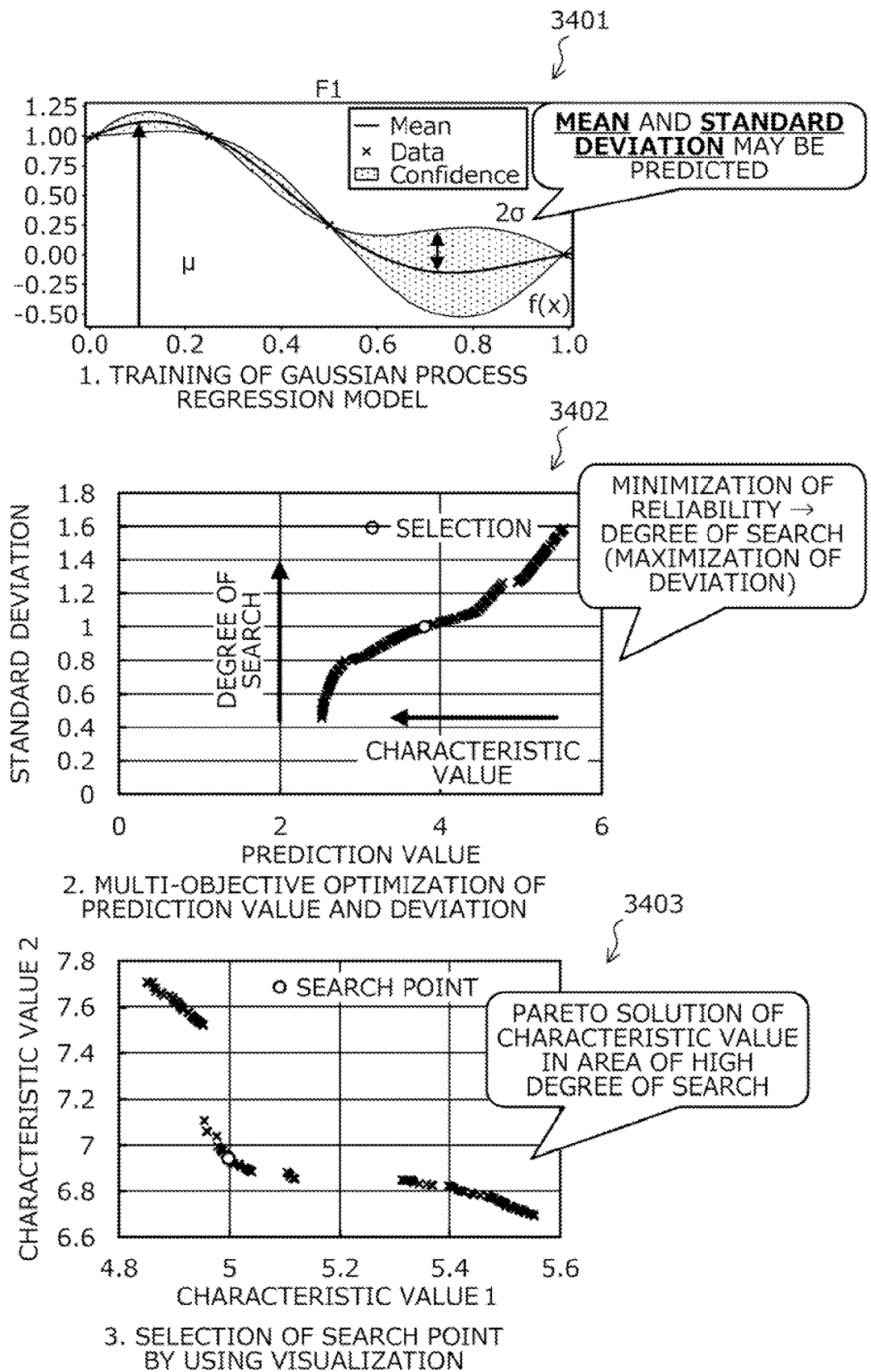
FIG. 34 is an explanatory diagram (part 1) illustrating a third operation example of the information processing apparatus 100.

FIGS. 34 to 38 are explanatory diagrams illustrating the third operation example of the information processing apparatus 100. For example, FIG. 34 illustrates an operation flow of the information processing apparatus 100 in the third operation example. In FIG. 34, the information processing apparatus 100 has a plurality of pieces of training data. The training data indicates, for example, values of a plurality of explanatory variables and correct answer values of a plurality of characteristic variables corresponding to the values of the plurality of explanatory variables.

(34-1) The information processing apparatus 100 trains, for each characteristic variable, a Gaussian process regression model on the basis of the plurality of pieces of training data. The Gaussian process regression model is, for example, f(x) that makes it possible to calculate a mean p corresponding to the values of the characteristic variables.

The Gaussian process regression model further indicates, for example, instability of the value of the characteristic variable, and makes it possible to calculate a deviation δ corresponding to an index value indicating reliability of the value of the characteristic variable. The deviation δ is, for example, a standard deviation. The deviation δ has a property that the value decreases as the reliability increases. The deviation δ corresponds to, for example, a degree of search. A relationship between the mean μ, the deviation δ, and the training data is indicated in, for example, the graph 3401.

(34-2) The information processing apparatus 100 performs the first multi-objective optimization for each characteristic variable to generate a Pareto solution set of a combination of a value of the characteristic variable and a deviation of the value of the characteristic variable. The value of the characteristic variable is predicted by, for example, the Gaussian process regression model. The deviation of the value of the characteristic variable is calculated by, for example, the Gaussian process regression model.

Here, it is assumed that the smaller value of the characteristic variable is preferable for a user. Thus, the first multi-objective optimization is performed by using, for example, an objective function that minimizes the value of the characteristic variable and an objective function that maximizes the deviation of the value of the characteristic variable. In the first multi-objective optimization, by using the objective function that maximizes the deviation of the value of the characteristic variable, it is possible to facilitate search for a Pareto solution for a characteristic value that is considered to have a relatively great deviation, relatively low reliability, and a relatively small number of training data.

Instead of the deviation of the value of the characteristic variable, the information processing apparatus 100 may use the index value indicating the reliability of the value of the characteristic variable based on a distance from the value of the characteristic variable included in the training data to a value of a characteristic variable predicted by the model. The information processing apparatus 100 generates, for example, a Pareto solution set indicated in a graph 3402 for the respective characteristic variables. Each point in the graph 3402 indicates, for example, a Pareto solution.

The information processing apparatus 100 outputs, for the respective characteristic variables, the generated Pareto solution set indicated in the graph 3402 so that a user may refer to the Pareto solution set, and then accepts specification of a value of any one of the characteristic variables. The user specifies the value of any one of the characteristic variables with reference to, for example, the Pareto solution set indicated in the graph 3402.

The information processing apparatus 100 sets, for each characteristic variable, a deviation in a Pareto solution in which a characteristic variable becomes a specified value as a deviation threshold for the characteristic variable. For example, the information processing apparatus 100 sets, for an i-th characteristic variable, a deviation in a Pareto solution in which a characteristic variable becomes a specified value as a deviation threshold $\delta_i$ for the i-th characteristic variable.

(34-3) The information processing apparatus 100 performs the second multi-objective optimization for the whole of the plurality of characteristic variables to generate a Pareto solution set of a combination of values of the respective characteristic variables. The values of the respective characteristic variables are predicted by, for example, the Gaussian process regression model.

For example, the information processing apparatus 100 sets, for each characteristic variable, an objective function that optimizes a value of the characteristic variable, including a penalty term based on the specified deviation threshold. For example, the information processing apparatus 100 sets, for the i-th characteristic variable, an objective function that optimizes the i-th characteristic variable, including a penalty term based on the specified deviation threshold $\delta_i$.

The penalty term is 0 in a case where, for example, a deviation of a value of the i-th characteristic variable predicted by the Gaussian process regression model is equal to or greater than the specified deviation threshold $\delta_i$. In a case where, for example, the deviation of the value of the i-th characteristic variable predicted by the Gaussian process regression model is smaller than the specified deviation threshold $\delta_i$, the penalty term is a positive value so that a Pareto solution candidate including the value may be easily eliminated. The positive value is, for example, a variable value based on the specified deviation threshold $\delta_i$. The positive value may be, for example, a fixed value. For example, the information processing apparatus 100 performs the second multi-objective optimization by using the set objective function to generate a Pareto solution set indicated in a graph 3403. Each point in the graph 3403 indicates, for example, a Pareto solution.

With this configuration, the information processing apparatus 100 may optimize the value of each characteristic variable. The information processing apparatus 100 may, for example, perform the second multi-objective optimization in consideration of the degree of search in consideration of the reliability of the Gaussian process regression model, and obtain various Pareto solution sets of combinations of values of the respective characteristic variables. Thus, the information processing apparatus 100 may promote improvement in convenience. Next, description of FIGS. 35 to 38 will be made.

Figure 35:
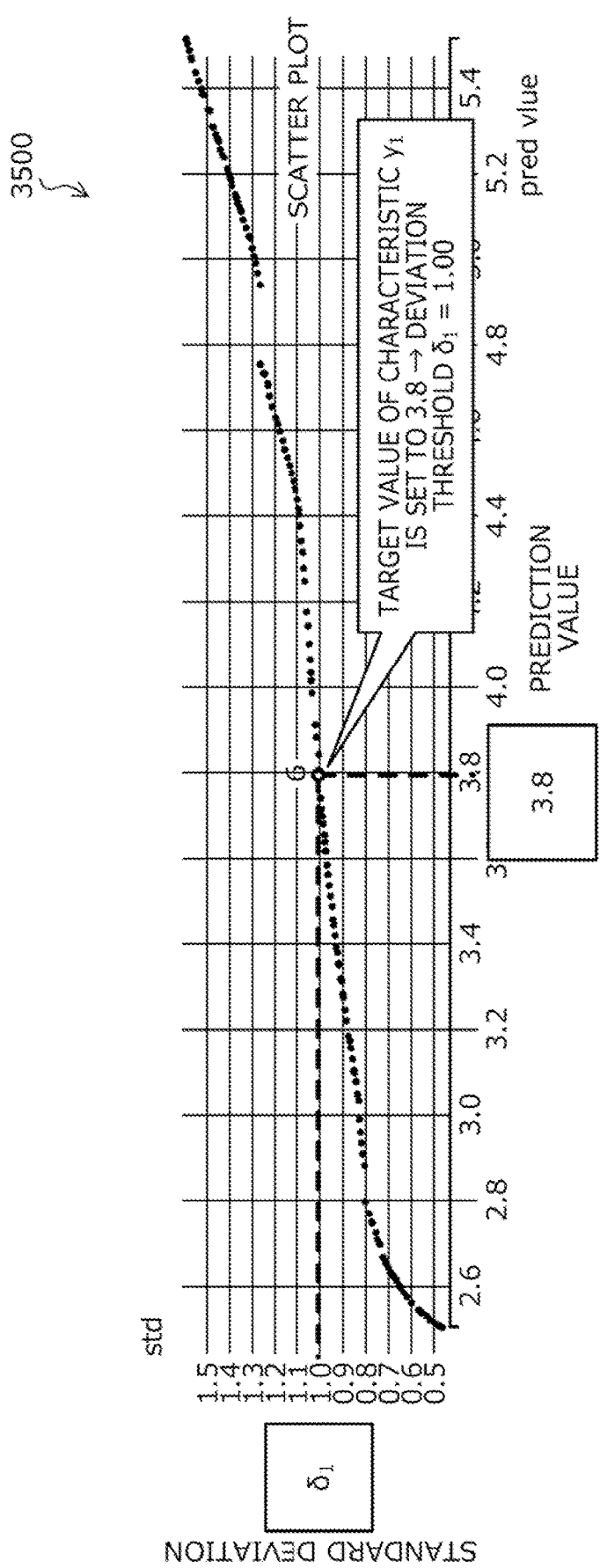
FIG. 35 is an explanatory diagram (part 2) illustrating the third operation example of the information processing apparatus 100.

For example, FIGS. 35 to 38 illustrate the third operation example of the information processing apparatus 100. In FIGS. 35 to 38, a case of solving the mixture optimization problem will be described as in the first operation example. In FIG. 35, as in the first operation example, it is assumed that the information processing apparatus 100 generates the $y_1$ model as the Gaussian process regression model corresponding to the characteristic value $y_1$ on the basis of the training data. As in the first operation example, it is assumed that the information processing apparatus 100 generates the $y_2$ model as the Gaussian process regression model corresponding to the characteristic value $y_2$.

In FIG. 35, on the basis of the $y_i$ model, the information processing apparatus 100 performs multi-objective optimization by using an objective function that optimizes the prediction value $\mu_1(x)$ of the characteristic value $y_1$ indicated in the following Expression (13) and an objective function that optimizes the deviation $\delta_1(x)$ indicated in the following Expression (14).

As a result of performing the multi-objective optimization, the information processing apparatus 100 generates a Pareto solution set indicated in a graph 3500. The graph 3500 is a scatter plot. Each point in the graph 3500 indicates a Pareto solution. A horizontal axis of the graph 3500 is the prediction value $\mu_1(x)$, and a vertical axis of the graph 3500 is the deviation $\delta_1(x)$.

$$F_1(x)=\mu_1(x) \text{ to min} \quad (13)$$

$$F_2(x)=\delta_1(x) \text{ to max} \quad (14)$$

The information processing apparatus 100 outputs the Pareto solution set indicated in the graph 3500 so that a user may refer to the Pareto solution set. The information processing apparatus 100 accepts specification of a target value 3.8 of the characteristic value $y_1$ on the basis of operation input of the user, specifies the deviation $\delta_1(x)$ corresponding to the specified target value 3.8 in the Pareto solution set indicated in the graph 3500, and sets the deviation $\delta_1(x)$ as the deviation threshold $\delta_1$. Next, description of FIG. 36 will be made.

Figure 36:
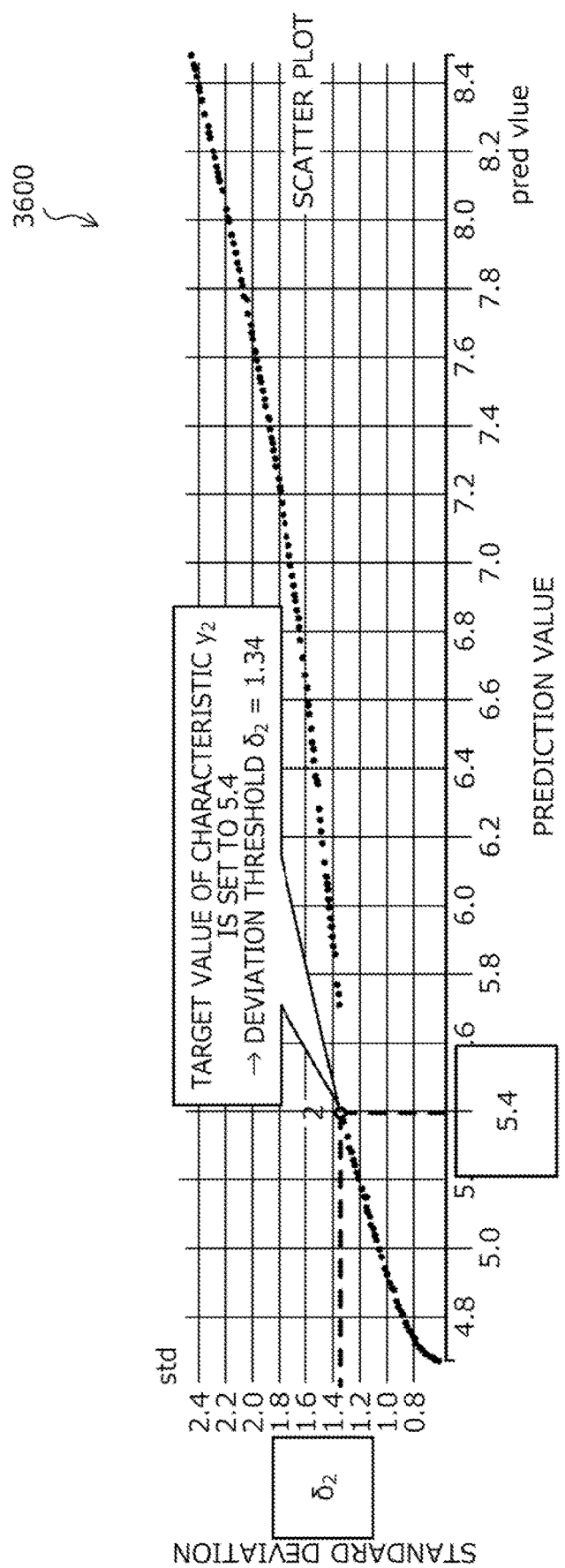
FIG. 36 is an explanatory diagram (part 3) illustrating the third operation example of the information processing apparatus 100.

In FIG. 36, on the basis of the $y_2$ model, the information processing apparatus 100 performs multi-objective optimization by using an objective function that optimizes the prediction value $\mu_2(x)$ of the characteristic value $y_2$ indicated in the following Expression (15) and an objective function that optimizes the deviation $\delta_2(x)$ indicated in the following Expression (16).

As a result of performing the multi-objective optimization, the information processing apparatus 100 generates a Pareto solution set indicated in a graph 3600. The graph 3600 is a scatter plot. Each point in the graph 3600 indicates a Pareto solution. A horizontal axis of the graph 3600 is the prediction value $\mu_2(x)$, and a vertical axis of the graph 3600 is the deviation $\delta_2(x)$.

$$F_1(x)=\mu_2(x) \text{ to min} \quad (15)$$

$$F_2(x)=\delta_2(x) \text{ to max} \quad (16)$$

The information processing apparatus 100 outputs the Pareto solution set indicated in the graph 3600 so that a user may refer to the Pareto solution set. The information processing apparatus 100 accepts specification of a target value 5.4 of the characteristic value $y_2$ on the basis of operation input of the user, specifies the deviation $\delta_2(x)$ corresponding to the specified target value 5.4 in the Pareto solution set indicated in the graph 3600, and sets the deviation $\delta_2(x)$ as the deviation threshold $\delta_2$. Next, description of FIG. 37 will be made.

Figure 37:
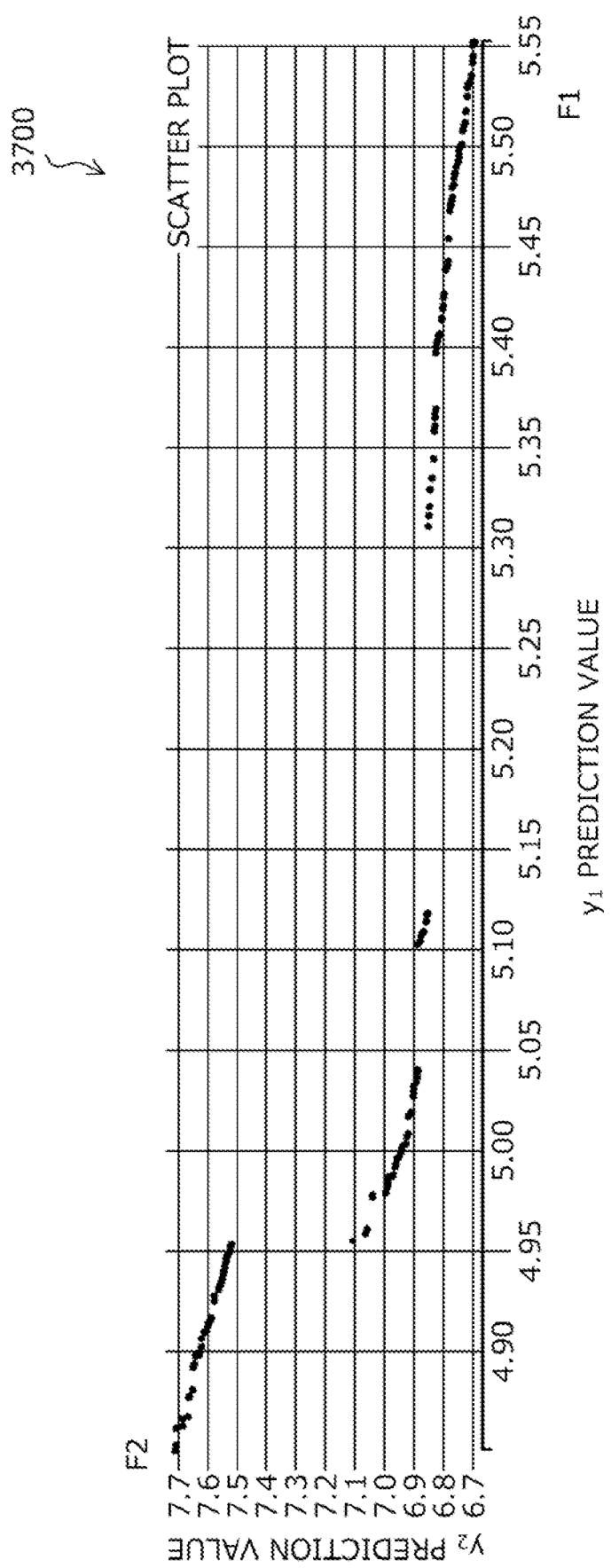
FIG. 37 is an explanatory diagram (part 4) illustrating the third operation example of the information processing apparatus 100.

In FIG. 37, on the basis of the $y_1$ model and the $y_2$ model, the information processing apparatus 100 sets an objective function that optimizes the prediction value $\mu_1(x)$ of the characteristic value $y_1$ indicated in the following Expression (17) and an objective function that optimizes the prediction value $\mu_2(x)$ of the characteristic value $y_2$ indicated in the following Expression (18).

$$F_1(x)=\mu_1(x) \text{ to min} \quad (17)$$

$$F_2(x)=\mu_2(x) \text{ to min} \quad (18)$$

In individual evaluation in the multi-objective optimization, in a case where a deviation $\sigma_j$ of a characteristic value of an individual is smaller than a set deviation threshold $\delta_j$, the information processing apparatus 100 determines that a deviation constraint is violated and adds a penalty to $F_j$. The individual is a Pareto solution candidate.

For example, the information processing apparatus 100 adds a penalty term to Expressions (17) and (18) described above, and sets the following Expressions (19) and (20). $P_i$ is $(\sigma_i-\delta_i)^2+C_i$ when $\sigma_i<\delta_i$ holds, and 0 when $\sigma_i<\delta_i$ does not hold. $C_i$ is, for example, a fixed value. $C_i$ is, for example, a maximum value of an absolute value of a characteristic value $y_i$ in training data. $\alpha$ is, for example, 10.

$$F_1(x)=\mu_1(x)+\alpha\Sigma_{i=1}^{Ny}P_i \text{ to min} \quad (19)$$

$$F_2(x)=\mu_2(x)+\alpha\Sigma_{i=1}^{Ny}P_i \text{ to min} \quad (20)$$

On the basis of the $y_1$ model and the $y_2$ model, the information processing apparatus 100 performs multi-objective optimization by using the objective functions indicated in Expressions (19) and (20) described above. As a result of performing the multi-objective optimization, the information processing apparatus 100 generates a Pareto solution set indicated in a graph 3700. The graph 3700 is a scatter plot. Each point in the graph 3700 indicates a Pareto solution. A horizontal axis of the graph 3700 is the prediction value $\mu_1(x)$, and a vertical axis of the graph 3700 is the prediction value $\mu_2(x)$.

With this configuration, the information processing apparatus 100 may obtain various Pareto solution sets of combinations of values of the respective characteristic variables in consideration of the degree of search in consideration of the reliability of the $y_1$ model and the $y_2$ model. Next, description of FIG. 38 will be made.

In FIG. 38, as indicated in a table 3800, the information processing apparatus 100 specifies a minimum value $\sigma_1$ of the deviation of the prediction value $\mu_1(x)$ and a minimum value $\sigma_2$ of the deviation of the prediction value $\mu_2(x)$ as standards of the degree of search. The information processing apparatus 100 outputs the graph 3700 indicating the Pareto solution set and the table 3800 indicating the deviation serving as the standard of the degree of search so that a user may refer to the graph 3700 and the table 3800. With this configuration, the information processing apparatus 100 may visualize the Pareto solution set and facilitate selection of a desired Pareto solution by the user.

(Setting Processing Procedure in Third Operation Example)

Since one example of a setting processing procedure in the third operation example is similar to the one example of the setting processing procedure in the first operation example illustrated in FIG. 24, description thereof will be omitted.

(Solution Processing Procedure in Third Operation Example)

Next, one example of a solution processing procedure executed by the information processing apparatus 100 in the third operation example will be described with reference to FIG. 39. Solution processing is implemented by, for example, the CPU 301, the storage area such as the memory 302 or the recording medium 305, and the network I/F 303 illustrated in FIG. 3.

Figure 39:
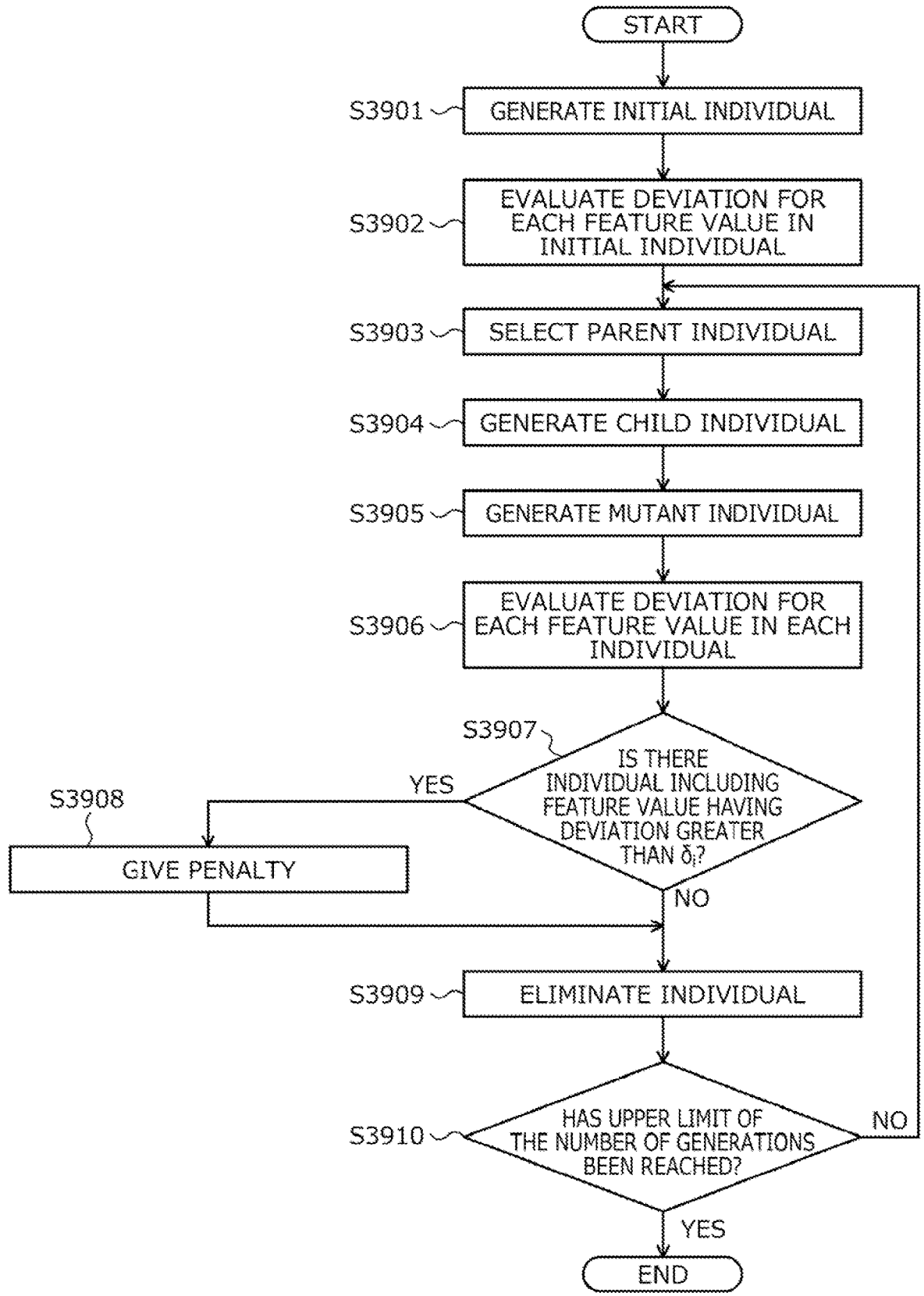
FIG. 39 is a flowchart illustrating one example of a solution processing procedure in the third operation example.

FIG. 39 is a flowchart illustrating the one example of the solution processing procedure in the third operation example. In FIG. 39, the information processing apparatus 100 generates one or more initial individuals, each of which indicates a Pareto solution candidate, and sets the one or more initial individuals as a population (Step S3901). Then, the information processing apparatus 100 evaluates a deviation for each feature value in each initial individual by using the Gaussian process regression model (Step S3902).

Next, the information processing apparatus 100 selects a parent individual from the population (Step S3903). Then, the information processing apparatus 100 generates a child individual from the selected parent individual, and adds the child individual to the population (Step S3904).

Next, the information processing apparatus 100 generates a mutant individual, and adds the mutant individual to the population (Step S3905). Then, the information processing apparatus 100 evaluates a deviation for each feature value in each individual of the population by using the Gaussian process regression model (Step S3906).

Next, the information processing apparatus 100 determines whether or not there is an individual including a feature value having a deviation greater than the deviation threshold $\delta_i$ in the population (Step S3907). Here, in a case where there is an individual including a feature value having a deviation greater than the deviation threshold $\delta_i$ (Step S3907: Yes), the information processing apparatus 100 proceeds to processing of Step S3908. On the other hand, in a case where there is no individual including a feature value having a deviation greater than the deviation threshold $\delta_i$ (Step S3907: No), the information processing apparatus 100 proceeds to processing of Step S3909.

In Step S3908, the information processing apparatus 100 gives a penalty to the individual including the feature value having the deviation greater than the deviation threshold $\delta_i$ in the population (Step S3908). Then, the information processing apparatus 100 proceeds to the processing of Step S3909.

In Step S3909, the information processing apparatus 100 eliminates the individual included in the population to remove the individual from the population (Step S3909). Next, the information processing apparatus 100 determines whether or not an upper limit of the number of generations has been reached (Step S3910). Here, in a case where the upper limit of the number of generations has not been reached (Step S3910: No), the information processing apparatus 100 returns to the processing of Step S3903. On the other hand, in a case where the upper limit of the number of generations has been reached (Step S3910: Yes), the information processing apparatus 100 ends the solution processing.

(One Example of Single-Objective Optimization)

Next, one example of single-objective optimization in a case where there is one type of characteristic variable serving as an objective variable will be described with reference to FIG. 40.

Figure 40:
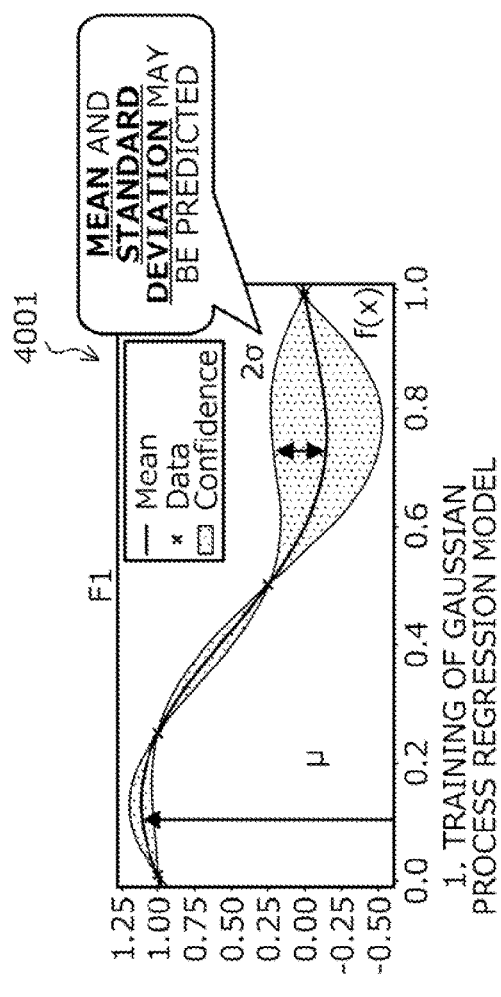
FIG. 40 is an explanatory diagram illustrating one example of single-objective optimization.
Figure 40:
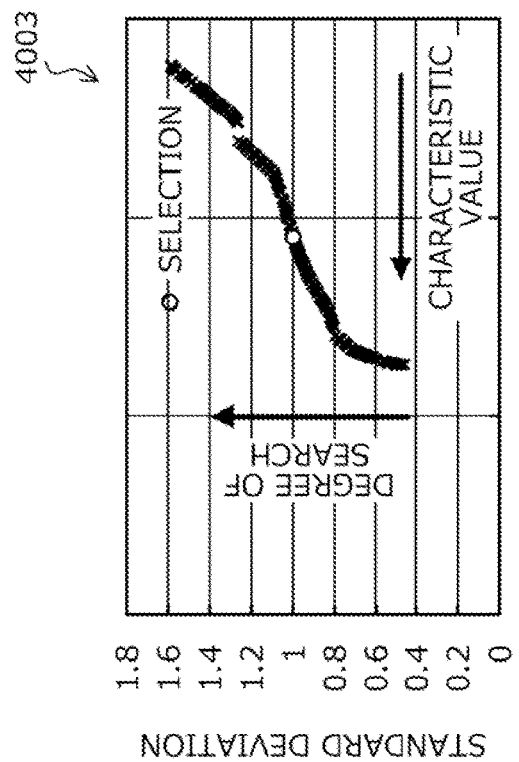
Figure 40:
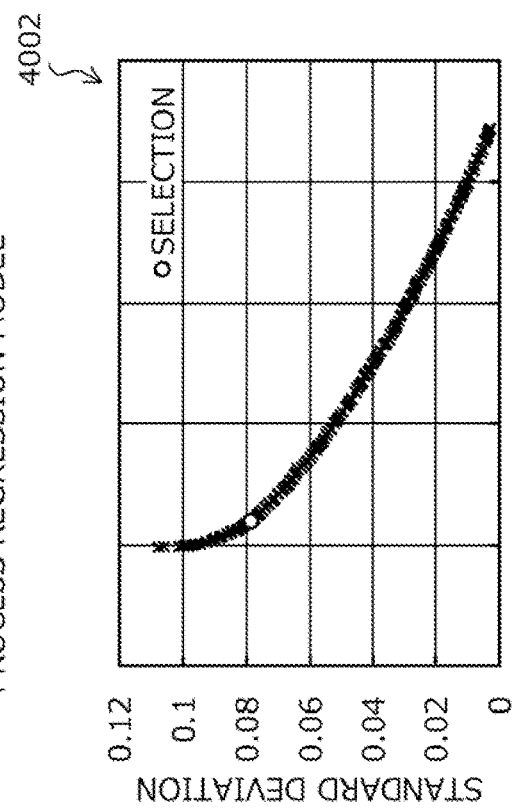

FIG. 40 is an explanatory diagram illustrating the one example of the single-objective optimization. In FIG. 40, (40-1) as in the first operation example, the information processing apparatus 100 trains, for one characteristic variable, a Gaussian process regression model indicated in a graph 4001 on the basis of a plurality of pieces of training data.

Then, the information processing apparatus 100 may optimize, as in the first operation example, a characteristic value of one characteristic variable while minimizing a deviation, or optimize, as in the third operation example, a characteristic value of one characteristic variable while maximizing a deviation. The case of optimizing the characteristic value of one characteristic variable while minimizing the deviation will be described later in (40-2-1). The case of optimizing the characteristic value of one characteristic variable while maximizing the deviation will be described later in (40-2-2).

(40-2-1) The information processing apparatus 100 performs, for one characteristic variable, multi-objective optimization by using an objective function that optimizes a value of the characteristic variable and an objective function that minimizes a deviation of the value of the characteristic variable. The value of the characteristic variable is predicted by, for example, the Gaussian process regression model. The deviation of the value of the characteristic variable is calculated by, for example, the Gaussian process regression model. With this configuration, the information processing apparatus 100 may generate a Pareto solution set of a combination of a value of one characteristic variable and a deviation of the value of the characteristic variable.

The information processing apparatus 100 outputs a graph 4002 indicating the generated Pareto solution set so that a user may refer to the Pareto solution set. With this configuration, the information processing apparatus 100 may visualize the Pareto solution set. Additionally, the information processing apparatus 100 may facilitate selection of a desired Pareto solution by the user from the Pareto solution set indicated in the graph 4002.

(40-2-2) The information processing apparatus 100 performs, for one characteristic variable, multi-objective optimization by using an objective function that optimizes a value of the characteristic variable and an objective function that maximizes a deviation of the value of the characteristic variable. The value of the characteristic variable is predicted by, for example, the Gaussian process regression model. The deviation of the value of the characteristic variable is calculated by, for example, the Gaussian process regression model. With this configuration, the information processing apparatus 100 may generate a Pareto solution set of a combination of a value of one characteristic variable and a deviation of the value of the characteristic variable.

The information processing apparatus 100 outputs a graph 4003 indicating the generated Pareto solution set so that a user may refer to the Pareto solution set. With this configuration, the information processing apparatus 100 may visualize the Pareto solution set. Additionally, the information processing apparatus 100 may facilitate selection of a desired Pareto solution by the user from the Pareto solution set indicated in the graph 4003.

As described above, according to the information processing apparatus 100, it is possible to perform the first multi-objective optimization for each characteristic variable by using an objective function that optimizes a value of the characteristic variable and an objective function that optimizes an index value indicating reliability of the value. According to the information processing apparatus 100, by performing the first multi-objective optimization for each characteristic variable, it is possible to generate a solution set of a combination of the value of the characteristic variable and the index value indicating the reliability of the value of the characteristic variable. According to the information processing apparatus 100, it is possible to specify, for each characteristic variable, an index value included in a combination serving as a solution in a case where the characteristic variable is a specified value in the generated solution set. According to the information processing apparatus 100, it is possible to perform the second multi-objective optimization by using an objective function that optimizes a value of each characteristic variable predicted by the model, including a penalty term based on the specified index value. According to the information processing apparatus 100, by performing the second multi-objective optimization, it is possible to generate a solution set of a combination of values of respective characteristic variables. With this configuration, the information processing apparatus 100 may perform the second multi-objective optimization in consideration of the reliability of the model, accurately optimize the value of each characteristic variable, and accurately obtain the solution set.

According to the information processing apparatus 100, on the basis of a plurality of pieces of training data, it is possible to train, for each characteristic variable, a Gaussian process regression model that makes it possible to predict a value of the characteristic variable and makes it possible to calculate an index value indicating reliability of the value. According to the information processing apparatus 100, it is possible to set, for each characteristic variable, an objective function that optimizes a value of the characteristic variable predicted by the trained Gaussian process regression model. According to the information processing apparatus 100, it is possible to set, for each characteristic variable, an objective function that optimizes an index value indicating reliability of the value calculated by the trained Gaussian process regression model. With this configuration, the information processing apparatus 100 may promote reduction of a workload on a user when preparing the model, and may make it possible to calculate the index value indicating reliability of the value of the characteristic variable.

According to the information processing apparatus 100, it is possible to calculate the index value indicating the reliability of the value of each characteristic variable predicted by the model on the basis of a distance from each of a plurality of pieces of training data to the value. With this configuration, the information processing apparatus 100 may make it possible to calculate the index value indicating the reliability of the value of the characteristic variable without using the model.

According to the information processing apparatus 100, it is possible to determine whether or not a value of any one characteristic variable of the plurality of characteristic variables satisfies a target value in the generated solution set of the combination of the values of the respective characteristic variables. According to the information processing apparatus 100, in a case where a value of any one of the characteristic variables does not satisfy the target value, it is possible to specify a new index value different from an index value specified immediately before for the any one of the characteristic variables. According to the information processing apparatus 100, it is possible to perform the second multi-objective optimization by using an objective function that optimizes a value of each characteristic variable predicted by the model, including a penalty term based on the specified new index value. With this configuration, the information processing apparatus 100 may repeat the second multi-objective optimization and obtain the solution set more accurately.

According to the information processing apparatus 100, it is possible to use, as the index value indicating the reliability, an index value that increases as the reliability decreases. According to the information processing apparatus 100, it is possible to use, as the objective function that optimizes the index value indicating the reliability, an objective function that minimizes the index value indicating the reliability. According to the information processing apparatus 100, in a case where a value of any one of the characteristic variables does not satisfy the target value, it is possible to specify, for the any one of the characteristic variables, a new index value greater by a first value than the index value specified immediately before. With this configuration, the information processing apparatus 100 may specify a more appropriate index value to obtain a solution set more accurately.

According to the information processing apparatus 100, in a case where a value of any one of the characteristic variables satisfies the target value and is not included in a range based on the target value, it is possible to specify, for the any one of the characteristic variables, a new index value smaller than the index value specified immediately before by a second value different from the first value. With this configuration, the information processing apparatus 100 may specify a more appropriate index value to obtain a solution set more accurately.

According to the information processing apparatus 100, it is possible to use, as the index value indicating the reliability, an index value that increases as the reliability decreases. According to the information processing apparatus 100, it is possible to use, as the objective function that optimizes the index value indicating the reliability, an objective function that maximizes the index value indicating the reliability. According to the information processing apparatus 100, in a case where a value of any one of the characteristic variables does not satisfy the target value, it is possible to specify, for the any one of the characteristic variables, a new index value smaller by the first value than the index value specified immediately before. With this configuration, the information processing apparatus 100 may specify a more appropriate index value to obtain a solution set more accurately.

According to the information processing apparatus 100, in a case where a value of any one of the characteristic variables satisfies the target value and is not included in the range based on the target value, it is possible to specify, for the any one of the characteristic variables, a new index value greater than the index value specified immediately before by the second value different from the first value. With this configuration, the information processing apparatus 100 may specify a more appropriate index value to obtain a solution set more accurately.

According to the information processing apparatus 100, it is possible to set the target value on the basis of the specified value. With this configuration, the information processing apparatus 100 may facilitate a user to obtain a desired solution.

According to the information processing apparatus 100, in a case where the index value indicating the reliability of the value of any one characteristic variable is a value indicating that the reliability is lower than that of the specified index value, it is possible to include the penalty term in the objective function that optimizes the value of the characteristic variable. With this configuration, the information processing apparatus 100 may make it possible to consider the reliability of the model when performing the second multi-objective optimization.

Note that the information processing method described in the present embodiment may be implemented by executing a program prepared in advance, on a computer such as a PC or a workstation. The information processing program described in the present embodiment is executed by being recorded on a computer-readable recording medium and being read out from the recording medium by the computer. The recording medium is a hard disk, a flexible disk, a compact disc (CD)-ROM, a magneto-optical disc (MO), a digital versatile disc (DVD), or the like. Furthermore, the information processing program described in the present embodiment may be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing an information processing program that causes at least one computer to execute a process, the process comprising:
    generating a solution set of a combination of the value and the index value by performing first multi-objective optimization for each of a plurality of characteristic variables by using a first objective function that searches for a value of the characteristic variable predicted by a trained Gaussian process regression model and a second objective function that searches for an index value that indicates reliability of the value;
    specifying an index value included in a combination that serves as a solution for each of the plurality of characteristic variables in a case where a characteristic variable is a certain value in the generated solution set;
    generating a solution set of a combination of the respective values of the plurality of characteristic variables by performing second multi-objective optimization by using a third objective function that searches for a value of each of the plurality of characteristic variables predicted by the trained Gaussian process regression model and that includes a penalty term based on the specified index value;
    specifying by user, in a case where a value of a first characteristic variable of the plurality of characteristic variables does not satisfy a target value in the generated solution set of the combination of the respective values of the plurality of characteristic variables, a new index value different from the specified index value; and
    performing the second multi-objective optimization by using the third objective function that includes a penalty term based on the new index value specified by user.

2. The non-transitory computer-readable storage medium according to claim 1, wherein the process further comprising:
    training, for each of the plurality of characteristic variables, the Gaussian process regression model that enables prediction of a value of the characteristic variable and calculation of an index value that indicates reliability of the value based on a plurality of pieces of training data,
    wherein the first objective function that searches for a value of the characteristic variable predicted by the trained Gaussian process regression model, and the second objective function that searches for an index value that indicates reliability of the value calculated by the trained Gaussian process regression model.

3. The non-transitory computer-readable storage medium according to claim 1, wherein the index value that indicates the reliability of the value of each of the plurality of characteristic variables predicted by the Gaussian process regression model is calculated based on a distance from each of a plurality of pieces of training data to the value.

4. The non-transitory computer-readable storage medium according to claim 1, wherein the index value that indicates the reliability is an index value that increases as the reliability decreases, the second objective function that searches for the index value that indicates the reliability is an objective function that minimizes the index value that indicates the reliability, and the specifying the new index value includes in a case where a value of the first characteristic variable of the plurality of characteristic variables does not satisfy the target value in the generated solution set of the combination of the respective values of the plurality of characteristic variables, a new index value that is greater than the index value specified immediately before by a first value is specified for the first characteristic variable.

5. The non-transitory computer-readable storage medium according to claim 4, wherein the specifying the new index value includes in a case where a value of the first characteristic variable of the plurality of characteristic variables satisfies the target value and is not included in a range based on the target value in the generated solution set of the combination of the respective values of the plurality of characteristic variables, a new index value smaller than the index value specified immediately before by a second value different from the first value is specified for the first characteristic variable.

6. The non-transitory computer-readable storage medium according to claim 1, wherein the index value that indicates the reliability is an index value that increases as the reliability decreases, the second objective function that searches for the index value that indicates the reliability is an objective function that maximizes the index value that indicates the reliability, and the specifying the new index value includes in a case where a value of the first characteristic variable of the plurality of characteristic variables does not satisfy the target value in the generated solution set of the combination of the respective values of the plurality of characteristic variables, a new index value that is smaller than the index value specified immediately before by a first value is specified for the first characteristic variable.

7. The non-transitory computer-readable storage medium according to claim 6, wherein the specifying the new index value includes in a case where a value of the first characteristic variable of the plurality of characteristic variables satisfies the target value and is not included in a range based on the target value in the generated solution set of the combination of the respective values of the plurality of characteristic variables, a new index value greater than the index value specified immediately before by a second value different from the first value is specified for the first characteristic variable.

8. The information processing program according to claim 1, wherein the target value is set based on the specified value.

9. The non-transitory computer-readable storage medium according to claim 1, wherein the process further comprising setting, in a case where an index value that indicates reliability of a value of a second characteristic variable of the plurality of characteristic variables in the solution candidate of the combination of the respective values of the plurality of characteristic variables is a value that indicates that reliability is lower than reliability of the specified index value, the third objective function that searches for the value of each of the plurality of characteristic variables so that the first objective function that searches for the value of the characteristic variable includes a penalty term.

10. The non-transitory computer-readable storage medium according to claim 1, wherein the process further comprising performing, for one characteristic variable, multi-objective optimization by using the first objective function that searches for a value of the characteristic variable predicted by the trained Gaussian process regression model and the second objective function that searches for an index value that indicates reliability of the value, to generate a solution set of a combination of the value and the index value.

11. An information processing method for a computer to execute a process comprising:
generating a solution set of a combination of the value and the index value by performing first multi-objective optimization for each of a plurality of characteristic variables by using a first objective function that searches for a value of the characteristic variable predicted by a trained Gaussian process regression model and a second objective function that searches for an index value that indicates reliability of the value;
specifying an index value included in a combination that serves as a solution for each of the plurality of characteristic variables in a case where a characteristic variable is a certain value in the generated solution set;
generating a solution set of a combination of the respective values of the plurality of characteristic variables by performing second multi-objective optimization by using a third objective function that searches for a value of each of the plurality of characteristic variables predicted by the trained Gaussian process regression model and that includes a penalty term based on the specified index value;
specifying by user, in a case where a value of a first characteristic variable of the plurality of characteristic variables does not satisfy a target value in the generated solution set of the combination of the respective values of the plurality of characteristic variables, a new index value different from the specified index value; and
performing the second multi-objective optimization by using the third objective function that includes a penalty term based on the new index value specified by user.

12. An information processing apparatus comprising:
one or more memories; and
one or more processors coupled to the one or more memories and the one or more processors configured to:
generate a solution set of a combination of the value and the index value by performing first multi-objective optimization for each of a plurality of characteristic variables by using a first objective function that searches for a value of the characteristic variable predicted by a trained Gaussian process regression model and a second objective function that searches for an index value that indicates reliability of the value;
specify an index value included in a combination that serves as a solution for each of the plurality of characteristic variables in a case where a characteristic variable is a certain value in the generated solution set;
generate a solution set of a combination of the respective values of the plurality of characteristic variables by performing second multi-objective optimization by using third objective function that searches for a value of each of the plurality of characteristic variables predicted by the trained Gaussian process regression model and that includes a penalty term based on the specified index value;
specify by user, in a case where a value of a first characteristic variable of the plurality of characteristic variables does not satisfy a target value in the generated solution set of the combination of the respective values of the plurality of characteristic variables, a new index value different from the specified index value; and
perform the second multi-objective optimization by using the third objective function that includes a penalty term based on the new index value specified by user.

\* \* \* \* \*